US007955169B2

(12) United States Patent
Walker et al.

(10) Patent No.: US 7,955,169 B2
(45) Date of Patent: Jun. 7, 2011

(54) METHOD AND APPARATUS FOR OFFERING A FLAT RATE GAMING SESSION WITH TIME EXTENSION AWARDS

(75) Inventors: Jay S. Walker, Ridgefield, CT (US); James A. Jorasch, New York, NY (US); Robert C. Tedesco, Fairfield, CT (US)

(73) Assignee: IGT, Reno, NV (US)

(*) Notice: Subject to any disclaimer, the term of this patent is extended or adjusted under 35 U.S.C. 154(b) by 1204 days.

(21) Appl. No.: 11/273,534

(22) Filed: Nov. 14, 2005

(65) Prior Publication Data

US 2006/0046836 A1 Mar. 2, 2006

Related U.S. Application Data

(63) Continuation-in-part of application No. 10/778,984, filed on Feb. 13, 2004, now Pat. No. 7,740,534.

(60) Provisional application No. 60/679,138, filed on May 9, 2005, provisional application No. 60/627,670, filed on Nov. 12, 2004, provisional application No. 60/447,350, filed on Feb. 13, 2003.

(51) Int. Cl.
*G06F 17/00* (2006.01)
*G06F 19/00* (2006.01)

(52) U.S. Cl. .................. 463/16; 463/1; 463/20; 463/25; 463/29; 463/40; 463/41; 463/42

(58) Field of Classification Search ................ 463/1, 25, 463/29, 40–42
See application file for complete search history.

(56) References Cited

U.S. PATENT DOCUMENTS

| | | | | |
|---|---|---|---|---|
| 4,363,485 | A | 12/1982 | Edwall | |
| 4,467,424 | A | 8/1984 | Hedges et al. | 364/412 |
| 4,593,904 | A | 6/1986 | Graves | |
| 4,636,951 | A | 1/1987 | Harlick | 364/412 |
| 4,669,731 | A | 6/1987 | Clarke | 273/143 R |
| 4,764,666 | A | 8/1988 | Bergeron | 235/380 |
| 4,880,237 | A | 11/1989 | Kishishita | 273/138 A |
| 4,991,848 | A | 2/1991 | Greenwood et al. | 273/143 R |
| 5,069,453 | A | 12/1991 | Koza et al. | 463/17 |
| 5,085,435 | A | 2/1992 | Rossides | |

(Continued)

OTHER PUBLICATIONS

Grochowski, John, "Computers Help Players Learn Winning Strategy", Chicago Sun-Times, Jun. 30, 1995, Section: Weekend Plus, Gaming, p. 13, NC.

(Continued)

*Primary Examiner* — Dmitry Suhol
*Assistant Examiner* — Ryan Hsu
(74) *Attorney, Agent, or Firm* — Fincham Downs, LLC; Magdalena M. Fincham

(57) ABSTRACT

A wagering method is provided that allows players to purchase a gaming session comprising a plurality of game outcomes at a flat rate price. The number of game outcomes available in the bulk purchase gaming session may be a function of time in lieu of a specified number of game outcomes. In order to increase the attractiveness of the bulk purchase of the gaming outcomes, bonus time is awarded to players for specified winning game outcomes occurring during the gaming session, allowing players to extend their gaming session. This alternative award system increases player interest by providing either monetary and time awards, or a combination of both for a winning game outcome. Bonus time can also be offered as part of the gaming establishment's player tracking program or any special promotional program.

13 Claims, 30 Drawing Sheets

U.S. PATENT DOCUMENTS

| | | | | |
|---|---|---|---|---|
| 5,112,050 | A | 5/1992 | Koza et al. | 463/17 |
| 5,123,649 | A | 6/1992 | Tiberio | 273/143 R |
| 5,129,652 | A | 7/1992 | Wilkinson | |
| 5,178,389 | A | 1/1993 | Bentley et al. | |
| 5,178,390 | A | 1/1993 | Okada | 273/143 R |
| 5,275,400 | A | 1/1994 | Weingardt et al. | 273/85 |
| 5,287,269 | A | 2/1994 | Dorrough et al. | 364/408 |
| 5,290,033 | A | 3/1994 | Bittner et al. | 463/25 |
| 5,294,120 | A | 3/1994 | Schultz | |
| 5,377,975 | A | 1/1995 | Clapper, Jr. | 463/16 |
| 5,401,023 | A | 3/1995 | Wood | |
| 5,401,024 | A | 3/1995 | Simunek | 273/138 A |
| 5,407,199 | A | 4/1995 | Gumina | |
| 5,408,417 | A | 4/1995 | Silder | |
| 5,429,361 | A | 7/1995 | Raven et al. | 273/138 A |
| 5,457,306 | A | 10/1995 | Luero | |
| 5,511,781 | A | 4/1996 | Wood et al. | 273/85 |
| 5,531,440 | A | 7/1996 | Dabrowski et al. | |
| 5,536,008 | A | 7/1996 | Clapper, Jr. | |
| 5,537,314 | A | 7/1996 | Kanter | |
| 5,551,692 | A | 9/1996 | Pettit et al. | 273/143 R |
| 5,559,312 | A | 9/1996 | Lucero | |
| 5,569,082 | A | 10/1996 | Kaye | |
| 5,570,885 | A | 11/1996 | Ornstein | 463/27 |
| 5,580,311 | A | 12/1996 | Haste, III | |
| 5,595,538 | A | 1/1997 | Haste, III | |
| 5,609,337 | A | 3/1997 | Clapper, Jr. | |
| 5,613,912 | A | 3/1997 | Slater | 463/25 |
| 5,621,200 | A | 4/1997 | Irwin et al. | |
| 5,634,012 | A | 5/1997 | Stefik et al. | 395/239 |
| 5,638,443 | A | 6/1997 | Stefik et al. | |
| 5,647,592 | A | 7/1997 | Gerow | |
| 5,657,899 | A | 8/1997 | Stoken | |
| 5,709,603 | A | 1/1998 | Kaye | |
| 5,715,403 | A | 2/1998 | Stefik | |
| 5,735,432 | A | 4/1998 | Stoken et al. | |
| 5,741,183 | A | 4/1998 | Acres et al. | 463/42 |
| 5,743,800 | A | 4/1998 | Huard et al. | |
| 5,749,784 | A | 5/1998 | Clapper, Jr. | |
| 5,758,875 | A | 6/1998 | Giacalone, Jr. | 273/143 R |
| 5,762,552 | A | 6/1998 | Vuong et al. | |
| 5,766,075 | A | 6/1998 | Cook et al. | 463/25 |
| 5,768,382 | A | 6/1998 | Schneier et al. | 380/23 |
| 5,770,533 | A | 6/1998 | Franchi | 463/42 |
| 5,772,509 | A | 6/1998 | Weiss | 463/16 |
| 5,800,268 | A | 9/1998 | Molnick | 463/40 |
| 5,809,520 | A | 9/1998 | Edwards et al. | |
| 5,816,917 | A | 10/1998 | Kelmer et al. | 463/16 |
| 5,830,063 | A | 11/1998 | Byrne | |
| 5,830,067 | A | 11/1998 | Graves et al. | 463/40 |
| 5,833,538 | A | 11/1998 | Weiss | 463/21 |
| 5,873,781 | A | 2/1999 | Keane | |
| 5,910,048 | A | 6/1999 | Feinberg | 463/25 |
| 5,915,588 | A | 6/1999 | Stoken et al. | |
| 5,941,769 | A | 8/1999 | Order | |
| 5,970,143 | A | 10/1999 | Schneier et al. | 380/23 |
| 5,980,384 | A | 11/1999 | Barrie | 463/16 |
| 5,993,316 | A | 11/1999 | Coyle et al. | |
| 6,001,016 | A | 12/1999 | Walker et al. | 463/42 |
| 6,012,983 | A | 1/2000 | Walker et al. | 463/20 |
| 6,024,643 | A | 2/2000 | Begis | |
| 6,050,895 | A | 4/2000 | Luciano, Jr. et al. | |
| 6,056,289 | A | 5/2000 | Clapper et al. | |
| 6,077,163 | A | 6/2000 | Walker et al. | 463/26 |
| 6,117,012 | A | 9/2000 | McCrea, Jr. | |
| 6,139,430 | A | 10/2000 | Huard et al. | |
| 6,142,870 | A * | 11/2000 | Wada et al. | 463/4 |
| 6,146,270 | A | 11/2000 | Huard et al. | |
| 6,168,522 | B1 | 1/2001 | Walker et al. | 463/25 |
| 6,193,606 | B1 | 2/2001 | Walker et al. | 463/20 |
| 6,203,428 | B1 | 3/2001 | Giobbi et al. | 463/16 |
| 6,244,957 | B1 | 6/2001 | Walker et al. | 463/20 |
| 6,273,820 | B1 | 8/2001 | Haste, III | 463/40 |
| 6,287,202 | B1 | 9/2001 | Pascal et al. | |
| 6,299,531 | B1 | 10/2001 | Bommarito | |
| 6,299,533 | B1 | 10/2001 | Parra et al. | 463/17 |
| 6,306,038 | B1 | 10/2001 | Graves et al. | 463/40 |
| 6,312,332 | B1 * | 11/2001 | Walker et al. | 463/23 |
| 6,315,662 | B1 | 11/2001 | Jorasch et al. | 463/20 |
| 6,318,721 | B1 | 11/2001 | Randall et al. | |
| 6,319,127 | B1 | 11/2001 | Walker et al. | 463/26 |
| 6,331,144 | B1 | 12/2001 | Walker et al. | 463/20 |
| 6,336,636 | B1 * | 1/2002 | Smart | 273/447 |
| 6,343,989 | B1 | 2/2002 | Wood et al. | 463/23 |
| 6,389,538 | B1 | 5/2002 | Gruse et al. | 705/1 |
| 6,394,899 | B1 | 5/2002 | Walker | |
| 6,402,148 | B1 | 6/2002 | Saruwatari | 273/292 |
| 6,409,602 | B1 | 6/2002 | Wiltshire et al. | |
| 6,508,709 | B1 | 1/2003 | Karmarkar | |
| 6,508,710 | B1 | 1/2003 | Paravia et al. | 463/42 |
| 6,527,638 | B1 | 3/2003 | Walker et al. | 463/25 |
| 6,565,434 | B1 | 5/2003 | Acres | |
| 6,578,735 | B1 | 6/2003 | Mothwurf | |
| 6,605,001 | B1 | 8/2003 | Tarantino | 463/22 |
| 6,623,357 | B2 | 9/2003 | Chowdhury | 463/25 |
| 6,632,141 | B2 | 10/2003 | Webb et al. | |
| 6,634,942 | B2 | 10/2003 | Walker et al. | |
| 6,832,141 | B2 | 10/2003 | Webb et al. | |
| 6,645,075 | B1 | 11/2003 | Gatto et al. | |
| 6,695,700 | B2 | 2/2004 | Walker et al. | |
| 6,709,331 | B2 | 3/2004 | Berman | 463/16 |
| 6,722,983 | B2 | 4/2004 | Kaminkow et al. | 463/26 |
| 6,726,563 | B1 | 4/2004 | Baerlocher et al. | 463/25 |
| 6,733,389 | B2 | 5/2004 | Webb et al. | 463/20 |
| 6,769,983 | B2 | 8/2004 | Slomiany | 463/16 |
| 6,832,958 | B2 | 12/2004 | Acres et al. | |
| 6,846,238 | B2 | 1/2005 | Wells | |
| 6,896,616 | B2 | 5/2005 | Weiss | |
| 6,935,949 | B1 | 8/2005 | Murphy | |
| 6,969,317 | B2 | 11/2005 | Walker et al. | |
| 7,076,652 | B2 | 7/2006 | Ginter et al. | 713/153 |
| 7,140,964 | B2 | 11/2006 | Walker et al. | 463/25 |
| 7,179,168 | B1 | 2/2007 | Tulley et al. | |
| 7,210,141 | B1 | 4/2007 | Nathan et al. | |
| 7,213,005 | B2 | 5/2007 | Mourad et | 705/64 |
| 7,267,614 | B1 | 9/2007 | Jorasch et al. | |
| 7,351,142 | B2 | 4/2008 | Walker et al. | |
| 7,401,032 | B1 | 7/2008 | Golden et al. | |
| 7,419,427 | B2 | 9/2008 | Boushy | |
| 7,496,943 | B1 | 2/2009 | Goldberg et al. | |
| 7,591,726 | B2 | 9/2009 | Baerlocher et al. | |
| 7,682,244 | B1 | 3/2010 | Luciano, Jr. et al. | |
| 7,690,991 | B2 | 4/2010 | Black | |
| 7,722,458 | B2 | 5/2010 | Walker et al. | |
| 7,727,066 | B2 * | 6/2010 | Ikeya et al. | 463/25 |
| 7,740,534 | B2 * | 6/2010 | Walker et al. | 463/16 |
| 2001/0014868 | A1 | 8/2001 | Herz et al. | |
| 2001/0041610 | A1 * | 11/2001 | Luciano et al. | 463/16 |
| 2001/0046893 | A1 | 11/2001 | Giobbi et al. | 463/25 |
| 2002/0002076 | A1 | 1/2002 | Schneier et al. | |
| 2002/0058542 | A1 | 5/2002 | Roethel et al. | 463/13 |
| 2002/0125641 | A1 | 9/2002 | Moody | 273/292 |
| 2002/0132660 | A1 | 9/2002 | Taylor | |
| 2002/0147040 | A1 | 10/2002 | Walker et al. | |
| 2003/0013515 | A1 | 1/2003 | Rowe et al. | 463/25 |
| 2003/0013532 | A1 * | 1/2003 | Rowe et al. | 463/42 |
| 2003/0122485 | A1 | 4/2003 | Joao | |
| 2003/0087691 | A1 | 5/2003 | Kiely et al. | 463/25 |
| 2003/0092477 | A1 | 5/2003 | Luciano, Jr. et al. | 463/16 |
| 2003/0144053 | A1 | 7/2003 | Michaelson | 463/25 |
| 2003/0162582 | A1 | 8/2003 | Gordon | |
| 2003/0162586 | A1 * | 8/2003 | Ikeya et al. | 463/20 |
| 2003/0224854 | A1 | 12/2003 | Joao | 463/40 |
| 2004/0036224 | A1 * | 2/2004 | Crompton | 273/454 |
| 2004/0102238 | A1 * | 5/2004 | Taylor | 463/16 |
| 2004/0147308 | A1 | 7/2004 | Walker et al. | |
| 2005/0020342 | A1 | 1/2005 | Palmer et al. | |
| 2006/0252502 | A1 | 11/2006 | Walker et al. | |
| 2006/0287071 | A1 | 12/2006 | Walker et al. | |

OTHER PUBLICATIONS

Pledger, Marcia "Going for the gold at slot tournaments" Las Vegas Review-Journal, Dec. 24, 1995, p. 5.L.

Hawley, David, "Those one armed bandits; Slot-machine tournaments lure throngs to Midwest casinos", The Houston Chronicle, Apr. 9, 1996, Section: Houston, p. 3.

Grochowski, John, "Slot tourney prospers under Indiana rules", Chicago Sun-Times, Apr. 6, 1997, Section: Sho, Casinos, p. 15, NC.
"Station Announces formation of GameCast Live, LLC and Release of Remote Play eSlots for In-Room Gaming Applications", PR Newswire, Jun. 6, 2001, Financial News Section.
Website, "Extending the Casino Floor", GameCast Live, (http //www gamecastlive com/presentation/toronto_files/slide0012 htm), download date: Jun. 6, 2001.
Pending U.S. Appl. No. 09/218,258 "System & Method for Automatically Initiating Game . . . ", filed Dec. 6, 1996.
Pending U.S. Appl. No. 10/636,520 "System And Method For Communicating Game Session Information . . . ", filed Aug. 7, 2003.
Notice of Allowance for U.S. Appl. No. 10/001,089 mailed Jun. 28, 2006 9 pp.
Office Action for U.S. Appl. No. 10/001,089 mailed Jul. 11, 2005, 22 pp.
Office Action for U.S. Appl. No. 10/001,089 mailed Apr. 6, 2004, 11 pp.
Office Action for U.S. Appl. No. 11/423,037 mailed Dec. 9, 2008, 12 pp.
Office Action for U.S. Appl. No. 11/423,037 mailed Jun. 20, 2007, 8 pp.
Notice of Allowance for U.S. Appl. No. 11/423,043 mailed Jul. 13, 2010, 9 pp.
Office Action for U.S. Appl. No. 11/423,043 mailed Dec. 21, 2009, 10 pp.
Office Action for U.S. Appl. No. 11/423,043 mailed Jul. 20, 2009, 6 pp.
Office Action for U.S. Appl. No. 11/423,043 mailed Oct. 6, 2008, 6 pp.
Office Action for U.S. Appl. No. 11/423,055 mailed Aug. 4, 2010, 10 pp.
Office Action for U.S. Appl. No. 11/423,055 mailed Dec. 8, 2009, 16 pp.
Notice of Allowance for U.S. Appl. No. 10/985,131 mailed Nov. 3, 2005, 7 pp.
Office Action for U.S. Appl. No. 10/986,529 mailed Feb. 2, 2009, 12 pp.
Final Office Action for U.S. Appl. No. 10/986,529 mailed Jun. 9, 2008, 10 pp.
Office Action for U.S. Appl. No. 10/986,529 mailed Oct. 9, 2007, 11 pp.
Office Action for U.S. Appl. No. 11/425,037 mailed Sep. 9, 2010, 12 pp.
Office Action for U.S. Appl. No. 11/425,037 mailed Jun. 1, 2010, 10 pp.
Office Action for U.S. Appl. No. 11/425,037 mailed Apr. 29, 2008, 10 pp.
Office Action for U.S. Appl. No. 11/425,037 mailed Sep. 17, 2007, 5 pp.
Office Action for U.S. Appl. No. 11/425,041 mailed Sep, 17, 2007, 6 pp.
Office Action for U.S. Appl. No. 11/425,044 mailed Sep. 17, 2007, 6 pp.
Office Action for U.S. Appl. No. 10/420,066 mailed Oct. 1, 2010, 11 pp.
Office Action for U.S. Appl. No. 10/420,066 mailed Oct. 17, 2008, 10 pp.
Office Action for U.S. Appl. No. 10/420,066 mailed Jan. 8, 2008, 7 pp.
Office Action for U.S. Appl. No. 10/420,066 mailed Jul. 13, 2007, 12 pp.
Office Action for U.S. Appl. No. 10/420,066 mailed Sep. 22, 2006, 11 pp.
Office Action for U.S. Appl. No. 11/428,638 mailed Oct. 4, 2010, 12 pp.
Office Action for U.S. Appl. No. 11/428,642 mailed Oct. 6, 2010, 9 pp.
Office Action for U.S. Appl. No. 11/691,015 mailed Sep. 2, 2010, 8 pp.
Office Action for U.S. Appl. No. 11/691,065 mailed Aug. 19, 2010, 11 pp.
Office Action for U.S. Appl. No. 11/691,065 mailed Apr. 27, 2010, 12 pp.
Notice of Allowance for U.S. Appl. No. 10/778,984 mailed Mar. 1, 2010, 7 pp.
Office Action for U.S. Appl. No. 10/778,984 mailed Nov. 5, 2009, 10 pp.
Office Action for U.S. Appl. No. 10/778,984 mailed Feb. 18, 2009, 11 pp.
Office Action for U.S. Appl. No. 10/778,984 mailed Jun. 16, 2008, 10 pp.
Office Action for U.S. Appl. No. 10/778,984 mailed Oct. 24, 2007, 12 pp.
Office Action for U.S. Appl. No. 10/778,984 mailed Jun. 1, 2007, 10 pp.
"Ritchie, Lauren""Orange Man Sought in Betting Probe""Orlando Sentinel, May 30, 1990, 3 pp."
Mayo, Michael, Win-Or-Lose-Cruise, Bet Sports Legally, Boat 3 Miles Out, Sun Sentinel Dec. 28, 1994, 3 pp.
Cave, Kathy, "The Lake Effect", Milwaukee Journal Sentinel, Mar. 27, 1996, 2 pp.
Busch, Melanie, "Tulsa Firm Explores Internet Gaming", Tulsa World, Aug. 1, 1996, 2 pp.
"Network Gaming International Corp.""Electronic Bingo System", Nov. 13, 1996, 5 pp.
MGAM Signs Agreement w/Lac Vieux Desert Chippewa Tribe, Business Wire, May 18, 2001, 2 pp.
"GameCast Live—Home—Press Release, www.gamecastlive.com", download date Nov. 24, 2002, 2 pp.
Fallstrom, Bob H & R Community News Editor, "Winter Wonderland—Symphony of Trees is sure to be a dazzling delight", Herald & Review Archives, 1989-Present; (http//nl.newsbank.com/nl-search/we/Archives?p_action=doc&p_docid=1097F803A8ABB8), Nov. 17, 1992, 8 pp.
Notice of Allowability for U.S. Appl. No. 09/518,760, mailed Aug. 10, 2001, 1 pg.
Office Action for U.S. Appl. No. 09/518,760, mailed Jun. 9, 2001, 7 pp.
Notice of Allowability for U.S. Appl. No. 08/880,838, mailed Dec. 6, 1999, 1 pg.
Office Action for U.S. Appl. No. 08/880,838, mailed Oct. 6, 1999, 5 pp.
www.deq.com, ""DEQ Casino—Flying Bet Roulette""downloaded Nov. 24, 2002, 3 pg.
"www.gamecastlive.com ""GameCast Live—Press Release About the Product", download date: Nov. 24, 2002, 1 pg.
www.i2corp.com ""Welcome—i2corp.com"", download date: Nov. 24, 2002, 1 pg.
www.i2corp.com "Games—i2corp.com", download date: Nov. 24, 2002, 2 pp.
www.homegamblingnetwork.com "The Home Gambling Network—Welcome" download date: Nov. 24, 2002, 2 pp.
"Multimedia Games, Inc.—Home", www.betnet.com, download date: Nov. 24, 2002, 1 pg.
Newsletter sent via email, "The CR Newsletter" email sent Jan. 20, 1998, 1 pg.
www.casinovegasroyale.com, "Online blackjack, poker, slots and more" Copyright 2002, 1 pg.
"Who Says You Can't Win From Losing? Free Insurance for Online Play in July", (http//www smartplayers net/insurance htm), Jun. 14, 2003, 1 pg.
Bally Gaming Systems, Brochure "Introducing iView", Copyright 2004. 2 pp.
www.bettorsinsurance.com, "Bettors Insurance" Copyright 2004, 1 pg.
"CasinoActive.net Offers New Gambling Idea", (http//wwwbookmaker com/default asp?ACT=5&content=30&id=1), download date Jul. 26, 2004, 1 pg.
www.u1casino.com, "Gamblers Insurance", Jul. 26, 2004, 1 pg.
www.sportsbetbookmaker.com, "Online Sports Betting—Sportsbet Bookmaker" download date: Jul. 27, 2004, 1 pg.
www.ballygaming.com, "SDS Product Group Snapshot", download date: Aug. 9, 2004, 2 pp.

www.optimalgambling.com, "Cash Back Bonus" download date: Sep. 27, 2004, 1 pg.
The Home Gambling Network, "Players", download date: Nov. 24, 2002, 2 pp.
Davy, K. "Big Ichigeki! Taikouryku Museum" Copyright 1995-2001, 2 pp.
www.winneronline.com, "Insuring Your Online Wagers", Nov. 28, 2001, 1 pg.
Beckett, Rick, "Gambling Insurance?" download date: Sep. 27, 2004, 2 pp.
Office Action for U.S. Appl. No. 10/001,089 mailed Sep. 12, 2003, 8 pp.
Notice of Allowance for U.S. Appl. No. 10/636,520 mailed Sep. 30, 2010, 8 pp.
Office Action for U.S. Appl. No. 10/636,520 mailed Nov. 18, 2009, 13 pp.
Office Action for U.S. Appl. No. 10/636,520 mailed Jan. 15, 2009, 10 pp.
Office Action for U.S. Appl. No. 10/636,520 mailed Jul. 9, 2008, 14 pp.
Office Action for U.S. Appl. No. 10/636,520 mailed Oct. 9, 2007, 10 pp.
PCT International Search Report for Application No. PCT/US03/12271, mailed Sep. 15, 2003, 2 pp.
"GameCast Live—PowerPoint Presentation", (http //www gamecastlive com/presentation/toronto2_files/frame htm), download date: Nov. 24, 2002, 12 pp.
"GameCast Live—About the Product", (http //www gamecastlive com/about_the product html), download date: Nov. 24, 2002, 1 pg.
Website: "Insuring Your Online Wagers", (http // www winneronline com/articles/November2001/gambling_insu...), Nov. 28, 2001, 1 pg.
"GameCast Live—Home", (http //www gamecastlive com), download date: Nov. 24, 2002, 2 pp.
Office Action for U.S. Appl. No. 11/456,750, dated Jan. 16, 2008, 8 pp.
Office Action for U.S. Appl. No. 11/321,802, dated Jan. 25, 2008, 14 pp.
Office Action for U.S. Appl. No. 11/321,802, dated Oct. 30, 2008, 12 pp.
Office Action for U.S. Appl. No. 11/321,802 dated Aug. 20, 2009, 20 pp.
Order Remanding Appeal to Examiner re: U.S. Appl. No. 11/321,802, dated Jun. 4, 2010, 3 pp.
Office Action for U.S. Appl. No. 11/321,802, dated Jun. 24, 2010, 10 pp.
Office Action for U.S. Appl. No. 11/321,802, dated Dec. 22, 2010, 16 pp.
Notice of Allowance for U.S. Appl. No. 11/691,015 mailed Feb, 17, 2011, 4 pp.
Notice of Allowance for U.S. Appl. No. 11/691,015 mailed Dec. 20, 2010, 8 pp.

* cited by examiner

344

| PLAYER ID 410 | SOCIAL SECURITY NUMBER 412 | NAME 414 | ADDRESS 416 | PHONE NUMBER 418 | CREDIT CARD NUMBER 420 |
|---|---|---|---|---|---|
| 123456 | 123-45-7890 | BILL GREEN | 111 NORTH AVE. | (212) 555-1234 | 1111-2222-3333-4444 |
| 876543 | 876-54-3210 | ROB BLUE | 423 SOUTH ST. | (812) 555-4321 | 2222-4444-6666-8888 |
| 158595 | 555-12-6338 | KAREN RED | 64 WEST RD. | (315) 555-5954 | 1111-3333-5555-7777 |

| CREDIT BALANCE 422 | (ACCUMULATED) COMP. POINTS 424 | HOTEL GUEST 426 | PLAYER RATING 428 | VALUE OF INTERVAL REMAINING 430 |
|---|---|---|---|---|
| $25.00 | 130 PTS. | NO | 4 | $30.00 |
| $17.50 | 240 PTS. | YES | 2 | $3.00 |
| $0.00 | 350 PTS. | YES | 2 | $0.75 |

FIG. 4

246

| PLAYER ID NUMBER 510 | PLAYER SELECTED PRICE PARAMETERS 512 | FLAT RATE PRICE 514 | INTERVAL REMAINING 516 | TIME AUDIT DATA 518 | MACHINE ID NUMBER 520 |
|---|---|---|---|---|---|
| 123456 | TOP 3 JACKPOTS 90 MINUTES | $50.00 | 72 MINUTES | 6/21/97 10:30 AM | A846 |
| 876543 | ALL JACKPOTS 90 MINUTES | $200.00 | 3 MINUTES | 6/21/97 11:00 AM | B623 |
| 158595 | TOP JACKPOT 30 MINUTES | $30.00 | 15 MINUTES | 6/21/97 11:30 AM<br>6/21/97 11:45 AM | C103 |

FIG. 5

228

| PAY COMBINATION 610 | 1 COIN 620 | 2 COINS 630 | 3 COINS 640 | PAY COMBINATION STATUS 650 |
|---|---|---|---|---|
| DOUBLE JACKPOT | 400 | 800 | 1200 | ACTIVE |
| 5BAR-5BAR-5BAR | 50 | 100 | 150 | ACTIVE |
| SEVEN-SEVEN -SEVEN | 25 | 50 | 75 | INACTIVE |
| BAR-BAR-BAR | 20 | 40 | 60 | INACTIVE |
| CHERRY-CHERRY-CHERRY | 10 | 20 | 30 | INACTIVE |
| ANY PAIR-CHERRY | 5 | 10 | 15 | INACTIVE |
| ANY-ANY-CHERRY | 2 | 4 | 6 | INACTIVE |
| NON WINNING OUTCOMES | 0 | 0 | 0 | N/A |

FIG. 6

227

| MACHINE TYPE 710 | AMOUNT WAGERED PER PLAY 712 | PLAYER RATING 714 | TIME OF DAY 716 | DAY OF THE WEEK 718 | MACHINE USAGE 719 | ACTIVE PAY COMBINATIONS 720 | DURATION OF FLAT RATE PLAY SESSION 722 | FLAT RATE PRICE 724 |
|---|---|---|---|---|---|---|---|---|
| QUARTER DEUCES WILD | $0.25 | 2 | 2:00 AM | MONDAY | LOW | ALL | 30 MIN. | $15.00 |
| DOLLAR DOUBLE DIAMOND | $3 | 5 | 9:00 PM | SATURDAY | HEAVY | TOP 2 | 2 HRS. | $100.00 |
| DOLLAR SUPER SEVENS | $3 | 3 | 4:00 PM | FRIDAY | MODERATE | TOP 1 | 1 HR. | $30.00 |

FIG. 7

229

| PACKAGE NUMBER 1410 | INTERVAL 1412 | DURATION OF FLAT RATE PLAY SESSION 1414 | AMOUNT WAGERED PER PLAY 1416 | PAY COMBINATION STATUS 1418 | FLAT RATE PLAY SESSION PRICE 1420 |
|---|---|---|---|---|---|
| 1 | HANDLE PULLS | 100 PULLS | 3 COINS | ALL ACTIVE | $30.00 |
| 2 | HANDLE PULLS | 100 PULLS | 3 COINS | TOP 3 ACTIVE | $20.00 |
| 3 | HANDLE PULLS | 250 PULLS | 3 COINS | ALL ACTIVE | $75.00 |
| 4 | HANDLE PULLS | 250 PULLS | 3 COINS | TOP 3 ACTIVE | $50.00 |
| 5 | TIME | 30 MINUTES | 3 COINS | ALL ACTIVE | $40.00 |
| 6 | TIME | 30 MINUTES | 3 COINS | DYNAMIC | $30.00 |
| 7 | TIME | 60 MINUTES | 3 COINS | ALL ACTIVE | $80.00 |
| 8 | TIME | 60 MINUTES | 3 COINS | DYNAMIC | $60.00 |
| 9 | TIME | 90 MINUTES | 3 COINS | ALL ACTIVE | $120.00 |

FIG. 14

1720

| PLAYER IDENTIFIER 2105 | NAME 2110 | ADDRESS 2115 | FINANCIAL ACCOUNT IDENTIFIER 2120 | DEMOGRAPHIC 2125 | CREDITS 2130 | LIFETIME COIN IN 2135 |
|---|---|---|---|---|---|---|
| P11123 | SAM BROWN | ANYPLACE, USA | 1111-1111-1111-1111 | MALE, AGE 23 | 68 CREDITS, 25 CENTS PER CREDIT | $600 |
| P222234 | LINDA JONES | SOMEPLACE, USA | 2222-2222-2222-2222 | FEMALE, AGE 47 | 0 | $14400 |

FIG. 21

1725

| GAMING DEVICE IDENTIFIER 2205 | NAME 2210 | MANUFACTURER 2215 |
|---|---|---|
| G333333 | DIAMOND MINE | ABC CORP |
| G444444 | CRAZY DEUCES | XYZ CORP |

FIG. 22

1730

| CONTRACT IDENTIFIER 2305 | PLAYER IDENTIFIER 2310 | INITIAL PLAYER BANKROLL 2315 | DESCRIPTION 2320 | COST 2325 | RESULT 2330 | AMOUNT OWED THE PLAYER 2335 | AMOUNT OWED THE INSURER 2340 |
|---|---|---|---|---|---|---|---|
| C111 | P222333 | N/A | 2000 PULLS, 25 CENTS PER PULL, PLAYER KEEPS NET WINNINGS | $20 | CONTRACT ENDS WITH PLAYER AT MINUS $45 | 0 | $20 - $45= - $25 |
| C222 | P444555 | N/A | 1 HOUR OF PLAY, 1 DOLLAR PER PULL, PLAYER KEEPS GROSS WINNINGS | $100 | CONTRACT ENDS WITH PLAYER AT $97 | $97 | $100 |
| C333 | P666777 | $2000 | 100 PULLS PER WEEK, 2 DOLLARS PER PULL, OCCURRING BETWEEN 8-9PM TUESDAYS FOR 12 WEEKS, OR UNTIL PLAYER LOSES BANKROLL | N/A | PLAYER LOST BANKROLL | 0 | N/A |
| C444 | P888999 | $100 | 90 MINUTES OF PLAY, 50 CENTS PER PULL | N/A | PLAYER ENDS UP WITH $120 | $120 | N/A |
| C555 | P111000 | $200 | 63 CENTS PER PULL, DOUBLE BETS FOR TWO PULLS AFTER ANY WIN, STOP AFTER JACKPOT, LOSS INSURED BEYOND $200 | $20 | 2 MINUTES LEFT AND PLAYER IS AT $213 | UNDETER-MINED | UNDETER-MINED |
| TOTAL OWED THE INSURER: $75 2345 | | | | | | | |

FIG. 23

2500

| 30 MINUTE GAME SESSION PAY TABLE | | |
|---|---|---|
| WINNING GAME OUTCOME | AWARD | |
| | CREDIT AWARD | TIME AWARD |
| PAIR - LESS THAN JACKS OR BETTER | N/A | 1 MINUTE |
| PAIR - JACKS OR BETTER | PAYS 1 COIN | N/A |
| TWO PAIR | PAYS 2 COINS | N/A |
| THREE-OF-A-KIND | PAYS 3 COINS | 1 MINUTE |
| STRAIGHT | PAYS 4 COINS | 1 MINUTE |
| FLUSH | PAYS 6 COINS | 5 MINUTES |
| FULL HOUSE | PAYS 9 COINS | 10 MINUTES |
| FOUR-OF-A-KIND | PAYS 25 COINS | 15 MINUTES |
| STRAIGHT FLUSH | PAYS 50 COINS | 30 MINUTES |
| ROYAL FLUSH | PAYS 800 COINS | N/A |

FIG. 25

METHOD AND APPARATUS FOR OFFERING A FLAT RATE GAMING SESSION WITH TIME EXTENSION AWARDS

CROSS-REFERENCE TO RELATED APPLICATIONS

This application claims the benefit of priority of U.S. Provisional Patent Application Ser. No. 60/627,670, filed on Nov. 12, 2004 and entitled GAMING DEVICE OFFERING A FLAT RATE PLAY SESSION AND METHODS THEREOF, the contents of which is hereby incorporated by reference in its entirety herein for all purposes;

and

U.S. Provisional Patent Application Ser. No. 60/679,138 filed on May 9, 2005 and entitled SYSTEMS, METHODS, AND APPARATUS FOR FACILITATING A FLAT RATE PLAY SESSION ON A GAMING DEVICE, the contents of which is hereby incorporated by reference in its entirety herein for all purposes.

The present application is also a continuation-in-part of U.S. patent application Ser. No. 10/778,984 filed on Feb. 13, 2004 now U.S. Pat. No. 7,740,534 and entitled SYSTEM AND METHOD ENABLING EXTENSION OF A TIME ELEMENT IN A GAME, which claims priority to U.S. Provisional Patent Application No. 60/447,350, filed Feb. 13, 2003, and entitled SYSTEM AND METHOD ENABLING EXTENSION OF TIME ELEMENTS IN WAGERING GAME, the content of both applications which is hereby incorporated by reference in its entirety.

FIELD OF THE INVENTION

The present invention relates to game playing apparatus and methods, and in particular to wagering methods that provide flat rate pricing for a gaming session of predetermined duration.

BACKGROUND OF THE INVENTION

Gaming has become an increasingly important industry in the United States and around the world. In games of chance, a player typically places a wager on one or more games, and receives a payout or loses the wager based on the outcome of the game and/or the wager. Examples of devices for games of chance include, without limitation, video poker gaming machines, mechanical slot machines, and video slot machines. These gaming devices use random numbers to develop game outcomes.

Traditionally, players making a wager to receive a single game outcome, and after each game outcome, must make an additional wager to receive another game outcome. Consequently, each game is purchased on an individual basis. This individual wagering on each game outcome presents a less than optimum wagering methodology.

SUMMARY OF THE INVENTION

It would be advantageous to allow players to purchase a flat rate gaming session of predetermined duration to simplify the purchase of game play on a gaming device.

In accordance with one embodiment, the flat rate gaming session may be purchased by means of purchasing a contract from a casino, wherein the contract specifies terms such as, for example, a price to be paid by the purchaser for the contract, a duration of play of a gaming device, and a threshold of credits above which the player may collect winnings from a gaming device. The terms of the contract may be determined based on player-selected price parameters and/or operator controlled price parameters. In some embodiments, such a contract may involve a third party that acts as an insurer.

In one embodiment, a gaming session is determined that includes the method of identifying at least one price parameter, determining a flat rate price based upon the at least one identified price parameter, and initiating a flat rate gaming session of the gaming device upon receiving an indication of payment of the flat rate price.

The flat rate gaming session spans a pre-established duration. Duration may comprise a specified amount of time and/or a specified number of game plays (e.g., handle pulls of a slot machine).

In addition, it would further be advantageous to include in the contract a means for awarding players time extensions to the predetermined contract duration. Time extensions may be an award in lieu of a monetary award or in addition to a monetary award. The time extension award provides an additional competitive measure of the player's success and embellishes game play to provide greater entertainment value for the player. Consequently, pay tables that traditionally only contain monetary awards for game play, may now be constructed with time awards for winning game outcomes. Alternatively, separate monetary pay tables and time pay tables may be constructed.

A time extension is added to the duration remaining in the gaming session. The time extension may be added directly onto the gaming session time meter or may be maintained on a separate time meter.

In another embodiment, a time extension may be awarded that is not associated with a specific game outcome. Rather, the time extension may be provided to the player as part of a promotional bonus, as a complementary gift from the casino, as part of a loyalty program from the gaming establishment, etc. This time extension may be provided in connection with game play on a specific gaming machine or potentially on any of the gaming machines in the casino.

BRIEF DESCRIPTION OF THE DRAWINGS

Various embodiments of the present invention are described herein with reference to the accompanying drawings. In the drawings, like reference numerals indicate identical or functionally similar elements. The leftmost digit(s) of a reference numeral typically identifies the figure in which the reference numeral first appears. As will be understood by those skilled in the art, the drawings and accompanying descriptions presented herein indicate some exemplary arrangements. Similarly, the illustrated entries represent exemplary information, but those skilled in the art will understand that the number and content of the entries can be different from those illustrated herein. A brief description of the drawings follows.

FIG. 4 is a schematic view of a casino player database of the server of FIG. 3;

FIG. 5 is a schematic view of the flat rate database of the slot machine of FIG. 2;

FIG. 6 is a schematic view of the payout table of the slot machine of FIG. 2;

FIG. 7 is a schematic view of the calculation table of the slot machine of FIG. 2;

FIG. 14 is a schematic view of the flat rate price package database of the slot machine of FIG. 2;

FIG. 21 is a table illustrating an embodiment of the player database stored in the casino server of FIG. 17;

FIG. 22 is a table illustrating an embodiment of the gaming device database stored in the casino server of FIG. 17;

FIG. 23 is a table illustrating an embodiment of the contract database stored in the casino server of FIG. 17;

FIG. 25 is a pay table illustrating both monetary awards and time awards for a typical video poker game.

DETAILED DESCRIPTION OF PREFERRED EMBODIMENTS

Certain preferred embodiments of the present invention will now be described in greater detail with reference to the drawings. Although the embodiments discussed herein are directed to reel slot machines, it should be understood that the present invention is equally applicable to other gaming devices, such as video poker machines, video blackjack machines, video roulette, video keno, and the like.

The present invention is directed generally to a method and apparatus for operating a gaming device having a flat rate play session. As used herein, flat rate play session is defined as a period of play wherein the player need not make funds available for any play during the play session. The flat rate play session spans multiple plays of the gaming device. These multiple plays are aggregated into intervals or segments of play. It is to be understood that the term interval as used herein could be time, handle pulls, and any other segment in which slot machine play could be divided. For example, two hours, one hundred spins, fifty winning spins, etc. A player enters player identifying information and player-selected price parameters at a gaming device. The price parameters define the flat rate play session, describing the duration of play, machine denomination, active jackpots, etc. The gaming device stores the player-selected price parameters and proceeds to retrieve the flat rate price of playing the gaming device for the flat rate play session. The player-selected price parameters, in combination with operator price parameters, determine the flat rate price. Should the player decide to pay the flat rate price, the player simply deposits that amount into the gaming device or makes a credit account available for the gaming device to debit. For example, it might cost twenty-five dollars to play for half an hour.

Once the player initiates play, the gaming device tracks the flat rate play session and stops the play when the session is completed, usually when a time limit has expired. During the play session, the player is not required to deposit any coins. Payouts are made either directly to the player in the form of coins or indirectly in the form of credits to the credit balance stored in the machine. It should be understood that the player balance could be stored in a number of mediums, such as smart cards, credit card accounts, debit cards, and hotel credit accounts.

Figure 1:
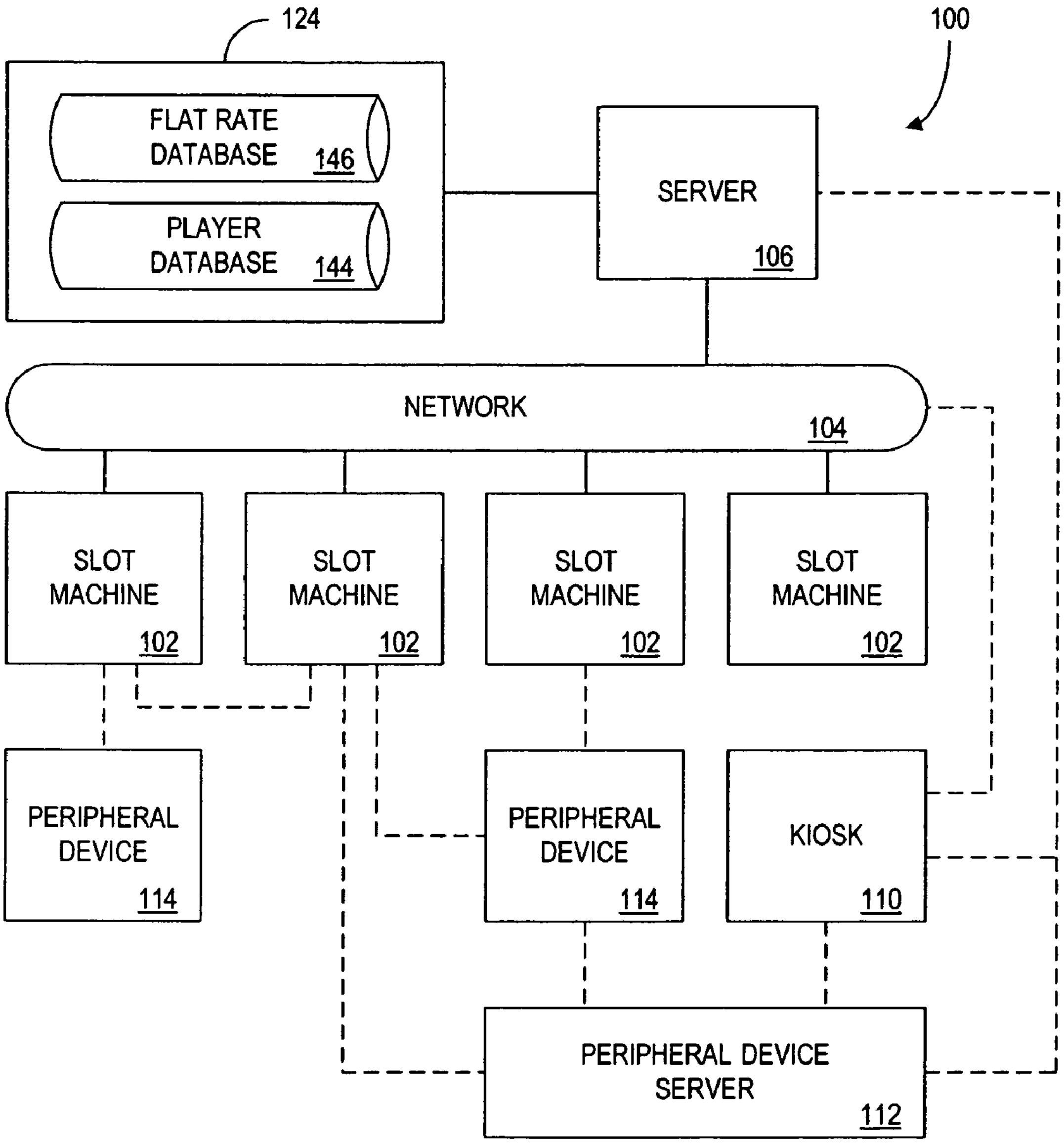
FIG. 1 is an overall schematic view of a system according to one embodiment of the present invention, including a slot machine and a slot network server.

With reference to FIG. 1, a system 100 according to one embodiment of the present invention is shown. In general, the system 100 comprises multiple slot machines 102 and a slot network server 106. In the present embodiment, each slot machine 102, which is uniquely identified by a machine identification (ID) number, communicates with the slot network server 106 via a slot network 104. The slot network 104 is preferably a conventional local area network controlled by the server 106. It is to be understood, however, that other arrangements in which the slot machines 102 communicate with the server 106 are within the scope of the present invention.

As will be described in greater detail below, in one embodiment, the slot machine 102 communicates player identifying information to the slot network server 106. The slot network server 106, in turn, verifies the player identifying information.

The slot server network 116 may have a data storage device 124 for storing data in a flat rate database 146 and a player database 144. The data storage device 124 may also contain additional databases related to player tracking as well as information related to contract pricing of flat rate gaming sessions. A kiosk 110 may also be available for obtaining contracts and contract information for flat rate gaming sessions. A peripheral device server 112 may be available to provide additional communication capabilities between peripheral devices 114. These peripheral devices 114 may include player tracking devices, additional screen displays, ticket readers and printers, etc.

The slot machine 102 also calculates a flat rate price based on both player-selected and casino determined price parameters and displays the flat rate price to the player. The player may then accept the flat rate price and initiate play. In another embodiment, the present invention may be practiced without server 106, in an arrangement in which the slot machine 102 calculates the flat rate price.

Figure 2A:
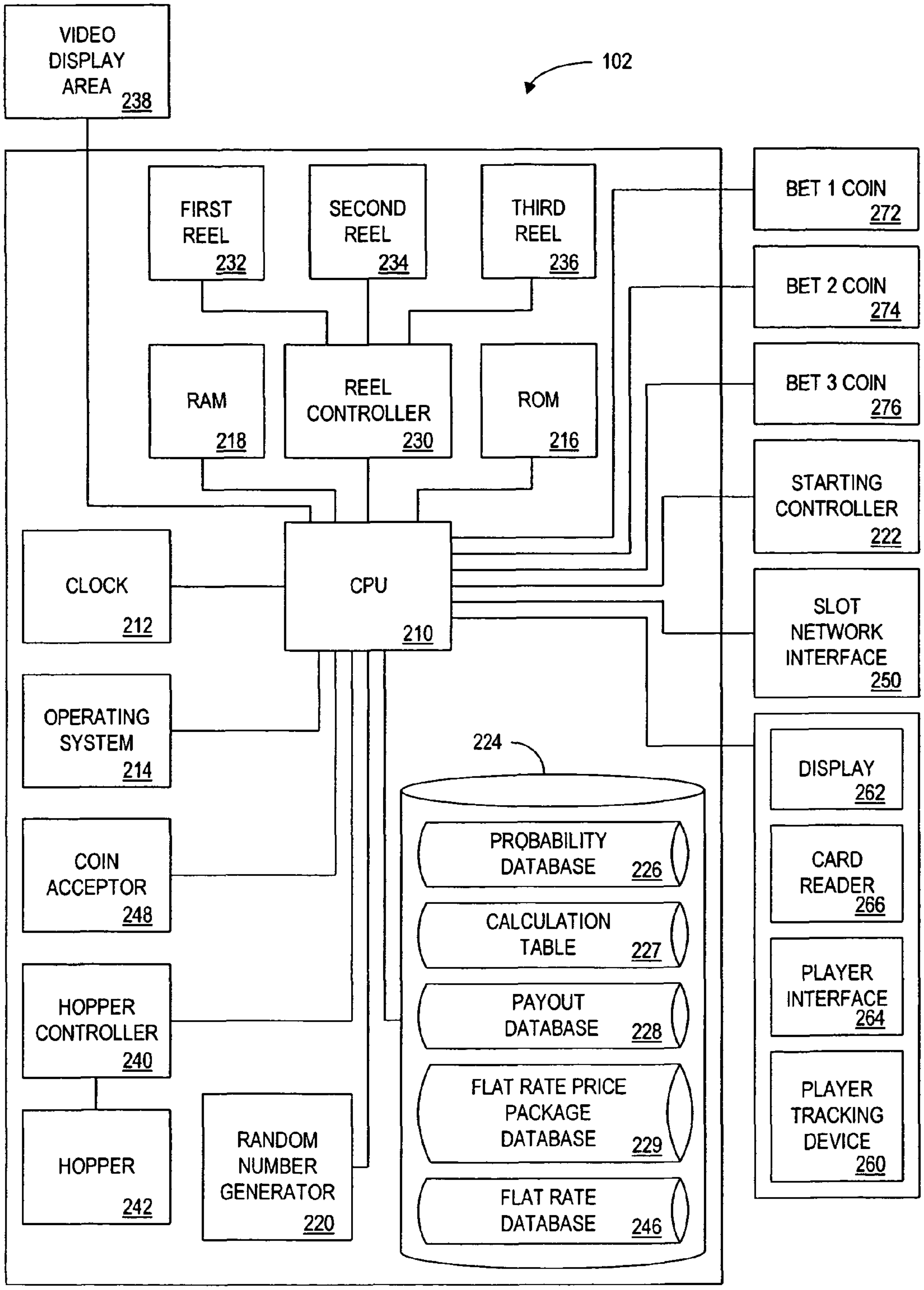
FIG. 2*a* is a schematic view of the slot machine of FIG. 1.

With reference to FIG. 2*a*, the slot machine 102 will now be described in greater detail. The slot machine 102 contains a Central Processing Unit (CPU) 210, a clock 212, and an operating system 214 (typically stored in memory as software). The CPU 210 executes instructions of a program stored in Read Only Memory (ROM) 216 for playing the slot machine 102. The Random Access Memory (RAM) 218 temporarily stores information passed to it by the CPU 210 during play. Also in communication with the CPU 210 is a Random Number Generator (RNG) 220.

With respect to gaming operations, the slot machine 102 operates in a conventional manner. The player starts the machine 102 by inserting a coin into coin acceptor 248, or using electronic credit, and pressing the starting controller 222. Under control of a program stored, for example in a data storage device 224 or ROM 216, the CPU 210 initiates the RNG 220 to generate a number. The CPU 210 looks up the generated random number in a stored probability table 226, which contains a list, which matches random numbers to corresponding outcomes, and finds the appropriate outcome. Based on the identified outcome, the CPU 210 locates the appropriate payout in a stored payout table 228. The CPU 210 also directs a reel controller 230 to spin reels 232, 234, 236 and to stop them at a point when they display a combination of symbols corresponding to the appropriate payout. When the player wins, the machine stores the credits in RAM 218 and displays the current balance in video display area 238. In an alternate embodiment, the slot machine 102 dispenses the coins to a payout tray (not shown), and in another embodiment, the slot network server 106 stores the player credits.

A hopper controller 240 is connected to a hopper 242 for dispensing coins. When the player requests to cash out by pushing a cashout button (not shown) on the slot machine 102, the CPU 210 checks the RAM 218 to see if the player has any credit and, if so, signals the hopper controller 240 to release an appropriate number of coins into a payout tray (not shown). A coin acceptor 248 is also coupled to the CPU 210. Each coin received by the coin acceptor 248 is registered by the CPU 210.

In alternate embodiments, the slot machine 102 does not include the reel controller 230 and reels 232, 234 and 236. Instead, a video display area 238 graphically displays representations of objects contained in the selected game, such as graphical reels or playing cards. These representations are preferably animated to display playing of the selected game.

Also in communication with the CPU 210 is a player tracking device 260. The tracking device 260 comprises a card reader 266 for reading player-identifying information stored on a player-tracking card. As used herein, the term player identifying information denotes any information or compilation of information that uniquely identifies a player. In the present embodiment, the identifying information is a player identification (ID) number. Although not so limited, the player-tracking card of the present embodiment stores the player ID on a magnetic strip located thereon. Such a magnetic strip and device to read the information stored on the magnetic strip are well known.

The player-tracking device 260 also includes a display 262 and a player interface 264. The player interface 264 may include a keypad and/or a touchscreen display. In operation, as discussed below, the slot machine 102 displays a message prompting the player to enter player-selected price parameters. In the present embodiment, a player may enter the player-selected price parameters via the player interface 264. Because the player interface 264 is part of the tracking device 260, it is, therefore, in communication with the CPU 210. Alternatively, input of selected price parameters may be accomplished through video display area 238 if it is configured with touch screen capabilities.

The slot machine 102 also includes a series of bet buttons 272, 274, 276. The bet buttons include "Bet 1 coin" 272, "Bet 2 coins" 274, and "Bet 3 coins" 276. The bet buttons 272, 274, 276 are coupled to the CPU 210. Therefore, pressing one transmits a signal to the CPU 210 indicating how much a player is wagering on a given play.

The databases stored in the data storage device 224 include a probability table 226, a calculation table 227, a payout table 228, a flat rate price package database 229, and a flat rate database 246. As discussed in detail below, the flat rate database 246 and the calculation table 227 store information related to the flat rate play session and calculation of the flat rate price, respectively. The flat rate price package database 229 stores information describing different pre-established flat rate packages as custom designed by the casino.

Also connected to the CPU 210 is a slot network interface 250. The slot network interface 250 provides a communication path from the slot machine 102 to slot network server 106 through the slot network 104. Thus, as discussed in detail below, information is communicated among the player-tracking card, player tracking device 260, slot machine 102, and slot network server 106.

Figure 2B:
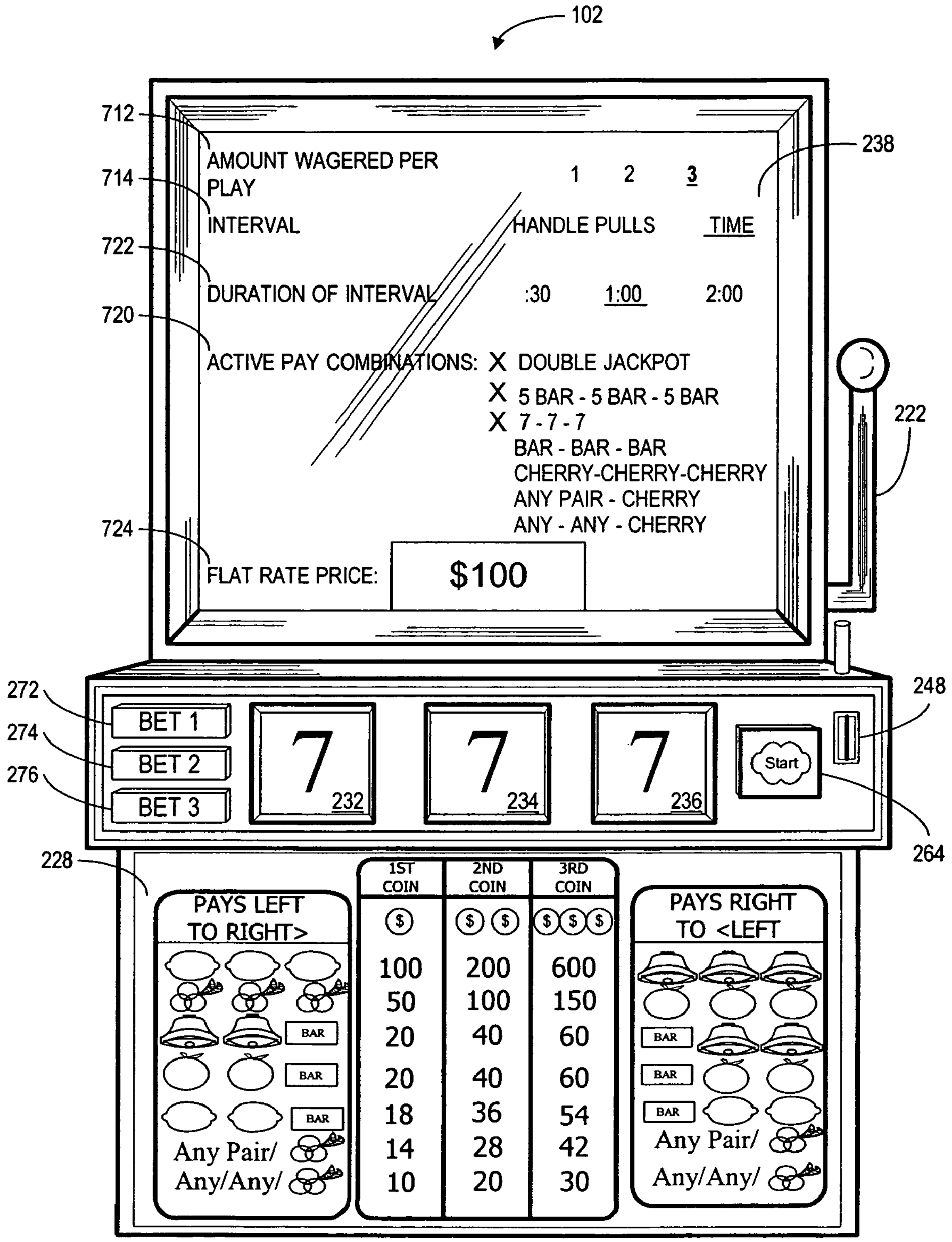
FIG. 2*b* is a plan view of the slot machine of FIG. 1.

With reference to FIG. 2*b*, the plan view of slot machine 102, will now be described below. FIG. 2*b* depicts slot machine 102 displaying player-selected price parameter options on video display area 238. Included in the displayed parameters is the amount wagered per play 712, interval 714, duration of interval 722, and active pay combinations 720. As will be described further below, after the player has selected the desired price parameters, the slot machine 102 displays a flat rate price 724. Once the player has accepted the flat rate price and made the appropriate funds available, play may commence.

Figure 3:
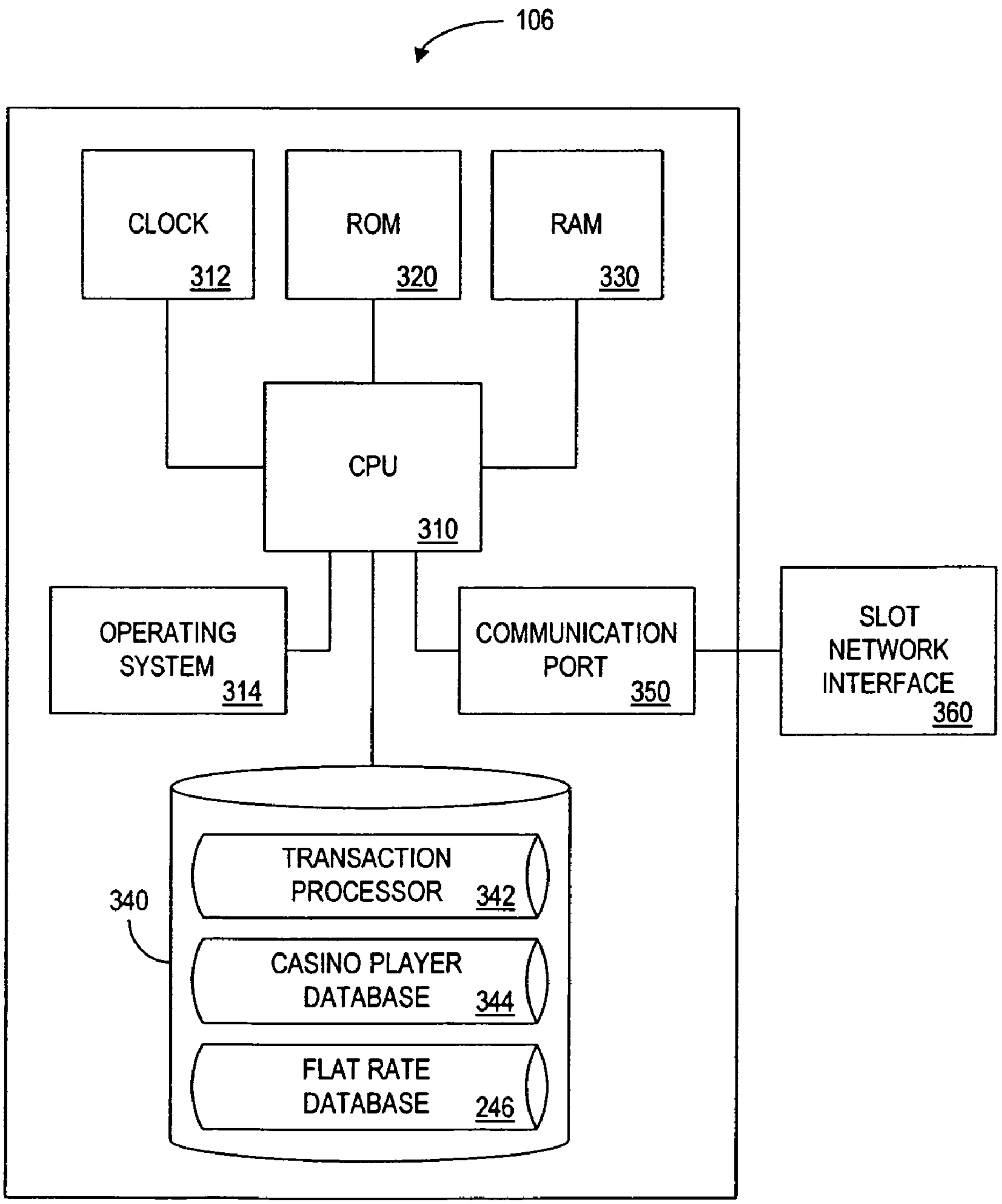
FIG. 3 is a schematic view of the slot network server of FIG. 1.

The slot network server 106 will now be described in detail with reference to FIG. 3. Like the slot machine 102 of FIG. 2, the slot network server 106 has a Central Processing Unit (CPU) 310. The CPU 310, which has a clock 312 associated therewith, executes instructions of a program stored in Read Only Memory (ROM) 320. During execution of the program instructions, the CPU 310 temporarily stores information in the Random Access Memory (RAM) 330.

Additionally, the CPU 310 is coupled to a data storage device 340, having a flat rate database 246, transaction processor 342 and a casino player database 344. In general, the transaction processor 342 manages the contents of the data storage devices 340. As discussed in detail below, the casino player database 344 stores information specific to each player, including player identifying information.

In order to communicate with the slot machines 102, the slot network server 106 also includes a communication port 350. The communication port 350 is coupled to the CPU 310 and a slot machine interface 360. Thus, the CPU 310 can control the communication port 350 to receive information from the data storage device 340 and RAM 330 and transmit the information to the slot machines 102 and vice versa.

It is to be understood that because the slot machines 102 are in communication with the slot network server 106, information stored in a slot machine 102 may be stored in the server 106 and vice versa. Thus, for example, in an alternate embodiment, the server 106 rather than the slot machine 102 includes the payout table 228, flat rate database 246, and/or calculation table 227.

The casino player database 344 of the present embodiment, as shown in FIG. 4, includes multiple records having multiple fields of information. Specifically, the casino player database 344 comprises multiple records, each record being associated with a particular player, as identified by a player identification (ID) number. The fields within each record include the player identification (ID) number 410, social security number 412, name 414, address 416, telephone number 418, credit card number 420, credit balance 422, complimentary information, such as total accumulated complimentary points 424, whether the player is a hotel guest 426, player status rating 428, and value of interval remaining 430. Having information related to one field, such as player ID 410, allows the slot network server 106 to retrieve all information stored in corresponding fields of that player record.

It is to be understood that not all of these identifying fields are necessary for operation of the present embodiment. For example, the name 414, social security number 412, address 416, telephone number 418, credit card number 420, and hotel guest 426 fields are merely representative of additional information that may be stored and used for other purposes. In one embodiment, credit card number 420 and hotel guest 426 are used for billing purposes and social security number 412 is used to generate tax forms when a player wins a jackpot over a given amount.

Complimentary points awarded 424 is further illustrative of additional information a casino may store in a player's record. As described below, a player's complimentary points are displayed to the player when a player-tracking card is inserted into the slot machine 102. In an alternate embodiment, such points may be used in addition, or as an alternative to the credit balance 422 stored in RAM 218 of slot machine 102.

The player status rating 428 contains information representative of the particular player's relative importance to the casino, as based upon the frequency and duration of the player's visits, the amount of money wagered, and the like.

The value of interval remaining field 430 stores the value of interval remaining in a flat rate play session when a player terminates the play session prior to its expiration. This field will be described in detail below.

The flat rate database 246 will now be described in detail with reference to FIG. 5. The flat rate database 246 comprises multiple records, each record pertaining to the flat rate play session of a particular player, as identified by that player's ID number. Consequently, one field in flat rate database 246 is the player ID number field 510. Other fields include player-selected price parameters 512, flat rate price 514, interval remaining 516, time audit data 518, and machine identification (ID) number field 520. The machine ID number field 520 contains the machine ID number that uniquely identifies the slot machine 102. It is to be understood that since both the casino player database 244 and the flat rate database 246 include a player ID field, 410 and 510, respectively, the system 100 can correlate any player information stored in the casino player database 344, with any player information stored in the flat rate database 246.

The payout table 228 will now be described in detail with reference to FIG. 6. As shown in FIG. 6, the payout table 228 of the present embodiment can be logically represented by five fields of related information. The first field, a pay combination field 610, identifies the set of possible pay combinations for a given slot machine 102. Such possible pay combinations include winning pay combinations, or those in which a payout results, and non-winning pay combinations, in which the player receives no payout and consequently loses the amount wagered. Winning pay combinations include, for example, "DOUBLE JACKPOT-DOUBLE JACKPOT-DOUBLE JACKPOT" and "BAR-BAR-BAR." The pay combinations field 610 also includes a "NON-WINNING OUTCOMES" record, an entry representing the outcomes, which result in no payout to the player, such as "PLUM-BELL-ORANGE."

The payout table 228 also includes three payout fields 620, 630, 640. Such payout fields 620, 630, 640 contain the payout information for each of the possible pay combinations identified in the pay combinations field 610. Each of the payout fields 620, 630, 640 is identified by the number of coins wagered on a particular play, as selected via the bet buttons 272, 274, 276. In the present embodiment, payout table 228 contains a "1 coin" payout field 620, which is accessed when one coin is wagered, a "2 coins" payout field 630, which is accessed when two coins are wagered, and a "3 coins" payout field 640, which is accessed when three coins are wagered. In other words, each field 620, 630, 640 corresponds to a bet button 272, 274, 276, respectively. The payout information provides the number of coins won upon the occurrence of a particular pay combination. Thus, "CHERRY-CHERRY-CHERRY" pays out ten coins when one coin is wagered.

Finally, the payout table 228 of the present embodiment includes a pay combination status field 650. The pay combination status field 650 includes an indication for each winning pay combination, identified in the pay combination field 610, of whether the player is eligible to win the payout for each outcome. As will be described below, the determination of whether a player is eligible to win a payout for a given outcome is made by the player as part of the player-selected price parameters.

The calculation table 227 will now be described in greater detail with reference to FIG. 7. The calculation table 227 is used by the system 100 in determining the flat rate price 724 (field 514 in the flat rate database 246) charged to the player. Specifically, the calculation table 227 contains multiple price parameters that are correlated to a flat rate price 724. More specifically, these price parameters include player-selected price parameters and operator selected price parameters. In general, player-selected price parameters include any game related variable that defines the flat rate play session. Furthermore, operator selected price parameters are parameters that the operator of the slot machines 102 selects as affecting the flat rate price 724. Thus, in the present embodiment, the player-selected price parameters in the calculation table 227 include machine type 710, amount wagered per play 712, active pay combinations 720, and length of the flat rate play session 722. The operator selected price parameters in the calculation table 227 include player status rating 714, time of day 716, day of the week 718, and machine usage 719. In the present embodiment, the flat rate price 724 is predetermined based upon the aforementioned price parameters and stored in the calculation table 227, as will be described later in FIGS. 14 and 15. In an alternate embodiment, the flat rate price 724 is calculated based upon these parameters as needed according to a price algorithm stored in memory. For example, the price algorithm may operate as described below.

Algorithm for Calculating a Flat Rate Price.

The are any number of algorithms that could be used to calculate a flat rate price, and they can be generally described as calculating an expected value to the customer and then adding in a margin for the casino or adjusting the price to reflect the time of day, value of the customer, etc.

The first step is to determine a "base" flat rate price. This would be calculated as follows:

Base Price=[(amount wagered)×(interval)]×[(expected coins awarded for all active pay combinations over a cycle/expected coin-in over a cycle)].

The above method is one way to determine the flat rate price of a contract. Alternative methods will also be presented that provide greater incentive for establishing a flat rate play session. These alternative methods for flat rate play can be priced lower because of the mechanics of flat rate game play (i.e., starting at zero credits with the potential to accumulate negative credits). For example, flat rate contract costs can also be calculated using other algorithmic iterative calculations. The iterative algorithm determines the probabilities of achieving any possible credit balance, and then calculates a weighted average over those credit balances that result in a payout to the player. This is one the most precise ways of determining contract cost.

For example, the following Base Price calculation represents a player selecting three dollar coins per handle pull, an interval of 500 handle pulls, and the top three pay combinations active. For this example, we will assume that a complete cycle of the slot machine is 10,648 unique outcomes and that the top three pay combinations would pay 2,160 coins over that cycle. Note also that the expected coins awarded for all active pay combinations over a cycle and the expected coin-in over the cycle should both reflect the same number of coins wagered. Essentially, this ratio reflects the expected monetary return to the payer on a per coin wagered basis. When multiplied by the amount wagered and the number of handle pulls the number reflects the amount of money that the player would be expected to receive from the machine over the interval specified. It should be noted that this amount of money is not necessarily the number of coins entered by the player but rather is the theoretical number of coins of play allowed by the flat rate session. Continuing with the calculation:

| | |
|---|---|
| Base Price | = [($3) × (500)] × [(2,160/10,648)] |
| | = $1,500 × .202855 |
| | = $304.28 |

Note that if the player were to pay this Base Price he would be essentially getting a fair bet for his money. He would pay $304.28 for the session and expect (over the long run) to get $304.28 back in prize money from the top three active pay combinations. Of course, in the short run his results could range from receiving no payouts over the interval to receiving thousands of dollars. Because this base price is a fair bet for the player, the casino may want to add in margin for the house, perhaps by multiplying the base price by a predetermined margin factor such as 50%. In this example the Profit Adjusted Price would thus be:

| | |
|---|---|
| Profit Adjusted Price | = $304.28 × 150% |
| | = $456.42 |

Of course, the casino might want to offer flat rate sessions to players without a casino markup under some circumstances, such as part of a promotional package or to reward a particularly loyal customer. In fact, the casino might even decrease the base price in some circumstances.

The Base Price or (Profit Adjusted Price) could be further modified by various other operator price parameters such as the following:

1. Time of Day (TD)

Times of the day in which the casino traffic tends to be heavy should result in the player paying a premium for the flat rate session, while quiet times in the casino should offer the player a discount over normal rates.

| | |
|---|---|
| Midnight to 4 am | 70% |
| 4 am to 8 am | 80% |
| 8 am to 12 pm | 90% |
| 12 pm to 4 pm | 100% |
| 4 pm to 8 pm | 120% |
| 8 pm to Midnight | 140% |

2. Day of Week (DW)

With the heaviest volume of visitors falling on Fridays and Saturdays, these days will necessitate higher flat rate session costs. For example:

| | |
|---|---|
| Monday to Thursday | 80% |
| Friday | 120% |
| Saturday | 140% |
| Sunday | 100% |

3. Player Status Rating (PSR).

For top customers such as high rollers, the cost of a flat rate session may be reduced as a customer retention tool. For example:

| | | |
|---|---|---|
| 1 | (High Roller) | 80% |
| 2 | (Good customer) | 90% |
| 3 | (Average) | 100% |
| 4 | (Low) | 120% |

4. Slot Machine Usage (SM

When the majority of slot machines in the casino are being used, a premium is applied to the cost of the flat rate play session in order to more evenly distribute play. For example:

| | |
|---|---|
| Heavy | 120% |
| Moderate | 100% |
| Light | 80% |

Sample Calculation.

In addition to the above player-selected price parameters, the following operator selected parameters are incorporated into the price: The player is in the casino at 2 am on a Wednesday, there is low slot machine usage, and the player has an average rating. The calculations below reflect these conditions:

Base Price = $304.28
Final flat rate price = (Base Price) × TD × DW × PSR × SMU
= $304.28 × 70% × 80% × 100% × 80%
= $304.28 × 44.8%
= $136.32

The casino may round up this price to $137 to avoid the need for small change. In the above calculations, the casino might also incorporate floors which prevent the Base Price from going below a level that would be profitable for the house, regardless of the number of positive criteria that were applied to the base price.

Those of ordinary skill in the art will appreciate that modifications could be made to the formula to reflect different kinds of flat rate sessions. For a session with an interval of one hour (instead of a fixed number of handle pulls) the formula might reflect an expected number of handle pulls per hour for that particular game, perhaps even adjusted to reflect the type of player purchasing the flat rate session. For example, an experienced video poker player might be expected to reach 700 hands per hour while a beginner might only be expected to reach 300 hands per hour.

As will also be understood by those skilled in the art, the ultimate goal of many slot machine players is to hit a jackpot payout. The enjoyment of the play, as well as the ability to maximize the chance of hitting a large jackpot, is increased by more play. Play can be increased both by playing longer, and by playing faster. As will be appreciated from a consideration of the process described below, the present invention permits both increased duration, by providing for play at discounted prices, and speed of play, by providing for minimal time delays between plays.

The flat rate price package database 229 will now be described in detail with reference to FIG. 14. The flat rate price package database 229 is used by the system 100 in providing the player with different price package options for flat rate play of the slot machine 102. Specifically, the flat rate price package database 229 contains multiple combinations, or packages 1410, of price parameters that correspond to pre-established flat rate prices. More specifically, these price parameters include but are not limited to, interval 1412, duration of flat rate play 1414, amount wagered per play 1416, and pay combination status 1418. Each combination of price parameters has corresponding flat rate play session prices 1420. As will be described later in FIG. 15, the flat rate price package database 229 is accessed when the player determines he wishes to initiate a flat rate play session. Rather than let the player choose the price parameters, the slot machine 102 lists the different packages stored in the flat rate price package database 229. The player then chooses the package he likes the most and play commences.

Having thus described the components of the present embodiment, the operation of the system 100 will now be described in greater detail with reference to FIGS. 8-11, and continuing reference to FIGS. 1-7. It is to be understood that the programs stored in ROM 320 of the slot network server 106 and ROM 216 of the slot machine 102 provide the function described below.

Figure 8A:
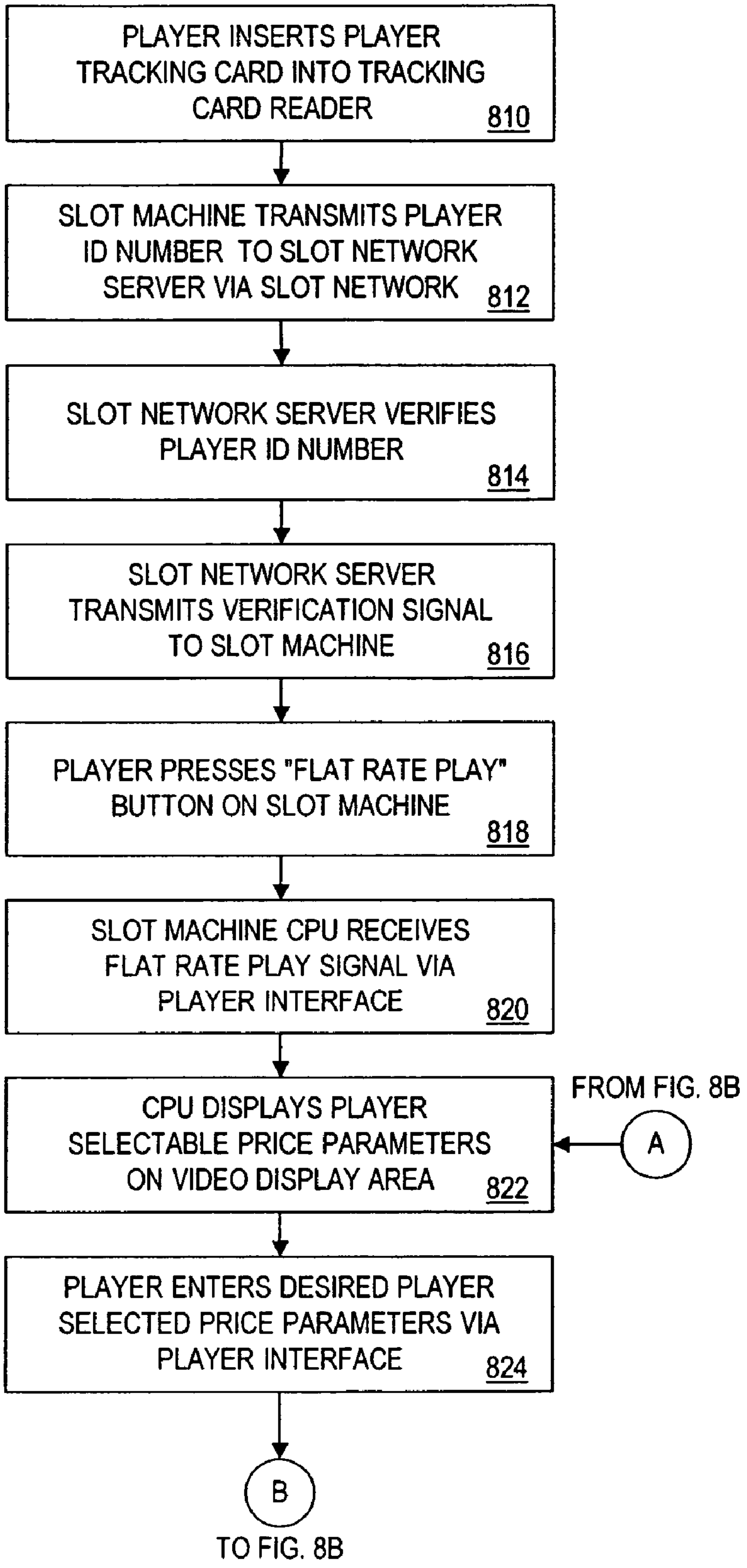
FIGS. 8*a* and 8*b* are overall flow diagrams of the operation of the system of FIG. 1.
Figure 8B:
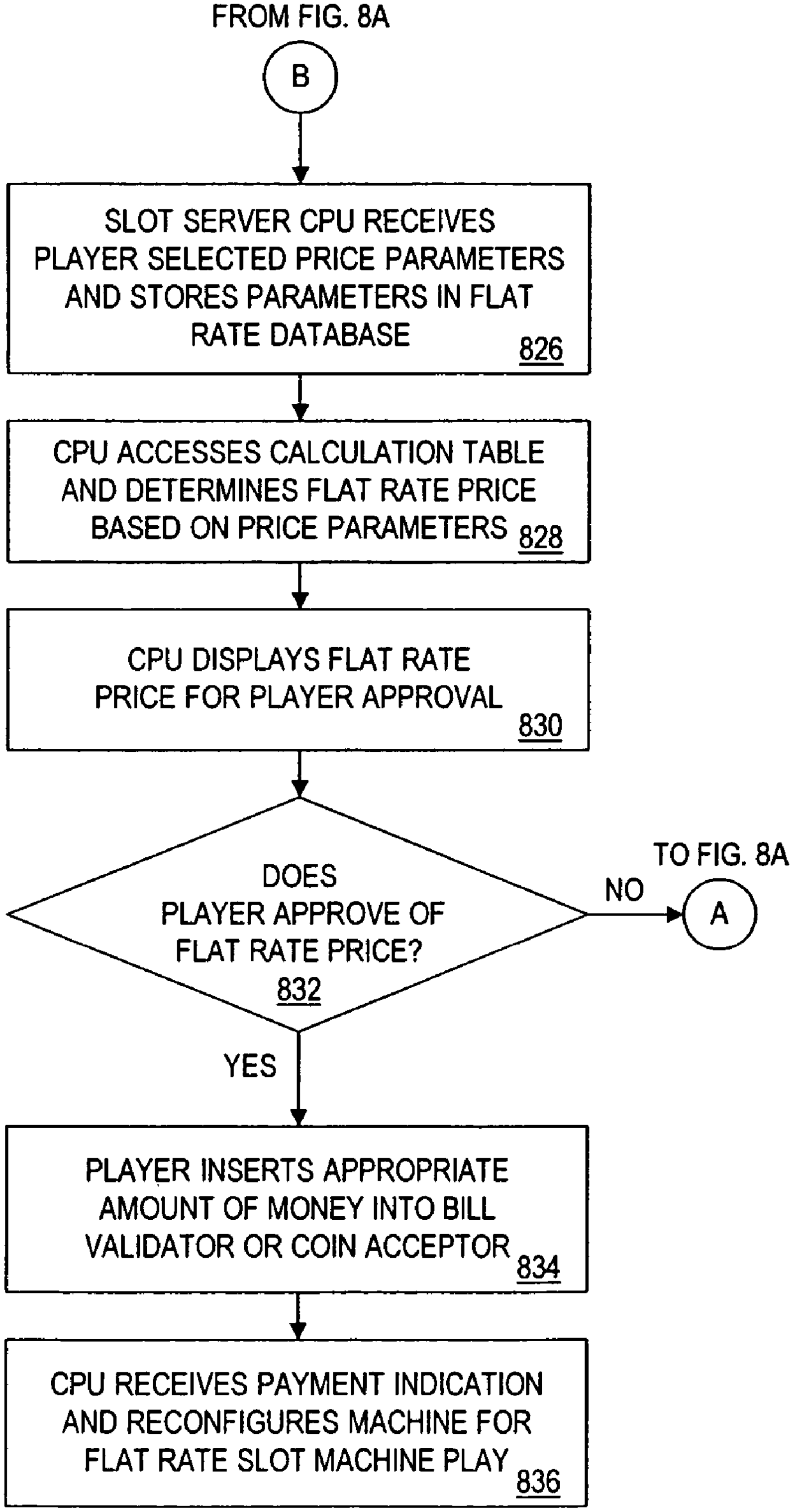

Turning first to FIGS. 8*a* and 8*b*, the general operation of the system 100 will be described. As shown in step 810, the slot machine player first inserts the player-tracking card into the card reader 266. The card reader 266 then proceeds to read player-identifying information from the tracking card. The player identifying information, namely the player ID number, is communicated from the slot machine 102 to the slot server 106 in step 812.

Upon receiving the player identifying information, the slot network server 106 verifies the information in step 814. Such verification includes the slot network server 106 searching the casino player database 344 for a record containing the received player ID number in the appropriate field 410. Once the slot network server 106 verifies the player identifying information, the server 106 transmits a signal to the slot machine 102 acknowledging such verification in step 816. In alternate embodiments, other information, such as the player's name 414, complimentary point total 424, and player status rating 428 are transmitted to the slot machine 102 for display.

In step 818, the player selects flat rate play via the player interface 264. The CPU 210 of slot machine 102, in step 820, then receives a signal from the player interface 264, indicating that the player has selected flat rate play. For example, there could be a button specifically for triggering a flat rate play session. The CPU 210, in response, accesses memory to retrieve player-selectable price parameters. Player-selectable price parameters are the choices available to a player for entering the player-selected price parameters. These player-selectable price parameters are controlled by a program stored in ROM 216. Such player-selectable price parameters, in the present embodiment, include the amount wagered per play, (e.g., one, two, or three coins), the length of the flat rate play session, and possible jackpot structures, such as having only the "DOUBLE JACKPOT" and "5 BAR" jackpots active (as illustrated in the payout table 228 of FIG. 6). In an alternate embodiment, the player-selectable price parameters are stored as part of the calculation table 227.

Then, as shown in step 822, the slot machine 102 displays the player-selectable price parameters to the player. For example, the parameters could be listed on the video display area 238 for the player, as described previously in FIG. 2*b*. Once the parameters appear, the player simply selects his desired settings. Alternatively, the player may accept one or more default settings. Once the player-selectable price parameters are displayed on the display 238, the player proceeds, in step 824, to enter player-selected price parameters via the player interface 264. The player-selected price parameters also include data, which, although not directly inputted by the player, is selected by the player and identified by the slot machine 102. In the present embodiment, such additional player-selected price parameters include type of machine, time of day, type of game played, and day of the week.

It is to be understood that the casino operator of the slot machines 102 may define the scope of the player-selectable price parameters, and therefore limit the player-selected price parameters in any manner. For example, the length of flat rate play may be limited to periods above a minimum time or to periods that are multiples of thirty-minute intervals. The jackpot structure may require that some jackpots remain active.

Referring now to FIG. 8*b*, the slot machine 102 CPU 210 receives the player-selected price parameters in step 826. Having received the player-selected parameters, the CPU 210 then stores the player-selected price parameters, the player identifying information, and the slot machine's machine ID number in a record in the flat rate database 246. Specifically, the player ID number is stored in field 510, the machine ID number is stored in field 520, and the player-selected price parameters are stored in field 512. Although the player-selected price parameters are illustrated as being stored in a single field (512), it is to be understood that each player-selected price parameter may be stored in a separate field. It is also to be understood that in alternate embodiments the player-selected price parameters need not be stored in a database, but could be stored in RAM 218.

The slot machine 102 CPU 210 uses the player-selected price parameters to determine the flat rate prices. Specifically, in step 828, the CPU 210 accesses the calculation table 227 and searches for the flat rate price 724 corresponding to the received player-selected price parameters 512, which, in the present embodiment, include machine type 710, amount wagered per play 712, time of day 716, day of the week 718, active jackpots 720, and the length of the flat rate play session 722. The CPU 210 also incorporates operator selected price parameters for the flat rate price 724 such as player status rating 714 and machine availability 719. As will be appreciated by one skilled in the art, the player status rating 714 is received from the casino player database 344 at any time prior to determination of the flat rate price 724. Thus, in a preferred embodiment, the slot network server 106 transmits the player status rating 428 to the slot machine 102 along with the verification signal in step 816.

By including the player status rating 714 in the calculation table 277, a casino may reward frequent players who wager relatively large amounts of money with a lower flat rate price 724. Thus, the system 100 rewards and encourages frequent play. By including active jackpots 720 in the calculation table 348, the system 100 allows a casino to discount the flat rate price 724 for those players who choose to enable relatively few winning outcomes in the payout table 228. Furthermore, by including the price parameters relating to time of day and day of the week in the calculation table 227, a casino may charge a lower flat rate price 724 for sessions during weekday afternoons or between 2:00 a.m. and 8:00 a.m. in the mornings, thereby encouraging play of the slot machines 102 when they are typically idle.

It is to be understood that the aforementioned price parameters in the calculation table 227 are merely representative of the type of variables that may be considered in determining a flat rate price. Thus, it is within the scope of the present invention to include only some of the price parameters, all of the parameters, or additional parameters in the calculation table 227.

As mentioned above, the flat rate price may be based partly upon the availability of slot machines 102. In such an embodiment, the server 106 tracks whether each slot machine 102 is being used by noting whether outcomes are currently being received from a given slot machine 102. In another embodiment, the server 106 tracks slot machine availability by tabulating the number of slot machines 102 for which flat rate play is currently enabled. In yet another embodiment, the server 106 tracks slot machine availability by identifying how many slot machines 102 have a player-tracking card inserted therein.

Another price parameter, which may be used, is predicted or forecasted slot machine availability. Specifically, such a parameter accounts for anticipated availability of slot machines 102 based upon events at the casino. For example, the calculation table 227 correlates a lower flat rate price 724 to the time of day 716 corresponding to an event, such as a show that many casino players attend. On the other hand, the calculation table 227 correlates a higher flat rate price to the time of day 716 corresponding to the end of the event or heavier casino traffic. This enables a casino to effectively revenue manage their slot machines without resorting to a change in hold percentage, which requires regulatory approval.

It is to be understood that accounting for slot machine availability need not be accomplished in the calculation table 227. Rather, in an alternate embodiment, a schedule of events is stored in RAM 218 that is accessed prior to transmitting the flat rate price 724 to the player. If the event schedule indicates that an event is ending during the requested flat rate play session, then the flat rate price 724 will be incremented accordingly.

In another embodiment, the flat rate price is based only on operator selected price parameters. A slot machine 102 according to such an embodiment could, for example, provide discounted flat rate play sessions based on player status rating, thereby offering 100 plays for the price of 90, or discounted timed sessions. The higher the player status rating, the greater the discount for session play, thereby promoting game play.

Having determined the flat rate price 724, the slot machine 102, in step 830, displays the duration of the flat rate play session 722 and the flat rate price 724 and requests approval from the player. Once the player accepts the terms of the flat rate play session, flat rate play commences.

If the player does not approve the flat rate price 724, then the player indicates so via the player interface 264. As indicated by path A in FIGS. 8*a* and 8*b*, the slot machine 102 repeats its operation from step 822. On the other hand, if the player approves the flat rate price 724, the player indicates such approval via the player interface 264 in step 832. Following such approval, the slot machine 102 prompts the player to enter an appropriate amount of money in step 834. In the present embodiment, the player deposits coins into the coin acceptor 248. In one embodiment, the player deposits a casino token as payment for the flat rate session. Such tokens may be denominated in dollars, or represent a number of handle pulls. A casino could thus sell a fifty-handle pull token, usable on a particular denomination and/or type of machine. Such a token may additionally serve to activate the flat rate session, eliminating the need for the player to select flat rate play via player interface 264. Alternatively, the player's credit balance 422 may be debited to pay for the flat rate play session.

In some embodiments, a casino token may be associated with a particular set of pay combinations that are to be active during a flat rate play session activated via the token. In yet other embodiments a casino token may be associated with (i) a specified duration of time, (ii) a specified number of handle pulls or outcomes, (iii) a specified number of winning handle pulls or outcomes, and/or (iv) a flat rate price package as, for example, described with reference to the flat rate price package database 299 of FIG. 14. A slot machine 102 may identify such a token and enter the appropriate flat rate play session by, for example, the size and/or weight of the token or by reading or receiving information from the token (e.g., via a computer chip embedded in the token or special markings on the token). Such a casino token may be, for example, purchased by a person and given to another person as a gift. The recipient may subsequently use the token by inserting it into an appropriate slot machine and essentially playing for "free" (since the person that gave the gift had prepaid for the token) for a specified duration.

Once the CPU 210 registers the receipt of money, the CPU 210 reconfigures the slot machine 201 for the flat rate play session in step 836. Specifically, the CPU 210 generates a signal, or a flag in memory, indicating that there is no need to accept the coins between plays. CPU 210 further sets the active field 650 in the payout table 228 according to the jackpot structure entered by the player.

Figure 9:
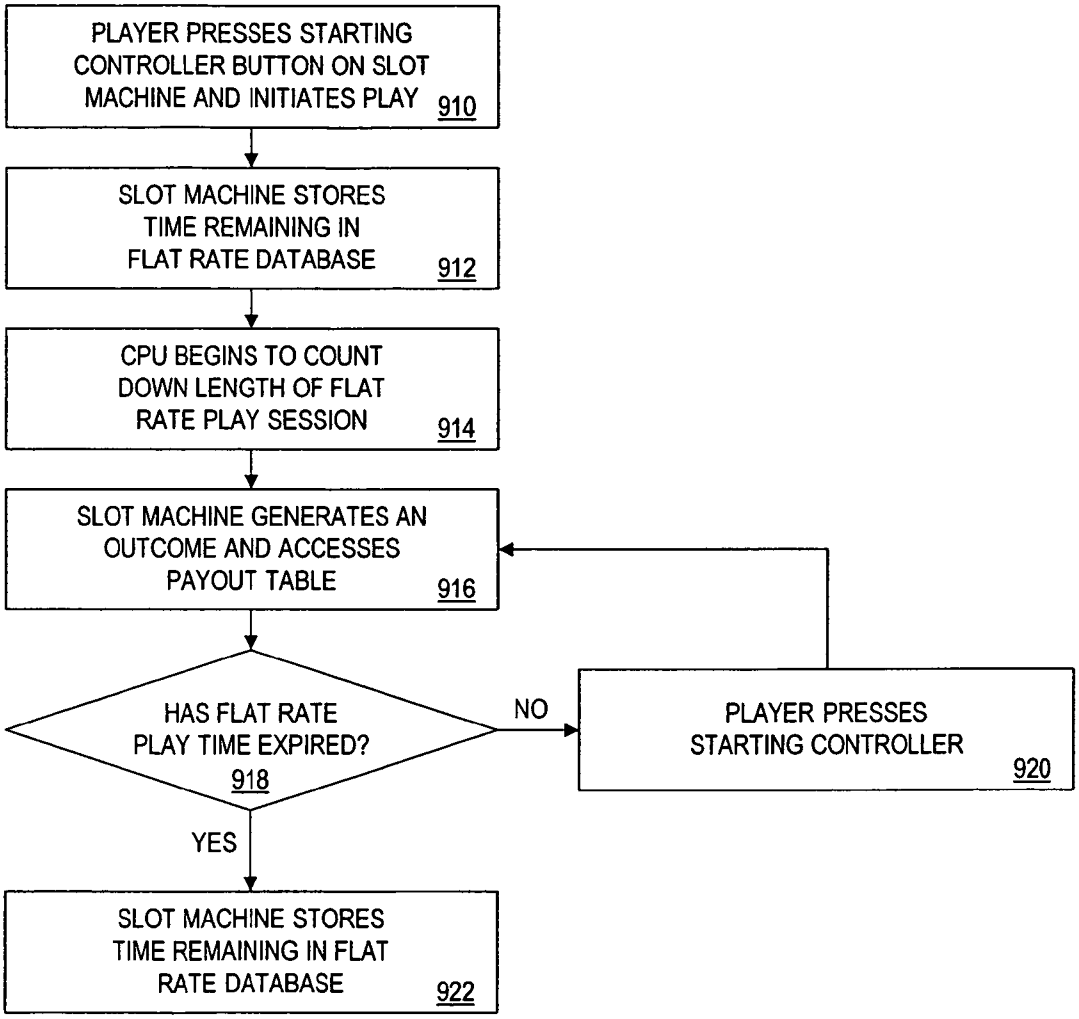
FIG. 9 is a detailed flow diagram of the operation of the system of FIG. 1.

The operation of the slot machine 102 during the flat rate play session will now be described with reference to FIG. 9 and continuing reference to FIGS. 1-7. During the flat rate play session, a slot machine 102 operates generally as described above with reference to FIG. 2. However, the slot machine 102 is reconfigured to operate according to the player-selected price parameters, if such parameters affect play, and to operate continuously, without requiring payment between each play. Specifically, the flat rate play session begins when the player presses the starting controller 222 in step 910. The CPU 210 also initiates a countdown of the length of the flat rate play session as stored in the player-selected parameters field 512 of the flat rate database 246. With the start of the session, the CPU 210 stores the start time of the flat rate play session in the flat rate database 246. Specifically, the start time is stored in the time audit data field 520 in step 912. In step 914, the CPU 210 begins to count down the duration of the flat rate play session. Next, in step 916, the slot machine 102 generates an outcome and accesses payout table 228 to determine the appropriate corresponding number of coins to be paid out.

Furthermore, in step 918, after each outcome is generated, the slot machine 102 determines whether the countdown of the interval remaining 516 has reached zero. It is to be understood that the countdown may be implemented in either software or hardware. Additionally, it is understood that the countdown process discussed herein may be replaced with any suitable means for tracking the duration of the flat rate play session. Interval remaining 516 may also represent the number of handle pulls remaining.

In the event that the countdown has not reached zero, the player presses the starting controller 222 in step 920, thereby initiating another play of the slot machine 102. In the event that the countdown has reached zero, the CPU 210 generates a signal indicating that the flat rate play session has concluded. The slot machine 102 displays a message indicating this to the player and, in step 922, stores the end time of the session in the time audit data field 518 of the flat rate database.

In an alternate embodiment, the player-selected price parameters include the "time between plays." In this embodiment, the CPU 210 of slot machine 102 controls the time between generating outcomes of successive plays in the slot machine 102 to equal the received "time between plays" player-selected price parameter. In another alternate embodiment, the slot machine 102 tracks the number of plays during the flat rate play session. If the number of plays exceeds a predetermined limit, the slot machine 102 automatically terminates the flat rate play session, regardless of the duration of the flat rate play session.

Figure 10:
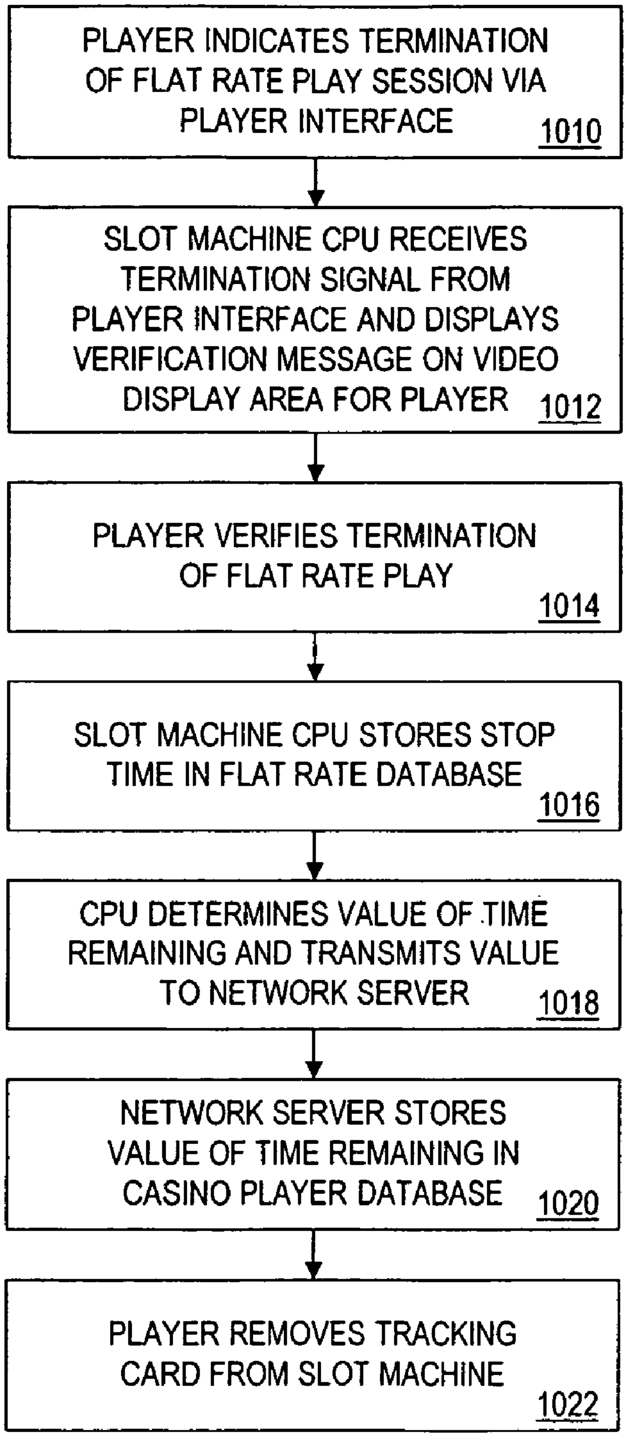
FIG. 10 is a flow diagram of the process of terminating play of the system of FIG. 1.

Turning now to FIG. 10, the operation of the system 100 when the player terminates the flat rate play session prior to the expiration of the session will be described. In step 1010, the player indicates a desire to terminate the flat rate play session via the player interface 264. Consequently, the slot machine 102 CPU 210 receives a termination signal and, in step 1012, displays a message to the player, asking the player to verify termination of the flat rate play session. If the player does not verify termination, then the session continues as described above with reference to FIG. 9. On the other hand, if the player verifies termination, shown as step 1014, the CPU 210 proceeds to store the stop time in the time audit data field 518 of the flat rate database 246 in step 1016.

It is to be understood that having both the start time and the stop time of the flat rate play sessions stored in the flat rate database 246 allows the casino to perform an audit of the session. Specifically, should a player allege that the flat rate play session was shorter than that which was paid for, the casino may access the flat rate database 246 and retrieve the actual start and stop time from the time audit data field 520. In the present embodiment, this time includes an indication of the day, hour, and minute of the play session.

Next, in step 1018, CPU 210 determines the value of the interval remaining in the flat rate play session and transmits the value to the server 106. In order to determine the value of the interval remaining, the CPU 210 accesses the calculation table 227. The value of interval remaining will equal the flat rate price 724 corresponding to the price parameters (i.e., the machine type 710, amount wagered per play 712, player status rating 714, time of day 716, etc.) used to determine the original flat rate price charged to the player. When determining the value of the interval remaining, however, the value in the length of flat rate play session field 722 is not the original length of the session, but rather is equal to the actual interval remaining in the flat rate play session. Stated succinctly, the slot machine 102 identifies the flat rate price 724 corresponding to the actual interval remaining in the flat rate play session.

Once the value of interval remaining is determined, the slot machine 102 transmits the value to the slot network server 106. Upon receiving the value of interval remaining, the server 106 stores the value in field 430 of the casino player database 344 in the player's record, as identified by the player ID number 410. Storing the value is shown as step 1020. Finally, in step 1022, the player removes the player-tracking card.

Figure 11A:
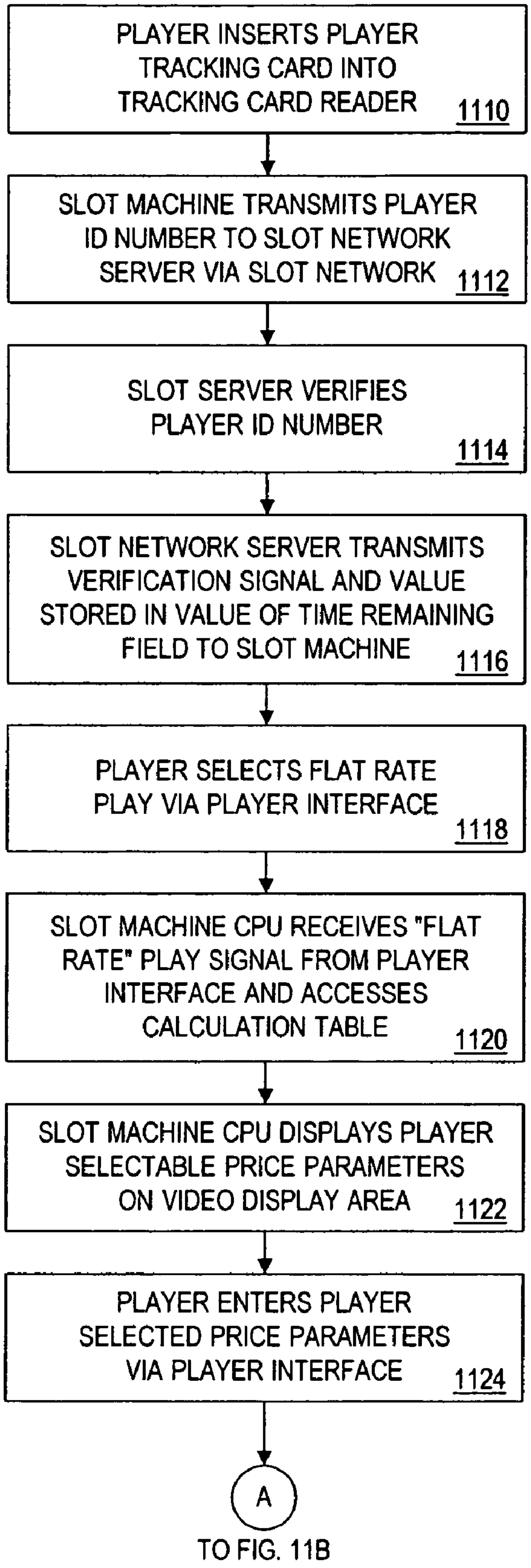
FIGS. 11*a* and 11*b* are flow diagrams of the process of resuming play of the system of FIG. 1.
Figure 11B:
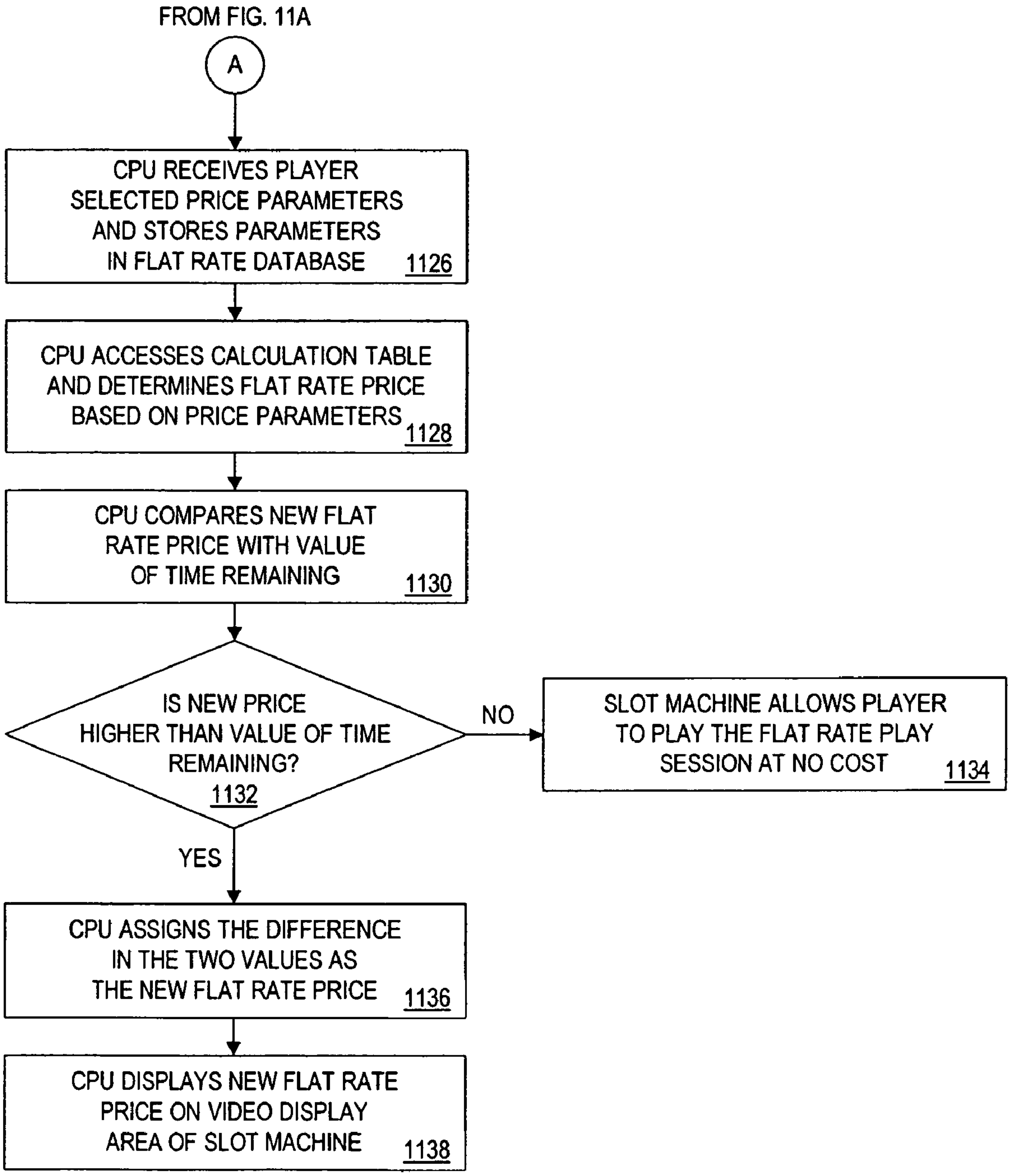

The process of resuming play at another slot machine 102 will now be described with reference to FIGS. 11*a* and 11*b*. The initial operation of the system 100, as indicated by steps 1110-1128, proceeds generally as described above with reference to steps 810-828 of FIGS. 8*a* and 8*b*.

However, once the CPU 210 of slot machine 102 determines a new flat rate price based on the relevant price parameters, the CPU 210 determines whether the player must deposit additional funds.

Specifically, in step 1130, the CPU 210 compares the new flat rate price 724 with the value of interval remaining 430. The server 106 transmits the value of interval remaining 430, as stored in the casino player database 344, to the slot machine 102 in step 1116 so that the comparison may be performed. As indicated by step 1132, the comparison involves determining whether the new flat rate price 724 is higher than the value of interval remaining 430.

If the new price 724 is not higher than the value of interval remaining 430, then, in step 1134, the slot machine allows the player to play the flat rate session at no cost. However, if the new flat rate price 724 is higher than the value of interval remaining 430, then, in step 1136, the CPU 210 assigns the difference in the two values as the new flat rate price. Thus, in step 1138, the CPU 210 displays the new flat rate price on the video display area 238 of the slot machine 102. Thereafter, operation of the system continues as described above with reference to steps 832-836 of FIG. 8*b*.

In an alternate embodiment, when a player terminates the flat rate session early, the value of the interval remaining is added to the players credit balance, as stored in field 422 of the casino player database 344.

Figure 12A:
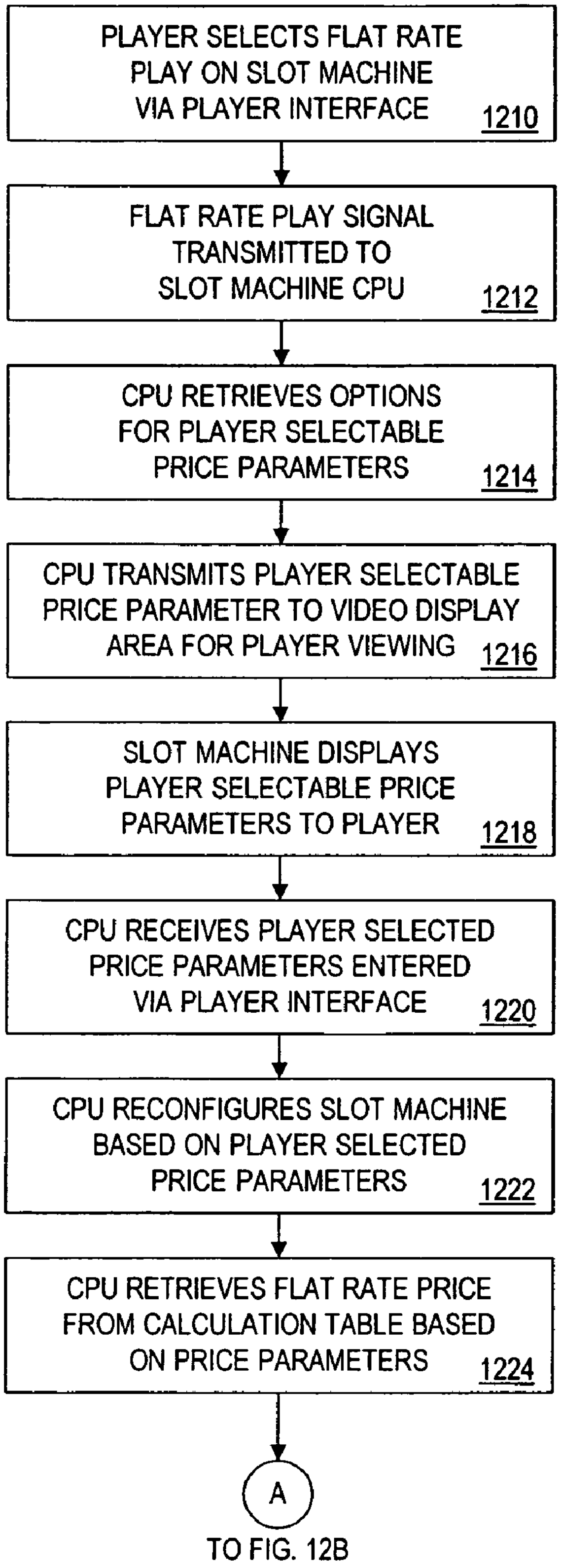
FIGS. 12*a* and 12*b* are overall flow diagrams of the operation of another embodiment of the present invention.
Figure 12B:
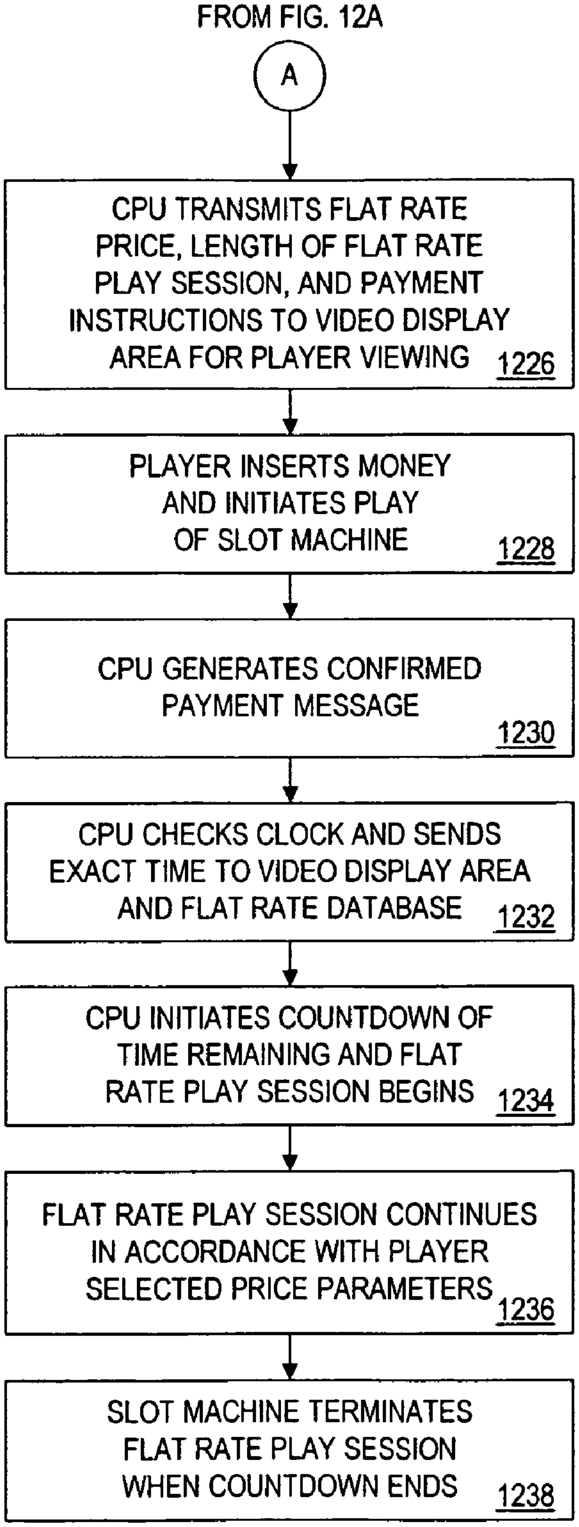

It is to be understood that an embodiment of the present invention need not include both a slot machine and slot network server. For example, an embodiment employing only a slot machine 102 is within the scope of the present invention. Such an embodiment will now be described with reference to FIGS. 12*a*, 12*b*, and 13, and continuing reference to FIGS. 2, 5, and 7. Such an embodiment utilizes the slot machine 102 of FIG. 2.

Initially, the player selects flat rate play on the slot machine 102 in step 1210. Once the player selects flat rate play, the flat rate play signal is transmitted from the player interface 264 to the CPU 210 in step 1212. The CPU 210 then proceeds, in step 1214, to retrieve the player options for selectable price parameters. Then, in step 1216, the CPU 210 transmits the player-selectable price parameter options to the video display area 238 for viewing.

Once the player-selectable price parameter options have been displayed to the player, the player inputs the player-selected price parameters through the player interface 264. Then, in step 1220, the CPU 210 receives the player-selected price parameters from the player interface 264.

Once the CPU 210 receives the player-selected price parameters, the CPU 210 reconfigures the slot machine 102. Specifically, the CPU 210 generates a signal, or a flag in memory, indicating that there is no need to accept the coins between plays. CPU 210 further sets the pay combination status field 650 in the payout table 228 according to the jackpot structure entered by the player. In an alternate embodiment in which the player-selectable price parameters include the time between the handle pulls, the CPU 210 sets an internal timer.

Furthermore, once the slot machine 102 CPU 210 receives the player-selected price parameters; it proceeds to access the calculation table 227. By accessing the calculation table 227, the CPU 210 retrieves the flat rate price for the flat rate play session. Retrieving the flat rate price is shown as step 1224. Once the CPU 210 retrieves the flat rate price, it proceeds to transmit the price, the length of the flat rate play session, and payment instructions to the video display area 238 for player viewing in step 1226.

In step 1228, the player reads the data and instructions on the video display area 238 and inserts money into the coin acceptor 248 or a bill acceptor (not shown) in order to initiate play of the slot machine 102. In an alternate embodiment, the player enters a stored value card such as a "smart card" into the card reader 266. Such a smart card has the players credit balance stored thereon. Payment using a smart card further entails the CPU 210 debiting the player's balance on the smart card by the amount of the flat rate price. Further, the player may enter a credit card into the card reader 266.

In step 1230, the CPU 210 generates a confirmed payment message indicating that the player has deposited sufficient funds to cover the flat rate price. Consequently, the CPU 210, in step 1232, sends the current time to both the video display area 238 and the time audit field 518 of flat rate database 246. Next, in step 1234, the CPU 210 initiates the countdown of the interval remaining in the flat rate play session as stored in field 516. The length of the flat rate play session received from the player is initially stored in field 516. The slot machine 102 decrements, or counts down, this value as the flat rate play session begins.

As shown in step 1236, the flat rate play session continues in accordance with the player-selected price parameters, if such parameters affect play, in step 1236. During such play, the CPU 210 stores and updates the player's accumulated credits in RAM 218. In an alternate embodiment, the slot machine pays out jackpots as they occur. Finally, in step 1238, the CPU 210 terminates the flat rate play session when the countdown ends.

In an alternate embodiment, the interval of the flat rate play session is not a time, but rather is a maximum number of plays. In such an embodiment, the slot machine 102 stores the number of plays in the flat rate database 246, as described previously in FIG. 9, and, in step 916, increments a counter for each outcome generated. The counter may be implemented in either software or hardware. Furthermore, in step 918, the slot machine 102 compares the number of plays stored in the flat rate database 246 to the value of the counter. If the value of the counter equals the stored number of plays, then the flat rate play session is terminated.

Figure 13:
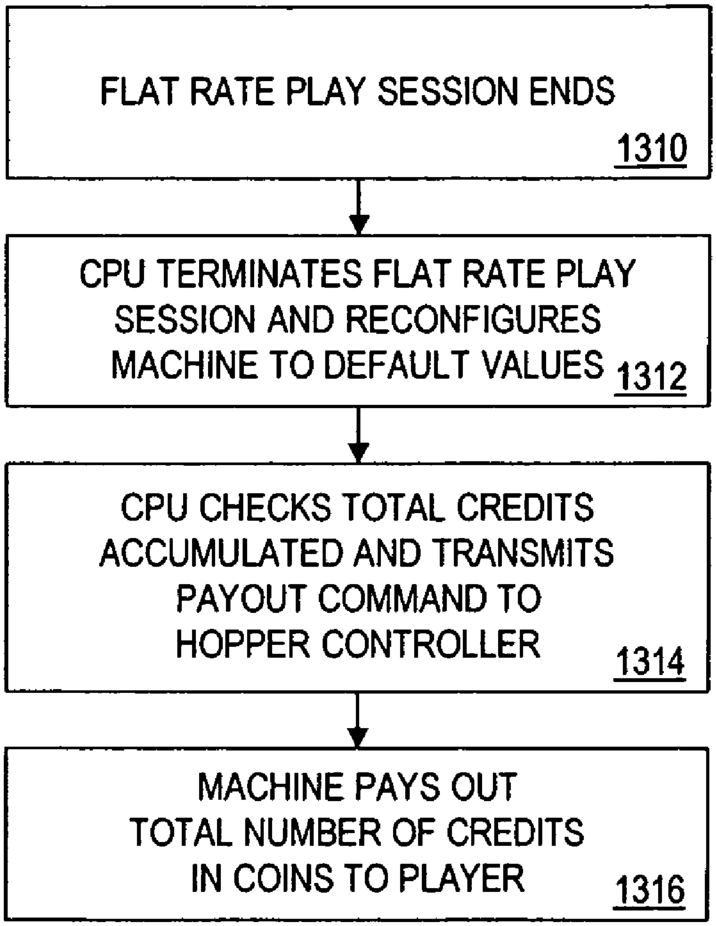
FIG. 13 is a flow diagram of the process of receiving a payout in the embodiment of FIG. 12.

Turning now to FIG. 13, the process of receiving a payout from the present embodiment will be described. As shown as step 1310, the flat rate play session ends upon the termination of the countdown. Specifically, as shown in step 1312, the slot machine 102 CPU 210 terminates the flat rate play session by reconfiguring the slot machine 102 to its default values. For example, the CPU 210 resets the pay combination status field 650 in the payout table 228 to reflect the original jackpot structure. The CPU 210 also generates a signal indicating that coins must be received for each play. In short, the player-selected price parameters are no longer in effect.

In step 1314, the CPU 210 checks the total credits accumulated, as stored in the RAM 218, and transmits a payout command to the hopper controller 240. Consequently, in step 1316, the slot machine 102 pays out the total number of credits to the player.

Figure 15:
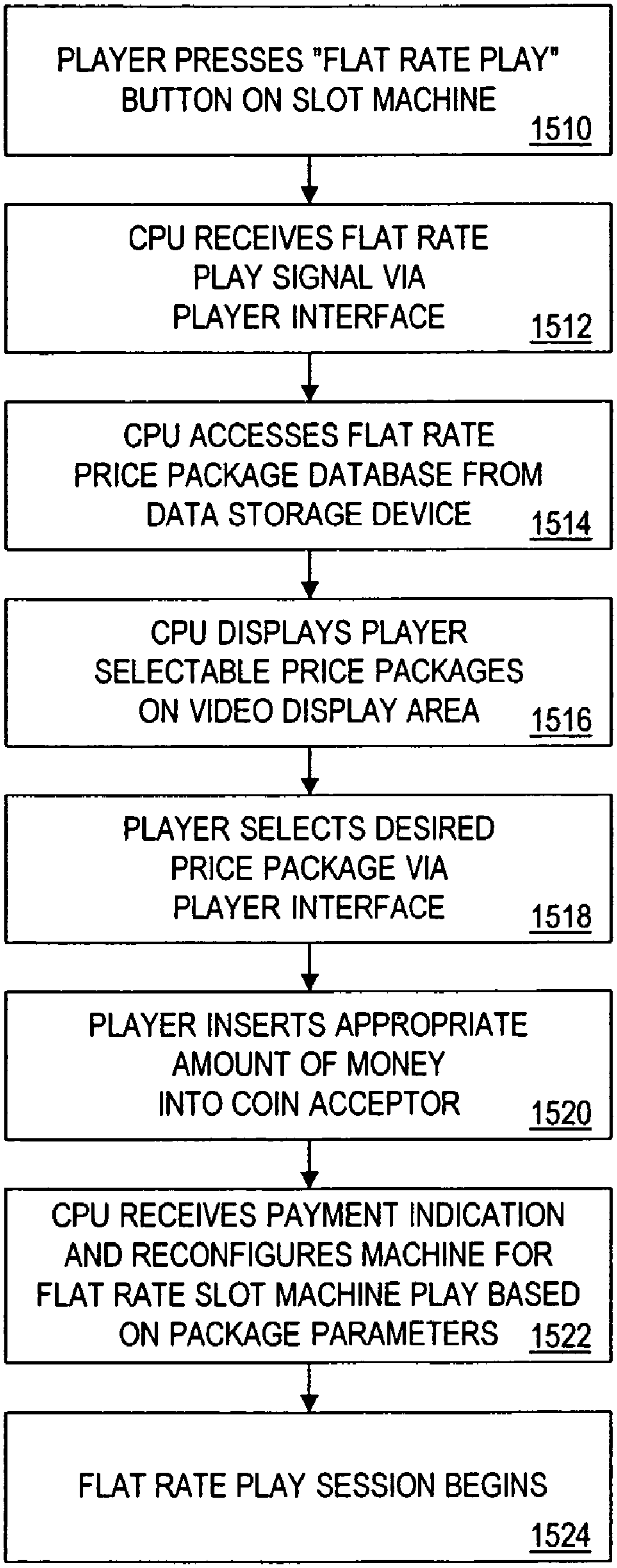
FIG. 15 is an overall flow diagram of the operation of another embodiment of the present invention.

An alternate embodiment of the present invention will now be described with reference to FIG. 15. The operation of slot machine 102, as indicated by steps 1510-1524 below, proceeds generally as described with reference to FIG. 14. In this embodiment, the player selects from a list of casino determined price packages, rather than choosing individual price parameters. Each price package, as stored in the flat rate price package database 229 described above, is a combination of different price parameters that correspond to a flat rate play session price.

In step 1510, the player presses a "flat rate play" button on the slot machine 102. The slot machine 102 CPU 210 receives flat rate play signal from the player interface 264 in step 1512. In this case, the player interface is an actual "flat rate play" button located on the outside of the slot machine 102. Next, in step 1514, the CPU 210 access flat rate price package database 229 from data storage device 224. The CPU 210 then displays the player-selectable price packages on video display area 238 in step 1516. It is to be understood that the CPU 210 need not display the packages on the video display area 238, as those package options could be displayed elsewhere on the body of the slot machine 102. Alternatively, player interface 264 could incorporate several "flat rate play" buttons, each representing a different flat rate price package.

Next, in step 1518, the player selects the desired price package via the player interface 264. Having already seen what the price of the selected package is, the player then deposits the appropriate amount of money into coin acceptor 248 in step 1520. For example, the player may have chosen price package "4" which costs fifty dollars. In return for fifty dollars deposited into the slot machine, the player receives two hundred and fifty handle pulls, with three coins wagered per pull, and with the top three jackpots active in his flat rate play session. These parameters are specified in the flat rate price package database 229.

In step 1522, the CPU 210 receives an indication of payment from the coin acceptor 248 and reconfigures the parameters of slot machine 102 to meet the specifications of the flat rate price package selected by the player. Finally, in step 1524, flat rate play begins.

It is noted that the flat rate price package database 229 could be located at the slot network server 106 and not at each individual slot machine 102. When it is located at the server, certain casino or operator selected parameters could be used to determine the price. For example, there could be different flat rate price packages for different times during the day which are based on projected or actual casino traffic and/or slot machine usage.

As will be appreciated by one of ordinary skill in the art, the key step in getting players to wager money on gaming devices, such as slot machines, is to bring the players to the casino floor. One way in which casinos can bring additional players to the casino floor, and thereby increase total revenues, is by giving away free samples or rewards with a minimum displacement of traditional pay-per-play players. The present invention may be employed for such a purpose.

In one embodiment, for example, the casino could declare a free-play period. During the free-play period, likely chosen by the casino to correspond to down time, when most gaming devices are idle, players insert their player tracking cards into the gaming devices and initiate play without being charged. Specifically, the casino programs the calculation table 227 so that the flat rate price 724 is zero for a given time of day 716 and day of the week 718. It is anticipated that during such a free-play period, the casino will alter the jackpot structure, causing only a selected jackpot to be active. Thus, the lure of free jackpots will bring additional players to the casino floor who will likely continue playing after the free-play period ends. A further benefit of this embodiment is that it would encourage players to become slot club members. This would result in an increase of players who return to the casino and the customer base, which the casino markets to through mailings.

It is also to be understood that play of the slot machines during the free-play period need not occur as described above. Thus, in an alternate embodiment, the reels 232, 234, 236 of the slot machines 102 continuously spin, regardless of whether a player has inserted a tracking card, with the server 106 periodically signaling a jackpot on a random machine. Only when a player has inserted a player-tracking card is the jackpot awarded. The server 106 randomly selects a machine ID number and, if the machine 102 is not being played by a pay-per-play player, the server 106 transmits a signal to that slot machine 102 directing it to produce a winning outcome.

In an alternate embodiment directed to attracting players to the floor during down times, the casino issues guests a player tracking card or a smart card having a predetermined free credit balance. The casino could then restrict the day and time in which the players could use the free card in a flat rate play session. In another embodiment, the cards provided to guests contain an indication of time, rather than money, for use during a flat rate play session.

Although the foregoing embodiments employ a static jackpot structure (i.e., a jackpot that states the same throughout the flat rate play session) it is within the scope of the present invention to employ dynamic jackpot structures, which change during the flat rate play session. In one such embodiment, the dynamic jackpot structure starts with a given number of active jackpots, as indicated in the pay combination status field 650 of the payout table 228. As the flat rate play session progresses, the number of active jackpots changes. Specifically, as the interval remaining in the flat rate play session decreases; fewer pay combinations are made active. In other words, the slot machine 102 CPU 210 monitors the time and, every fifteen minutes, for example, causes the pay combination status field 650 to change from "active" to "inactive" for a given pay combination 610. Alternatively, the CPU 210 changes the pay combination status field 650 after a predetermined number of plays. In a further variation of this embodiment, individual jackpots may be decreased instead of or in addition to being eliminated (e.g., the jackpot for a particular outcome may decrease from 10 coins to 8 coins as the play session progresses).

As will be appreciated by those skilled in the art, a dynamic jackpot structure based on the time progression of the flat rate play session can increase the revenue generated by the slot machines 102. Specifically, such a dynamic jackpot structure could be used with a flat rate play session whose duration is not a fixed time, but rather a given number of plays. Because fewer jackpots will be active as time progresses, players have an incentive to use their fixed number of plays within a short time period. Stated succinctly, the present invention increases speed of play.

In another embodiment, the jackpot structure is dynamic based not on the progression of the flat rate play session, but rather on the outcomes generated by the slot machine 102. One such embodiment involves changing a particular jackpot from "active" to "inactive" upon a player hitting the outcome corresponding to that pay combination. For example, a player may begin the flat rate play session with all jackpots active. On one play, the slot machine 102 generates a "CHERRY-CHERRY-CHERRY" outcome 610. Upon accessing the payout table 228, the CPU 210 determines that ten coins are to be paid out, credits the player's accumulated credits accordingly, and causes the pay combination status field 650 corresponding to the "CHERRY-CHERRY-CHERRY" outcome 610 to change from "active" to "inactive". Thus, a player can only hit a given jackpot once. As will be appreciated by those skilled in the art, such a dynamic jackpot structure will allow slot machine operators to further discount the flat rate price to attract additional players. Furthermore, it is anticipated that players will be willing to forego hitting the same jackpot multiple times because their focus is typically on hitting the highest jackpot once.

These and other dynamic jackpot structures may be implemented as either a player-selected price parameter or an operator selected price parameter. When implemented as a player-selected price parameter, the dynamic jackpot structure is displayed to the player as a player-selectable price parameter option. The player, in turn, selects it via the player interface 264. When implemented as an operator selected price parameter, the dynamic jackpot structure is displayed for player viewing prior to player approval of the flat rate price. Whether the price parameters are selected by the player or the casino operator, the dynamic jackpot structure affects the flat rate price generally as described above, namely, as a field in the calculation table 227 or as a variable in the price algorithm.

In some embodiments of the present invention, an individual may purchase a flat rate play session as a gift for another person. For example, an individual may purchase one of the available flat rate price packages of FIG. 14. In such an embodiment, the individual purchasing a flat rate play session may be provided with a flat rate play session identifier, which the purchase in turn provides to the gift recipient. The flat rate play session identifier may be stored by the casino in association with the price parameters defining the flat rate play session. Thus, when the gift recipient inserts the flat rate play session identifier into a gaming device, the gaming device may communicate with the casino server to determine the parameters of the flat rate play session and set itself to such parameters. A flat rate play session identifier may be provided on, for example, a gift card that is magnetically or optically encoded with the flat rate play session identifier such that it may be read by a gaming device.

Contract Embodiment

In accordance with some embodiments of the present invention, a flat rate play session may be purchased by means of a contract. According to such embodiments a player at a casino may purchase a contract (e.g., from an insurer, such as the casino or another entity) or similar agreement to use a gaming device, such as a slot machine. Costing a fixed amount, the contract insures the player against the possibility of potentially large losses at the slot machine. In accordance with one such embodiment, upon purchasing the contract, a player credit account is set up at the slot machine. The account may begin with zero credits but may begin with another balance in other embodiments. The player is then allowed a fixed number of handle pulls at the slot machine without requiring the player to insert any money. Each handle pull decreases the player account, typically by decreasing the player account by a predetermined amount (e.g., one credit) for each handle pull. This may cause the number of credits to be negative, but play may continue. If the player achieves a winning outcome, credits can be added to the player account in accordance with the payout for the winning outcome. If, after the fixed number of handle pulls, there are a positive number of credits in the player account, then these may be paid out to the player in the form of cash. If, however, there are less than a predetermined amount of credits (e.g., zero credits) in the player account, then the player receives nothing. The insurer, however, could compensate the casino for, e.g., an amount in the player's account that is less than a predetermined number.

In such an embodiment, the player enjoys the fixed number of pulls without the risk of any loss. The only loss for the player comes from the cost of the contract.

One aspect of this invention is a way to price a contract for a block of pulls to be sold to a player. Pricing a contract may involve calculating the expected amount that would have to be paid a player upon the completion of the pulls. The price of the contract would then typically be greater than this expected amount so as to result in an expected profit possibly to be divided amongst the casino and, if it is a separate entity, an insurer. For example, if a player could be expected to receive $30 upon the completion of 1000 pulls, then the contract for the block of 1000 pulls could by sold for $35.

The following terms are related to flat rate gaming sessions and are used to discuss certain flat rate contract embodiments.

Contract indicator—an object or information by which a gaming device may recognize a contract in order to execute the contract. For example, a player purchases a contract from the gaming establishment and receives a token that serves as a contract indicator. When the player deposits the token in a gaming device, the gaming device recognizes the contract the player has signed up for and executes the contract accordingly.

Execute a contract—to carry out the terms of a contract. A gaming device executes a contract for 200 pulls by generating the 200 outcomes, incrementing and decrementing player credits in accordance with the outcomes, and paying the player, if necessary, at the end of the contract.

Gambling contract—An agreement, in one embodiment, between a player, an insurer, and sometimes a casino (e.g., if different than the insurer) which may have the following exemplary provisions in some embodiments.

- The player, in one embodiment, may pay the insurer a fixed amount up front.
- The player, in one embodiment, may make a predetermined number of handle pulls.
- The player, in one embodiment, may not need to pay any additional money after purchasing the contract, in other embodiments; the player may need to make an additional payment for additional game features.
- The player may, in one embodiment, keep any net winnings after all handle pulls have been completed.
- If the player has a net loss after the handle pulls have been completed, in one embodiment, the loss is paid to the casino by the insurer.

There are many variants of these provisions, and additional provisions are possible. As can be seen, the contract insures a player against excessive losses, and may give the player more handle pulls than would otherwise be possible for the price of the contract. Also, since there may be no additional player decisions required after the player has purchased the contract, the player need not be present for the execution of the contract and may therefore experience the feeling of remote gambling.

Gaming Device—Any electrical, mechanical, or electro-mechanical device that accepts wagers, steps through a process to determine an outcome, and pays winnings based on the outcome. The outcome may be randomly generated, as with a slot machine; may be generated through a combination of randomness and player skill, as with video poker; or may be generated entirely through player skill. Gaming devices may include slot machines, video poker machines, video blackjack machines, video roulette machines, video keno machines, video bingo machines, and the like.

Gross winnings—the total of a player's winnings during the execution of a contract without regard to wagers made by the player. For example, if, after five pulls of a contract, a player has attained one winning outcome with a payout of four coins, and one winning outcome with a payout of 20 coins, then the player's gross winnings thus far are 24 coins. Since gross winnings do not account for wagers a player makes, gross winnings will always be larger than or equal to net winnings.

Handle pull—a single play at a gaming device, including video poker, video blackjack, video roulette, video keno, video bingo, and other devices. The definition is intended to be flexible in that a single play might constitute a single complete game, or a single wager. For example, in video blackjack, a player might play a single game in which he splits a pair of sevens, requiring an additional wager. This one game might thereby constitute either one or two handle pulls.

Net winnings—the total of a player's winnings during the execution of a contract minus the amount spent by the player on wagers. In the example cited under the definition of "gross winnings," the net winnings are 19 coins since the player has won 24 coins but used one coin as a wager on each of the five pulls.

Turning now to a detailed description of the contract embodiments of the present invention, various aspects of such embodiments are set forth below.

Description of the Contract

A typical contract is an agreement between the insurer and a player. The player agrees to pay a fixed amount of money up front. In return, the player may (or must) gamble at a gaming device for a designated amount of time or for a designated number of outcomes. After the player has gambled the requisite amount, the player has the right to keep any winnings that exceed a certain threshold. The player does not, however, pay any losses. Thus, one function of the contract is to insure the player against losses at a gaming device. There are many variations of the contract and a portion of these are described below.

Another function of the contract is to allow a player to play a large number of handle pulls without the need of a large bankroll. For example, a player wishing to make 600 pulls at a quarter slot machine would ordinarily require $150 (25 cents×600) in order to assure himself the ability of completing the 600 pulls. However, a contract might allow a player to make 600 pulls by paying only $20.

In some embodiments, the contract does not involve an insurer. The function of the contract may be to allow outcomes to be generated for the player while the player is not physically present at the gaming device. In these embodiments, the contract may consist mainly of instructions from the player as to how the slot machine should gamble on the player's behalf. For example, the instructions will tell the machine how fast to gamble, when to quit, and then where to send winnings.

Amount of Play

A contract may place, in some embodiments, one or more of the following exemplary restrictions on play covered by the contract.

- The player, in one embodiment, may be required to make a minimum number of handle pulls.
- The player, in one embodiment, may not make more than a maximum number of handle pulls.
- The player, in one embodiment, may be required to play for a certain minimum time period.
- The player, in one embodiment, may be required to play for less than a certain maximum time period.
- The player, in one embodiment, may be required to maintain a minimum rate of play.
- The player, in one embodiment, may be required not to exceed a maximum rate of play.

The total coin-in over the course of the contract, in one embodiment, may be required to exceed a certain minimum amount.

The total coin-in over the course of the contract, in one embodiment, may be required not to exceed a certain amount.

The player, in one embodiment, may be required to play until obtaining a specified outcome.

Coin Denomination

A contract may specify the size of the wager for each pull. The wager size may be the same as that typically used by the gaming device. For example, if a player signs up for a contract at a quarter slot machine, the wager for each pull of the contract might be a quarter. If the slot machine offers multiple coin bets, the wager for each pull might be a quarter, 50 cents, 75 cents etc. The contract may allow or may force the player to vary the wager from pull to pull.

One aspect of a contract may allow all play to occur in "credit mode." That is, the player need not physically insert money into the gaming device prior to each pull, and money need not come out of the gaming device after a player win. Rather, a player's credit balance may be stored in a player database either in the gaming device or at the casino server. Every time the player then makes a handle pull, credits are deducted from the player's balance. Every time the player wins, credits are added to the player's balance. The player's credit balance can be displayed on the device so that the player may track his progress.

Since play may occur in credit mode, each wager might consist of coin denominations that are not standard for the gaming device. For example, a device that typically handles quarters may accept wagers of a nickel, of 40 cents, or even of 12½ cents.

Winnings Threshold

A contract may describe some threshold of gross winnings, net winnings, or accumulated player credits above which the player keeps any excess. Gross winnings describe the accumulated player wins from each pull of the contract. Thus, a player who makes 600 pulls on a $1 slot machine as part of a contract and wins $3 on each of 100 pulls has gross winnings of $300 ($3/pull×100 pulls). Net winnings are the gross winnings less the accumulated costs of wagering. In the above example, the accumulated costs of wagering are $600 ($1/pull×600 pulls). Thus, in the above example, the player's net winnings would be negative $300 ($300–$600). Accumulated player credits may mirror a running tally of a player's net winnings. For example, a player may begin with zero credits, with credits deducted in the amount of any wager, and added in the amount of any winnings. Accumulated player credits may also mirror a running tally of gross winnings, or any other statistic about a player's performance.

At the end of a contract, a player's accumulated credits may be compared to a threshold. The player may then receive a payout of any excess accumulated credits above the threshold. For example, if the threshold is zero, and the player has 44 credits, each credit representing 25 cents, then the player receives a payout of $11 (44 credits×25 cents/credit). If the player had –12 credits, indicating a net loss of 12 credits, then the player receives nothing. The player does not owe $3 because the contract does not make the player responsible for any losses.

The threshold might be at 10 credits, in which case a player with accumulated credits of 30 would receive a payout equivalent to 20 credits at the end of a contract, and a player with six credits would receive nothing. A threshold might be at –10 credits, in which case a player with accumulated credits of –6 would receive the equivalent of 4 credits, while a player with –100 credits would receive nothing.

Rather than insuring against all of a player's losses, a contract might insure all losses up to a point and not beyond. Therefore, a contract may have multiple thresholds, each with different functions. A player may, for example, be responsible for any losses beyond a threshold loss of 100 credits. The same player might receive any winnings beyond a threshold of 10 accumulated credits. Thus, if, at the end of the contract, the player has accumulated –125 credits, then the player must pay 25 credits. If the player has accumulated 33 credits, then the player receives a 23 credit payout. If the player has accumulated –49 credits, then the player neither owes nor receives anything.

In some embodiments, a threshold delineates a change in the percentage of a player's winnings or losses between credit tallies above and below the threshold. For example, a player might keep any credits won beyond a threshold of 50. Below 50 credits, the player only keeps 80% of his winnings. Therefore, if a player has 70 credits remaining at the end of a contract, he keeps all 20 credits above 50, and he keeps an additional 40 credits, representing 80% of the first 50 credits. Therefore, the player keeps 60 credits in total.

A player may also be responsible for a percentage of losses above or below a certain threshold. For example, a player may be responsible for 50% of losses over 10 credits. Thus, a player who finishes a contract with minus 20 credits owes nothing for the first 10 credits of loss, but owes 5 credits for the next 10 credits of loss. The player therefore owes 5 credits.

In the most general sense, a contract specifies a functional relationship between what a player's accumulated credits are at the end of the contracted number of pulls, and what the player either owes or is due. The function may be piece-wise linear, or may be rather non-linear and convoluted.

Where there is potential for a player to owe money at the end of a contract, the player may be required to deposit money into the gaming device in advance so as to prevent the player from walking away when he owes money. The advance payment may later be returned if the player turns out to owe nothing at the end of the contract.

In many embodiments, a contract is transparent to the casino. In other words, if the player makes a certain number of pulls, the casino makes the same amount of money whether or not the player happened to be involved in a contract. In these embodiments, however, a casino may collect money that it makes (and the player has lost) from the insurer, rather than from the player. The casino may also act as an intermediary in transactions between the player and the insurer. For example, the casino may collect from the player money that is meant to pay for a contract. The casino may then transfer an equivalent amount of money to the insurer.

In other embodiments, a contract is not completely transparent to the casino. That is, the amount of money a casino receives after a certain number of the player's handle pulls may depend on whether or not the player was in a contract. In one example, a casino agrees that if a player's accumulated credits at the end of a contract are less than –200, then the casino will only collect 200 credits for the contract's handle pulls. This example may benefit the insurer, since the insurer does not have to worry about covering player losses in excess of 200 credits. In another example, the casino configures a gaming device to give different odds to a player in contract play versus a player not in contract play.

Player Decisions

As mentioned previously, players may have some restrictions on the play covered by the contract. For example, a contract may cover an hour's play at a gaming device, but require the player to make between 600 and 800 pulls in that hour. In some embodiments, however, contracts may allow players to quit early or to play more than is otherwise covered by the contract. For example, a contract might cover an hour's worth of play. After the first half-hour, the player may be ahead by $100 and wish to quit without risking the loss of the $100 in the subsequent half-hour. He may therefore opt to pay $20 in order to be released from the obligation of continuing the contract. He may then collect his $100 in winnings.

A player at a gaming device may reach the end of a contract with accumulated credits just short of an amount necessary to collect winnings. However, the last 17 out of 20 pulls may have been wins for the player. The player may feel as if he has some momentum going for him and therefore may not wish that the contract be finished. In some embodiments, the player may extend the contract. For example, the gaming device might prompt the player, saying, "For only $5 more, we'll give you another 200 spins added to your contract." If the player accepts, then the casino or insurer has made a new sale with potential profitability. In some embodiments, the player may be allowed to extend a contract for free, or may even be paid to extend the contract. For example, the player may have winnings of $100 at the end of a contract. The casino, or insurer, may figure that if the player were to keep pulling, he would be likely to lose some of that $100. Therefore, the casino may pay the player $5 to take another 200 pulls.

In a related embodiment, a player may carry over the accumulated credits from a first contract to a second contract. Thus, a player with 40 accumulated credits at the end of a first contract may begin a second contract with 40 accumulated credits. The player may pay or be paid for carrying over credits.

Price

In many embodiments, the player pays a fixed sum to buy the contract. In exchange for that fixed sum, the player can then gamble a significant amount with little or no risk of losses. In many embodiments, the insurer takes the risk of the player's loss. The insurer must therefore price the contract to be compensated for the risk it takes. In other embodiments, the casino and the insurer share the profits and losses associated with a contract. To ensure a profit to be divided amongst the two, a contract may be priced in excess of a player's average win. Note that a player's loss would count as zero in figuring out the player's average win, since the player does not have to pay for losses.

One method of pricing the contract involves first figuring out what the insurer might expect to pay, on average, to cover a player's losses. Another method of pricing a contract involves first figuring out what the casino/insurer combination might expect to pay, on average, to compensate a player for his winnings. Both methods involve similar computations. Therefore, computations will be described below with respect to only one or the other method of pricing a contract.

Exemplary Price Computations

The insurer obtains the gaming device or a component of the gaming device containing significant information about the operation of the gaming device (e.g., the CPU). The insurer then operates the gaming device as a player would when under contract. For example, if the insurer were to sell contracts for 600 pulls, the insurer would make 600 handle pulls at the gaming device and record the number of accumulated credits at the end of the 600 pulls. The insurer may repeat this process of testing contracts at the device for a large number of trials. The insurer may then average what its payments would be over all the trials. Note that while it might take a player days or years to complete, say, 100,000 contracts at a gaming device; the process may be sped up for the insurer by giving the gaming device special instructions to generate outcomes more rapidly. The performance of large number of trials in the manner described above is often called a Monte-Carlo simulation.

The following is an example of pricing a contract. Using the method of pricing described above, an insurer simulates the execution of a 600-pull contract. The insurer repeats the simulation four more times. After the first simulation, the player has won $10. After the second, the player has lost $5. After the third, the player has lost $17. After the fourth, the player has lost $8. After the fifth, the player has won $3. To figure out what the insurer must pay, on average, the insurer adds the three losses to get $5+$17+$8=$30. The insurer then divides by five, the number of simulations, to get: $30/5=$6. The insurer does not care, for the purposes of this calculation, how much the player won when he did win, since the casino is the one paying the player his winnings. Now, in order to obtain an average $4 profit, the insurer might charge $10 for each contract.

The insurer obtains or creates software that mirrors or models the operation of the gaming device. For example, the software is configured to generate the same outcomes, as does the gaming device with the same frequency as the gaming device. For each outcome generated, the software tracks what a player's accumulated credits would be. As before, the insurer may simulate many contracts and average what its payments would be over all the trials.

The insurer mathematically models potential outcomes of one handle pull of the gaming device using a random variable with a probability mass function (PMF) or probability density function (PDF). With these functions, the x-axis may represent potential winnings, such as −$1 or $3, which can occur from a single handle pull. The example of −$1 indicates the player has paid $1 for the pull but has won nothing. The example of $3 indicates that the player has paid $1 for the pull and won $4. The y-axis of these functions represents the probability or probability density of each outcome occurring. The probability of the player getting −$1 on a pull might be 0.8, while the probability of the player getting $3 might be 0.2. A PMF for the number of accumulated credits at the end of a contract can then be created by summing the random variables representing individual handle pulls. If each pull is independent with an identical PMF, as is common with slot machines, then the PMF for the results of the entire contract can be created using repeated convolutions of the PMF's for individual handle pulls. If, for example, 600 pulls are involved, then the PMF for a single handle pull may be convolved with itself 599 times to generate a PMF for the entire contract. Using this resultant PMF, the insurer can easily calculate how much it would expect to pay to cover a player's losses on each contract. If the resultant random variable is denoted by w, and the insurer would by required to pay for any player losses, then the insurer's expected payment is given by $\Sigma_{-\infty}^{0}$ w*probability(w).

In the method described above, Fourier Transforms, Z transforms, Laplace Transforms, or other transforms can be used to aid in the calculation of the repeated convolutions. Such a use of transforms is well known in the art.

As is well known in the art, with many classes of random variables, repeated summation results in a Gaussian probability distribution. This distribution has the shape of the familiar bell curve. The Gaussian distribution has the advantage of being fully described by only two parameters, a mean and a standard deviation. If a Gaussian probability distribution is used to approximate the sum of a large number of independent, identically distributed random variables, such as those that often describe handle pulls, then the mean and standard deviation of the Gaussian distribution is very easily calculated based on the mean and standard deviation of a random variable describing an individual pull. Such calculations are well known in the art. Thus, a Gaussian distribution can easily be generated to approximate the PMF of a player's accumulated credits at the end of a contract. Using this distribution, the insurer can calculate the amount it would be required to pay, on average, to cover a player's losses. The method of calculation is similar to that described in 3). If a Gaussian PDF is used as an approximation, then an integral sign replaces the summation sign, and "probability" is replaced by "probability density."

The following is an example of using a Gaussian probability density function to approximate the amount a casino would be required to pay, on average, to compensate a player for his winnings at the end of a contract. The contract may then be priced in excess of this amount to ensure an average profit for the casino/insurer combination. A Gaussian function is given by the formula, $f(x)=1/\surd(2\pi\sigma)\exp(-(x-\mu)^2/(2\sigma^2))$. In this formula, $\sigma$ is the standard deviation, and $\mu$ is the mean. Now, let us suppose that a single handle pull of a slot machine results in a required payout to the player described by a probability mass function with mean $\mu_0$ and standard deviation $\sigma_0$. Then, assuming each handle pull is independent, n handle pulls of the slot machine may be described by a function with mean $\mu=\mu_0 n$ and standard deviation $\sigma=\sigma_0\surd n$. Furthermore, if n is large, then the function describing a casino's aggregate payout after n handle pulls may be approximated by the Gaussian function f(x), whose formula is given above.

To calculate what a casino would have to pay to compensate a player for his winnings, on average, we note that the casino pays when the player wins, but receives nothing when a player loses. Therefore, the expected payment of the casino is given by:

$$\int_{-\infty}^{0} 0*f(x)dx+\int_0^\infty x*f(x)dx=\int_0^\infty x*f(x)dx.$$

We proceed to solve the integral:

$$\begin{aligned}
\int_0^\infty x*f(x)\,dx &= \int_0^\infty x*1/\surd(2\pi\sigma)\exp(-(x-\mu)^2/(2\sigma^2))dx \\
&= 1/\surd(2\pi\sigma)\int_0^\infty x*\exp(-(x-\mu)^2/(2\sigma^2))dx \\
&= 1/\surd(2\pi\sigma)\int_0^\infty [(x-\mu)*\exp(-(x-\mu)^2/(2\sigma^2)) + \\
&\quad \mu*\exp((x-\mu)^2/(2\sigma^2))]dx \\
&= 2\sigma^2/\surd(2\pi\sigma)*(-1/2)*[\exp(-(x-\mu)^2/(2\sigma^2))]_0^\infty + \\
&\quad \mu\int_0^\infty 1/\surd(2\pi\sigma)\exp(-(x-\mu)^2/(2\sigma^2))dx
\end{aligned}$$

We deal with the two terms separately:

$$\begin{aligned}
2\sigma^2/\surd(2\pi\sigma)*(-1/2)*[\exp(-(x-\mu)^2/(2\sigma^2))]_0^\infty &= -\sigma^2/\surd(2\pi\sigma)*[0-(-\mu^2/(2\sigma^2))] \\
&= \sigma^2\exp(-\mu^2/(2\sigma^2))/\surd(2\pi\sigma) \\
&= n\sigma_0^2\exp(-n^2\mu_0^2/(2n\sigma_0^2))/\surd(2\pi\surd n\sigma_0)
\end{aligned}$$

-continued $$= n^{3/4}\sigma_0^{3/2}\exp(-n\mu_0^2/(2\sigma_0^2))/\surd(2\pi)$$

and $$\begin{aligned}
\mu\int_0^\infty 1/\surd(2\pi\sigma)\exp(-(x-\mu)^2/(2\sigma^2))dx &= \mu\int_{-\mu/\sigma}^\infty 1/\surd(2\pi\sigma)\exp(-y^2/2)\sigma dy \\
&\quad (\text{where } y=(x-\mu)/\sigma) \\
&= \mu\surd\sigma\int_{-\mu/\sigma}^\infty 1/\surd(2\pi)\exp(-y^2/2)dy \\
&= \mu\sqrt{\sigma}\left[1-\int_{-\infty}^{-\mu/\sigma} 1/\surd(2\pi)\exp(-y^2/2)dy\right]
\end{aligned}$$

The integral is the cumulative distribution function for a zero mean, unit standard deviation Gaussian, for which tables exist. We denote it by $N(-\mu/\sigma)$. Continuing:

$$\begin{aligned}
\mu\int_0^\infty 1/\surd(2\pi\sigma)\exp(-(x-\mu)^2/(2\sigma^2))dx &= \mu\surd\sigma[1-N(-\mu/\sigma)] \\
&= n\mu_0 n^{1/4}\surd\sigma_0[1-N(-n\mu_0/(\surd n\sigma_0))] \\
&= n^{5/4}\mu_0\surd\sigma_0[1-N(-\surd n\mu_0/\sigma_0)]
\end{aligned}$$

Recombining the two terms we get:

$$\int_0^\infty x*f(x)dx=n^{3/4}\sigma_0^{3/2}\exp(-n\mu_0^2/(2\sigma_0^2))/\surd(2\pi)+n^{5/4}\mu_0\surd\sigma_0[1-N(-\surd n\mu_0/\sigma_0)]$$

If we were to graph the above as a function of n, the number of pulls, we would see that initially, as the number of pulls in a contract gets larger, a casino could expect to pay more money to compensate a player for his winnings. However, there would reach a point, beyond which more pulls in a contract would actually decrease the amount a casino could expect to pay to compensate a player for his winnings. This illustrates an important feature of contracts. Having more pulls in a contract is not necessarily an advantage for a player.

A casino or insurer may start with a first price for a contract, and then evolve the price as more and more of the contracts are purchased and executed. For example, if an insurer loses money on the first few contracts it sells, then it may increase the price of the contract. If the insurer makes large profits on its first few contracts, then it may reduce the price.

Once the insurer has determined what it can expect to pay, on average, to cover a player's losses, the insurer may price the contract to give itself a desired profit margin. For example, if the insurer can expect to pay, on average, \$15 to cover a player's losses, then the insurer might price the contract at \$20 to insure itself a \$5 average profit.

Automatic Play

A contract may require certain behaviors of the player. As mentioned, these behaviors may include maintaining a certain rate of play, or performing a minimum number of handle pulls. The gaming device on which a contract is executed may take various steps to ensure that the behaviors are performed. To this end, the gaming device may initiate handle pulls automatically or may fail to register handle pulls that the player attempts to initiate. For example, if the player must make at least one handle pull every 10 seconds, and the player has failed to make any handle pulls in 9 seconds, then the gaming device may automatically initiate a handle pull for the player on the tenth second. As another example, a player may be restricted from making more than one pull every 10 seconds. If in the same 10-second interval, the player attempts to make more than one handle pull, the second handle pull may not be initiated, at least until the next 10-second interval.

As can be seen from the above two examples, the player may maintain some control over his gambling behavior even while the gaming device forces him to comply with the contract. Therefore, a player who must make a pull every 10 seconds still has control over whether the pull occurs on the first second of an interval or the eighth second of an interval. Such control can be psychologically important, because many players feel that the exact moment at which the handle pull is initiated has an important effect on the ultimate outcome.

In some cases, a player may not desire to make any active decisions once a contract has been initiated and may simply put a gaming device into "automatic play." The player may later have the option of taking the gaming device out of automatic play and of manually initiating handle pulls Offering the Contract A contract may be offered to a player in a number of ways. A gaming device may use text or synthesized voice to ask a person whether he would like to sign up for a contract. A casino allendant may offer a contract to a player, or signs at a casino may point a player toward a casino desk where he may then purchase a contract.

A number of circumstances may trigger the casino or an insurer to offer a contract to the player. For example, the player may have lost most of an initial stake deposited into a gaming device. A player may be slowing his play, or may no longer be inserting coins into the machine. The time of day may be a player's typical lunchtime or departure time. A player may have the opportunity to enter into a contract only if he also agrees to do business with a particular merchant or group of merchants. The player may have the opportunity to enter into a contract if the casino or insurer deems him a good, valuable, or loyal customer.

Agreeing to the Contract

A player may specify a desired contract in a number of ways. At a gaming device, a player may use a touch screen to indicate his desire to enter into a specific contract. Using the touch screen, the player may select from a menu of possible contracts. For example, the menu might list several contracts with different time durations or different prices. The player could then select a contract by touching an area of the screen next to his desired contract.

The player might use menus to customize a contract for himself. The player might use a first menu to select the duration of the contract (e.g., 600 pulls, or ½ hour). A second menu might be used to select a rate of play. A third menu might be used for coin denomination. Many other menus are possible for other contract features. Once the player has selected several contract features, the gaming device may select the remaining feature so as to make the contract profitable for the insurer. For example, once the player has chosen a number of pulls and a coin denomination, the gaming device might choose the price of the contract.

Rather than a touch screen, a player may use special buttons, keys, or voice input to specify a desired contract or contract terms.

In some embodiments, a player chooses a contract prior to approaching the gaming device or even the casino. A player might select a contract on the Internet. On the Internet, the player might specify terms of the contract, such as the number of pulls, the rate of play, the cost, the payout tables, the winning symbol combinations, etc. The player may then print out a code or a document describing the terms of the contract. The player then brings the code or document to a gaming device that then recognizes what contract the player has chosen. When the player signs up for a contract, a description of the contract might be sent electronically directly to the gaming device. The player might then only identify himself at the gaming device in order to initiate contract play.

Other terms of a contract a player may agree to or specify include the font size of the machine, the noise level of the machine's sound effects, the particular game (e.g., number of reels, number of pay lines), the brightness of the display, etc.

Signature

To confirm entry into a contract, a player might sign a document that may contain the terms of the contract. The document may be printed from a gaming device or from the Internet, or may be obtained from a counter at a casino. The signed document may then be deposited into an opening in the gaming device, may be returned to a casino counter, or may be kept by the player. The player might also sign an area on a touch screen or other sensing device.

A player might also confirm entry into a contract simply by paying for it. The player might pay be depositing tokens, coins or other currency into the gaming device. The player might pay using a credit or debit card. The player might also pay from a player credit account established with the casino. The player might pay at a counter of the casino and might receive a contract or a contract indicator to bring to a gaming device. The gaming device might then recognize the contract indicator by, for example, a bar code, and then execute the contract.

Instruction Sets

A typical contract may cover and/or require a large number of handle pulls by the player. Now ordinarily, when a player is gambling at a gaming device for a long period of time, the player makes a number of decisions related to his gambling. Should the player play more quickly or more slowly? Should the player double his bet after a loss? Should the player quit after a sizable win? Should the player take a short break to use the restroom?

Since the contract covers a large number of pulls, it is possible for some player decisions to be made beforehand and included in the contract. A gaming device may then act on the decisions specified in the contract without further input from the player. For example, while negotiating a contract for an hour of play at 10 pulls per minute, a player might decide to take a 15-minute break between the first ½-hour and the second ½-hour of pulls. The gaming device might then execute the contract for the first half hour by automatically spinning and generating outcomes for the first ½ hour. The gaming device might then freeze for 15 minutes, preventing other players from stepping in and allowing the contract holding player to take his 15-minute break. The device can then unlock after 15 minutes, perhaps with the entry of a password, and resume the generation of outcomes.

One important aspect of having a player's decisions spelled out before hand in the contract is that the player need not even be present at the gaming device. A player can sign up for a contract at a casino in Las Vegas, and then have the contract executed automatically by a gaming device. The player can then view a running tally of his accumulated credits over the Internet while in Virginia, for example.

In general, player instructions built into a contract will include some action to be performed as well as some triggering condition for the action. As an example, a player instruction may be to increase the rate of handle pulls provided accumulated player credits exceed 100. In this example, the action is to increase the rate of handle pulls, and the triggering condition is whether accumulated player credits exceed 100. The following player actions may be part of a player's instructions:

increase or decrease a wager amount on one or more handle pulls;

increase or decrease a rate of wagering;

cease gambling; and change the way outcomes are displayed.

The following conditions may trigger the above actions:

the player has just won or lost on one or more handle pulls;

the player has just won a certain amount on one or more handle pulls;

any player-defined sequence of wins and losses has occurred on prior handle pulls;

the player has approached or left the vicinity of the gaming device; and the current time has reached a particular time of day.

One advantage of contracts executed by the gaming device is that a gaming device can gamble at speeds a human is incapable of achieving. For example, a player is on a winning streak, but must soon join his family for lunch. Rather than cash out and leave, he decides to accelerate his play to two pulls per second. A contract may be entered that is executed by the machine at two pulls per second for the next 8 minutes. In this contract, an insurer is not involved. The contract simply serves as a means of increasing the rate of play. As it happens, the player loses all his money in 6 minutes, and so the contract ends.

Player instructions may tell the slot machine to play faster when the player is present or is observing in some way, and to play more slowly while the player is asleep. For example, the rate of pulls may be twice as fast during the day as at night. The rate of play may likewise be faster when an infrared detector in the slot machine senses the heat of the player's presence.

Player instructions may also tell a gaming device how to play certain games involving player decisions. For example, a player may leave instructions to use basic strategy in a game of video blackjack, or to play according to published theory in a game of video poker. The player may add instructions to always draw to a four card open-ended straight flush.

Times of Execution

A gaming contract may be executed over a range of different time periods. The outcomes, the accumulated player credits, and the player winnings may or may not be displayed to the player at the same time at which the outcomes are being generated.

In one embodiment, all the outcomes needed for a contract are generated very rapidly by a gaming device, perhaps all in less than a second. The outcomes may then be displayed to the player over a much longer time frame so as to give the player a more exciting gaming experience.

In another embodiment, outcomes may be continuously generated at a rate comparable to that with which a player might make handle pulls on his own. This embodiment might be entertaining for a player if the player is sitting at the gaming device or watching the outcomes being generated from a home computer.

In another embodiment, outcomes are generated on a periodic basis at fixed times every day, week, hour, etc. For example, outcomes for a 600-pull contract may be generated 100 outcomes at a time, each block being generated from 8 pm-9 pm on Sunday. Thus, it would take just under six weeks for the entire contract to be executed. This method of execution may be ideal if a player has a schedule as to when he enjoys watching outcomes being generated. For example, the player might enjoy seeing outcomes generated while he watches his favorite show on Sundays from 8 pm to 9 pm. This method of execution might also be ideal for the casino if slow business periods occur on a periodic basis where the entire contract cannot be executed in a single period.

In still another embodiment, outcomes are generated on a flexible basis, either when it is convenient for the casino or for the player. In this embodiment, the casino may wait for a gaming device to be free of use before using it to generate the next couple of outcomes of a contract. Alternatively, the player may signal the gaming device any time he is ready to have the next few outcomes generated Viewing the Contract's Execution As discussed, a player may enjoy watching from a remote location as the outcomes of his contracts are generated. Since the player is not physically at the slot machine, the outcomes must be presented to the player via some graphical representation. In one embodiment, a camera simply films the gaming device generating the player's outcomes. The image from the camera is transmitted to the player device via the Internet, the cable system, satellite, etc. The player device might be, for example, a TV or a personal computer. In another embodiment, the generated outcomes are recorded either by the gaming device, by a camera watching the device, or by a casino employee. The generation of the outcomes is then graphically recreated for the player in a manner not necessarily consistent with the physical appearance of the gaming device that generated the outcomes. For example, a gaming device generates the outcome: cherry-orange-lemon. The gaming device then transmits, via the casino server and the Internet, a bit sequence indicating the outcome cherry-orange-lemon. Perhaps the bits "0000" represent cherry, "0011" represent orange, and "1111" represent lemon. The bit sequence is transmitted to a player's home computer, where a software program displays a cartoon representation of a slot machine. The cartoon shows the reels spinning and stopping with the outcome: cherry-orange-lemon. The cartoon representation of the slot machine may not look anything like the slot machine that originally generated the outcomes. In some embodiments, a player views a combination of the actual image of his gaming device, and a computer-rendered version of a gaming device. For example, a cartoon of the reels spinning might be displayed within the frame of an actual image of the slot machine, without the reels.

In some embodiments, the player does not view a graphical representation of the outcomes, but sees the outcomes as text, such as "seven-bar-bar," "s-b-b," " 7-b-b," etc. The player may not even see the outcomes, just how much he has won or lost on every pull. Thus, the player may view a periodically updated tally of his accumulated credits. He may only view his total accumulated credits, or his take home winnings, after all outcomes have been generated.

Any graphical or textual representation of the player's outcomes, accumulated credits, or other contract information may be displayed either on an entire portion of a computer or TV screen, or on a smaller portion of the screen. For example, a small cartoon slot machine may reside in a box in the upper right hand corner of a TV screen that simultaneously displays a regular TV show. A player watching television need only glance at the corner of the screen to follow the progress of the contract. Representation of outcomes may also be place in an email message to the player.

Of course, the various representations of outcomes may be used just as well with a player physically present at the gaming device or at the casino.

In some embodiments, the player calls up a number to monitor the progress of his contract. He may enter a code or password when prompted by a voice response unit (VRU) and thereby access the outcomes from his particular contract. A player may also receive a DVD from the gaming establishment containing a representation of the game outcomes received by the player.

A player may be sent updates on his contract only when certain triggering conditions are met. For example, a player may only wish for updates when he wins more than 100 credits on a spin, or when the contract terminates.

Revenue Management

As discussed previously, the pricing of a contract will often take into account the expected amount an insurer must pay to a casino to cover a player's losses, or the expected amount that a casino and insurer in combination can expect to pay to compensate the player for his winnings. Pricing of contracts may account for additional factors such as, for example:

times or dates on which the contract is to be executed;

the gaming device on which the contract is to be executed;

flexibility in the contract's execution;

a player's playing history; and the importance of the player as a customer of the casino.

For example, a contract, which is to be executed during a period of low customer activity at a casino, may be priced at a discount. This is because a casino would like to encourage the use of gaming devices that are otherwise empty. Alternatively, a casino may want to discourage the purchase of contracts during times of high customer traffic, and so contracts may be higher priced at such times.

If a contract has flexibility as to when it may be executed, then this allows the casino to execute contracts only during times when gaming devices would not otherwise be in use. Therefore, such a contract might be priced more favorably.

A contract that is executed at an unpopular gaming device, for example, might be priced more favorably for the player so as to encourage the use of that device.

If a player shows signs of nearing the end of his gambling session, a contract might be priced at a discount for that player. For example, a player might be slowing his rate of play, indicating boredom. A player might be lowering his wager size, indicating a decreasing bankroll. A player might simply have been at a gaming device for such a long time that he would almost necessarily be hungry enough to leave at any moment. Providing a discount on a contract to such players would encourage them to remain gambling for at least the time it takes to execute the contract.

Settlement

In some embodiments, the casino acts as the intermediary in transactions between a player and the insurer. The casino is an intermediary, for example, when its gaming devices collect a player's payment for a contract, even though that payment is meant to go to the insurer. The casino is also an intermediary when it does not collect losses from a player, but from an insurer.

Since the casino may engage in many transactions with the insurer, it would potentially be inefficient for the casino to transfer money to the insurer, or vice versa, after every transaction. Therefore, the casino or the insurer may maintain records of how much one owes the other. The casino and the insurer may then settle their accounts periodically. If the casino owes the insurer money, then the casino may wire money to the insurer. If the insurer owes the casino, then the insurer may wire money. Of course, many other methods of settlement are possible.

In cases where a contract has resulted in a net win for the player, the player must be paid. If the player is at the casino, he may enter into a gaming device a password or other identifier of himself or of his contract. The gaming device may then access a database in the casino server containing the details of the contract, including the amount owed to the player. The gaming device may then payout the amount owed in the form of cash, tokens, paper receipts or vouchers, digital cash, digital receipts, etc. The player may also collect his winnings at a casino desk, perhaps after presenting identification.

If a player is remote from a casino when his contract has finished executing, then the player may be sent his winnings either by the insurer or the casino. If the insurer provides the winnings, then the casino may later reimburse the insurer in the amount of the winnings. The winnings may be sent in the form of cash, check, money order, etc. The winnings may be sent by postal mail, by wire transfer, by direct deposit, by email as digital cash, etc.

In some embodiments, a player's winnings on each pull of the contract are reinvested into the contract, whereas in other embodiments they are not. In one example, a player purchases a contract for $100. The player instructs the gaming device to gamble the $100 until it is all gone. However, any winnings not used to gamble are sent directly to the player. In a second example, the player purchases a contract for $100 and instructs the gaming device to gamble the $100 until it is gone or until it has become $200. Here, the player elects to reinvest winnings, using the winnings to pay for new handle pulls even after $100 worth of handle pulls has been made already.

In some embodiments, the casino may simply keep the player's winnings in a player account at a casino, to be accessed by the player next time he visits the casino. The winnings may, in the meantime, accumulate interest. The casino (or insurer) may also alert the player that his contract has finished executing and that he has winnings. The player may be instructed to come to the casino and pick them up.

In some embodiments, the player may have left instructions to take any winnings from a first contract and purchase a second contract. This allows for the notion of a meta-contract. Just as a contract may specify how to allocate money for pulls, a meta-contract would describe how to allocate money for contracts. There could then be meta-meta-contracts, and so on.

In another embodiment, a player might purchase a contract at a casino desk and receive a token that indicates the type of contract. The player might then deposit the token into a gaming device. The gaming device would then recognize the token and be able to execute the contract.

Figure 16:
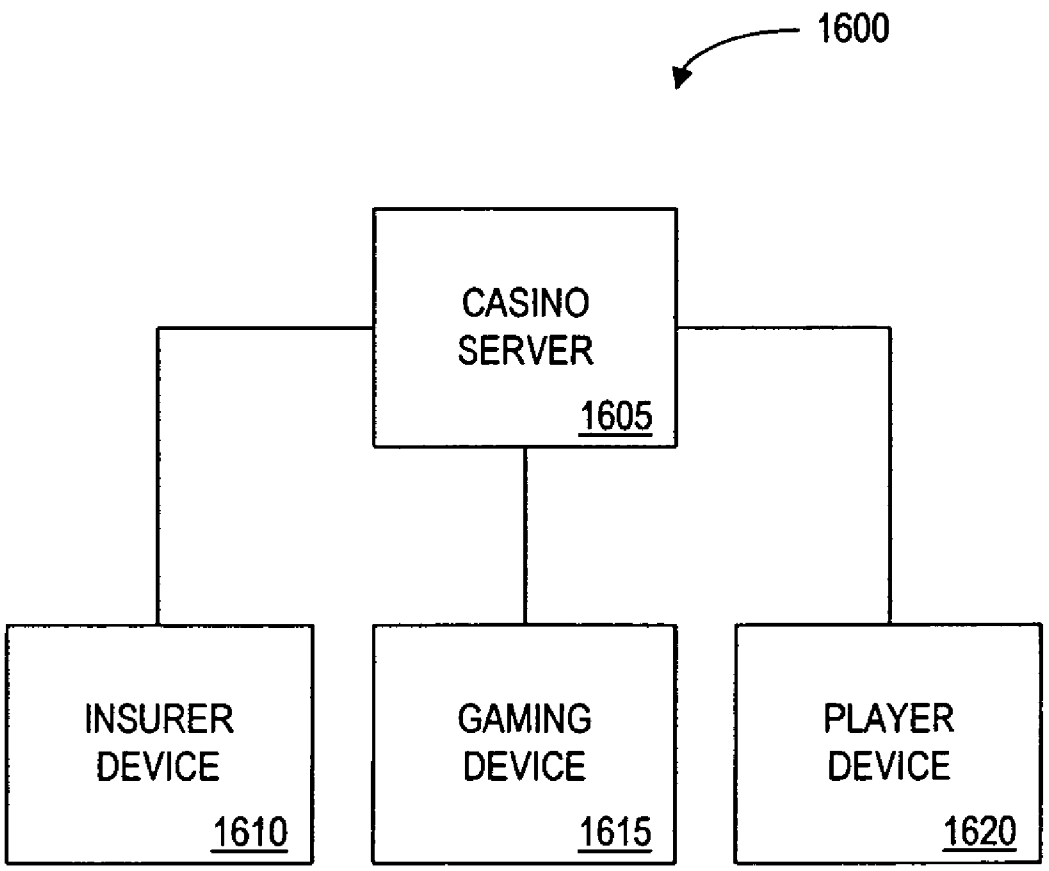
FIG. 16 is an overall schematic view of a system according to another embodiment of the present invention.

Returning now to the figures, FIG. 16 is a schematic representation of an embodiment of a system configured to carry out the contract embodiments described above. The system 1600 comprises a casino server 1605 in communication with insurer device 1610, a gaming device 1615, and a player device 1620. As used herein, a device (including the casino server 1605, the insurer device 1610, the gaming device 1615 and/or the player device 1620) may communicate, for example, through a communication network such as a Local Area Network (LAN), a Wide Area Network (WAN), a Metropolitan Area Network (MAN), a Public Switched Telephone Network (PSTN), a proprietary network, a Wireless Access Protocol (WAP) network, or an Internet Protocol (IP) network such as the Internet, an intranet or an extranet. Moreover, as used herein, a communication network includes those enabled by wired or wireless technology.

It should be understood that any number of gaming devices and any number of player devices can be used in system 1600. Although system 1600 includes both a casino server 1605 and an insurer device 1610 as illustrated, one or the other of these elements may be omitted (for example, the insurer device may be omitted in embodiments that do not include an insurer or where the casino acts as the insurer). Similarly, although system 1600 includes both a gaming device 1615 and a player device 1620 as illustrated, one or more of these embodiments may be omitted (for example, the player device may be omitted if the casino has not implemented remote gaming). Further, some or all of the functionality of a casino server 1605 may be carried out by insurer device 1610 and vice versa. Similarly, some or all of the functionality of casino server 1605 and/or insurer device 1610 may be carried out by gaming device 1615 and vice versa. In one embodiment, the casino server 1605 comprises one or more computers that are connected to a remote database server.

Figure 17:
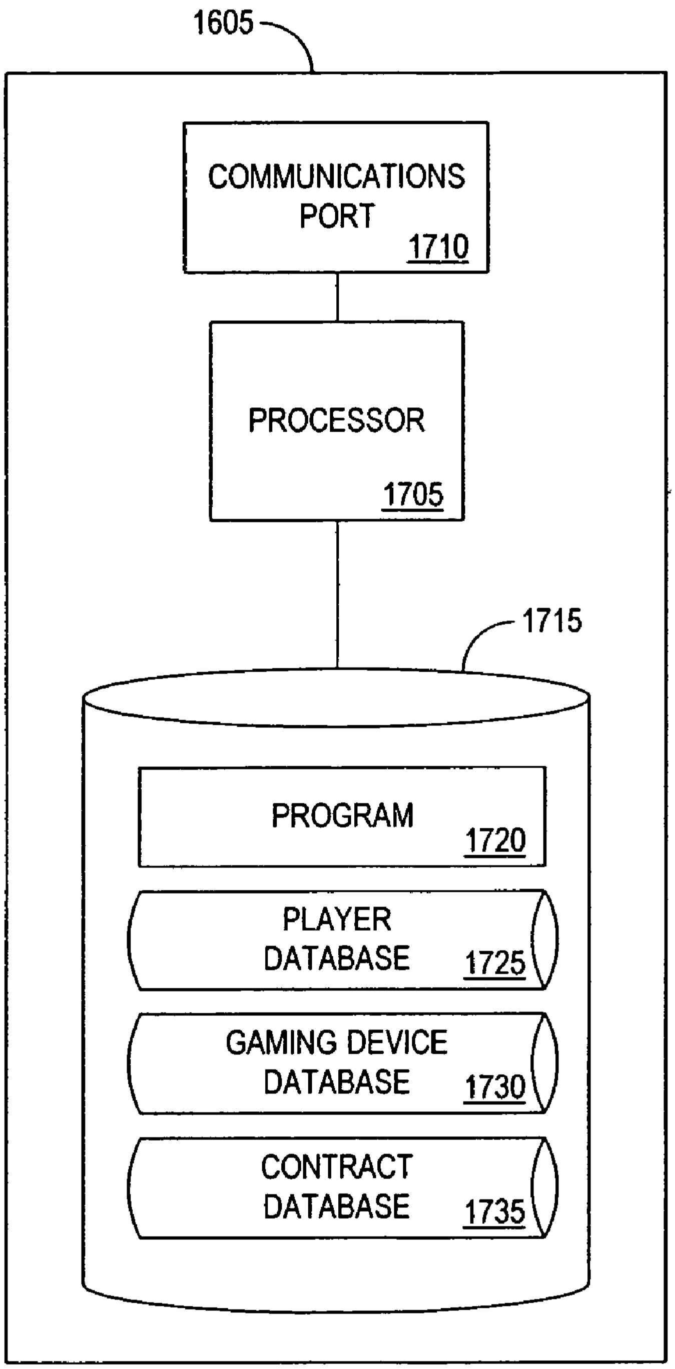
FIG. 17 is a schematic view of the casino server of FIG. 16.

Turning now to FIG. 17, therein depicted is schematic illustration of a casino server 1605. Casino server 1605 is an illustration of an embodiment of the casino server of the same number in FIG. 16. Casino server 1605 comprises a processor 1705 in communication with a communications port 1710 and storage device 1715. Contained in storage device 1715 is a program 1720, a player database 1725, a gaming device database 1725, and a contracts database 1730. Each of these databases will be described in detail below. The processor 1705 performs instructions of the program 1720. The program 1720 may be stored in a compressed, uncompiled, and/or encrypted format. The program 1720 furthermore includes program elements that may be necessary, such as an operating system, a database management system, and "device drivers" used by the processor 210 to interface with peripheral devices. Appropriate program elements are known to those skilled in the art.

Note that the processor 1705 and the storage device 1715 may be, for example, located entirely within a single computer or other computing device or located in separate devices coupled through a communication channel.

Figure 18:
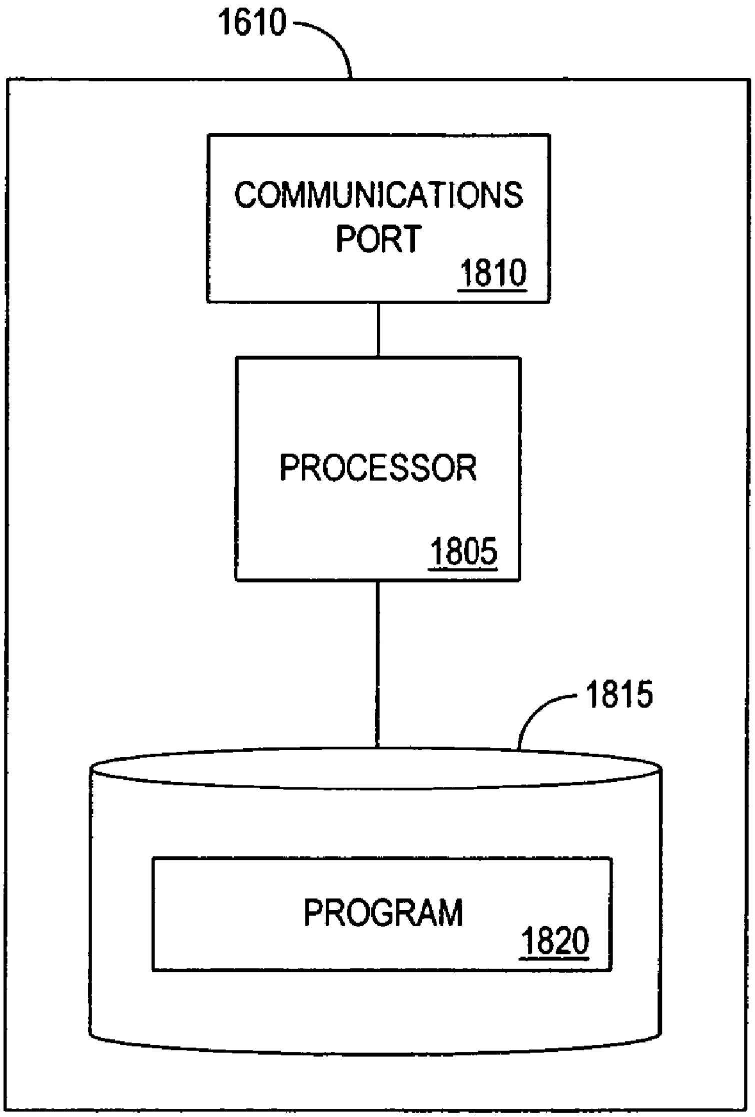
FIG. 18 is a schematic view of the insurer device of FIG. 16.

Turning now to FIG. 18, therein depicted is a schematic illustration of an insurer device 1610. Insurer device 1610 is an illustration of an embodiment of the insurer device 1610 of the same number in FIG. 16. Insurer device comprises a processor 1805 in communication with a communications port 1810 and a storage device 1815. Storage device 1815 stores a program 1820. The processor 1805 performs instructions of the program 1820. The program 1820 may be stored in a compressed, uncompiled, and/or encrypted format. The program 1820 furthermore includes program elements that may be necessary, such as an operating system, a database management system, and "device drivers" used by the processor 1805 to interface with peripheral devices. Appropriate program elements are known to those skilled in the art. Note that the processor 1805 and the storage device 1815 may be, for example, located entirely within a single computer or other computing device or located in separate devices coupled through a communication channel.

Figure 19:
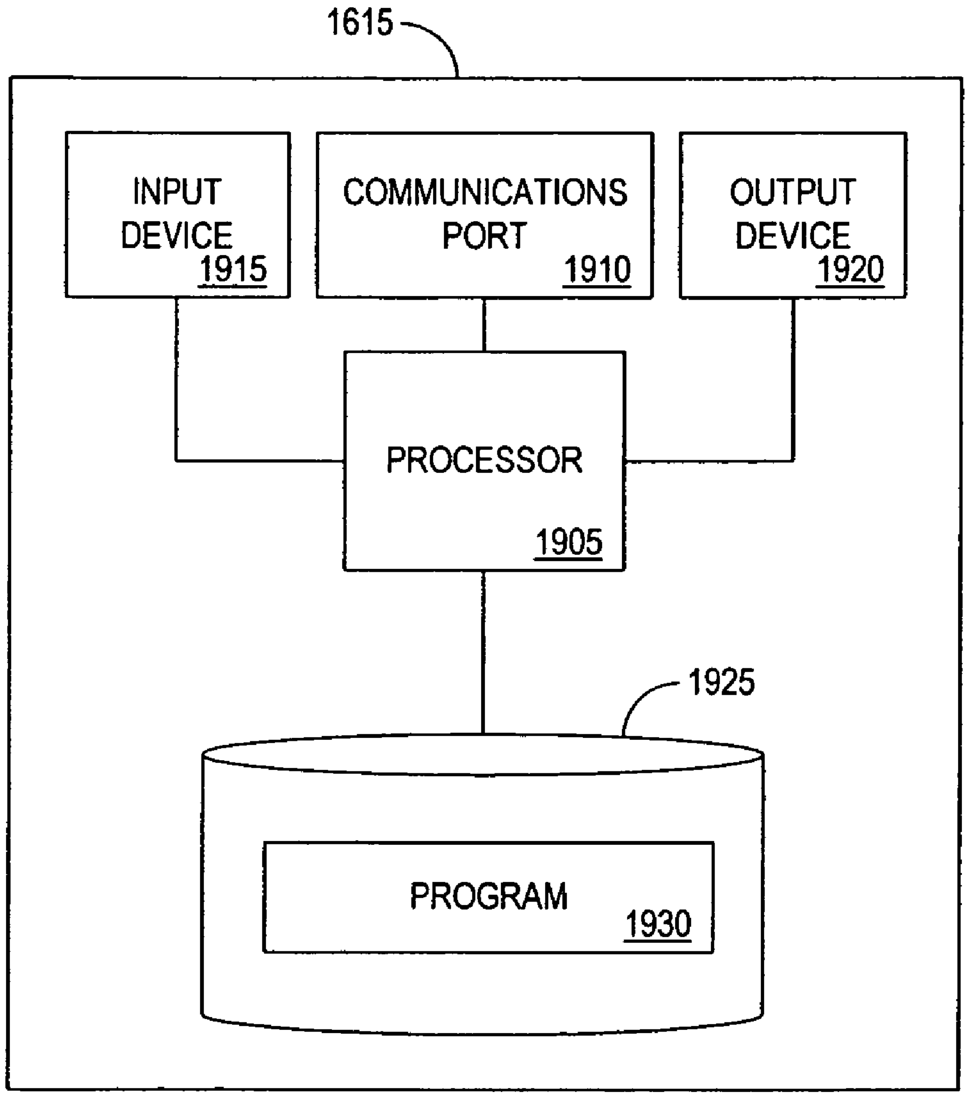
FIG. 19 is schematic view of the gaming device of FIG. 16.

Turning now to FIG. 19, therein depicted is a schematic illustration of a gaming device 1615. Gaming device 1615 is an illustration of an embodiment of the gaming device of the same number depicted in FIG. 16. Gaming device 1615 comprises a processor 1905 in communication with a communications port 1910, an input device 1915, an output device 1920, and a storage device 1925. Storage device 1925 stores a program 1930. The processor 1905 performs instructions of the program 1930. The program 1930 may be stored in a compressed, uncompiled, and/or encrypted format. The program 1930 includes program elements that may be necessary, such as an operating system, a database management system, and "device drivers" used by the processor 1905 to interface with peripheral devices. Appropriate program elements are known to those skilled in the art.

Note that the processor 1905 and the storage device 1925 may be, for example, located entirely within a single computer or other computing device or located in separate devices coupled through a communication channel.

Input device 1915 may comprise, for example, a player slot card interface, a keypad, a touch-screen, a microphone and/or any other device, which allows a player to input information into gaming device 1615. Output device 1920 may comprise, for example, a display area, a microphone, and/or any other device that allows gaming device 1615 to output information to a player. Gaming device 1615 may comprise, for example, a slot machine, video poker machine, video keno machine, or a video blackjack machine. A combination of these types of machines may be used in embodiments where casino server 1605 is in communication with more than one gaming device 1615.

Figure 20:
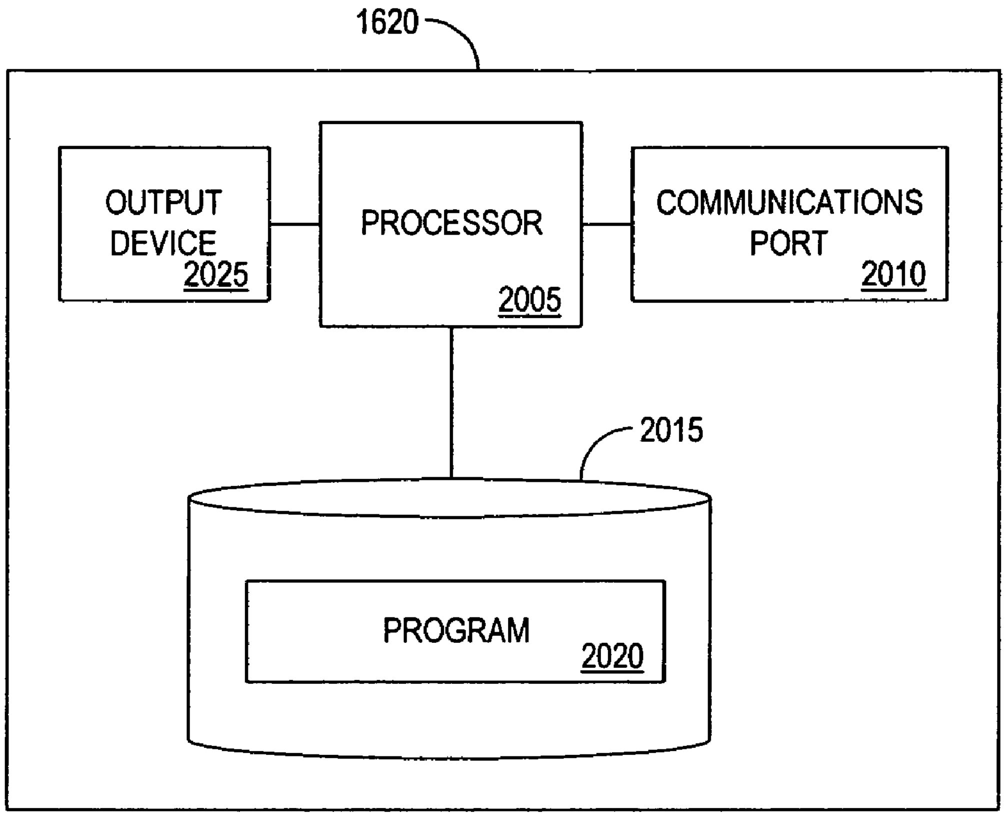
FIG. 20 is a schematic view of the player device of FIG. 16.

Turning now to FIG. 20, therein depicted is a schematic illustration of a player device 1620. Player device 1620 is an illustration of an embodiment of the player device of the same number depicted in FIG. 16. Player device 1620 may be, for example, a personal computer (PC), laptop, personal digital assistant, a cellular telephone, a pager, and/or any other device that allows a player to remotely monitor and participate in play of a gaming device. Player device 1620 comprises a processor 2005 in communication with a communications port 2010 and a storage device 2015. Storage device 2015 stores a program 2020. The processor 2005 performs instructions of the program 2020. The program 2020 may be stored in a compressed, uncompiled, and/or encrypted format. The program 2020 furthermore includes program elements that may be necessary, such as an operating system, a database management system, and "device drivers" used by the processor 2005 to interface with peripheral devices. Appropriate program elements are known to those skilled in the art. Note that the processor 2005 and the storage device 2015 may be, for example, located entirely within a single computer or other computing device or located in separate devices coupled through a communication channel.

It should be noted that any of the processors 1705, 1805, 1905, and 2005 may comprise one or more microprocessors such as one or more INTEL® Pentium® processors. Further, any and all of the storage devices 1720, 1815, 1925, and 2015 may comprise any appropriate storage device, including combinations of magnetic storage devices (e.g., magnetic tape and hard disk drives), optical storage devices and semiconductor memory devices, such as Random Access Memory (RAM) devices and Read Only Memory (ROM) devices.

Examples of databases that may be used in connection with the system 1600 will now be described in detail with respect to FIGS. 21 through 23. Each figure depicts a database in which the data is organized according to a data structure. The data may be stored, for example, on a computer readable medium and be accessible by a program executed on a data processing system. The schematic illustrations and accompanying descriptions of the databases presented herein are exemplary, and any number of other database arrangements could be employed besides those suggested by the figures.

Player Database

Referring to FIG. 21, a table represents one embodiment of the player database 1720 that may be stored at the casino server 1605 shown in FIG. 16 according to an embodiment of the present invention. The table includes entries identifying players that may be participating in contracts for flat rate play sessions with system 1600. The table also defines fields 2105, 2110, 2115, 2120, 2125, 2130, and 2135 for each of the entries. The fields specify (i) a player identifier 2105 that uniquely identifies a player; (ii) a name 2110 associated with the player; (iii) an address 2115 that facilitates communications with the player; (iv) a financial account identifier 2120, such as a credit or debit card account, associated with the player through which payment may be obtained and to which player winnings may be credited; (v) demographic information 2125 that may be utilized to determine a price or other terms for a contract; (vi) credits 2130 that represent the amount of casino credits associated with the player; and (vii) a lifetime coin-in 2135 that represents the amount of coin-in wagered by the player over the course of his or her relationship with the casino and/or insurer.

Gaming Device Database

Referring to FIG. 22, a table represents one embodiment of the gaming device database 1725 that may be stored at the casino server 1605 shown in FIG. 16 according to an embodiment of the present invention. The table includes entries identifying gaming devices operated by the casino. The table also defines fields 2205, 2210, and 2215 for each of the entries. The fields specify a (i) a gaming device identifier 2205 that identifies a gaming device; (ii) a name 2210 associated with the gaming devices, such as, for example, Diamond Mine®; and (iii) a manufacturer 2215 of the gaming device.

Contract Database

Referring to FIG. 23, a table represents one embodiment of the contract database 1730 that may be stored at the casino server 1605 shown in FIG. 16 according to an embodiment of the present invention. The table includes entries identifying contracts that may or have been purchased via the system 1600. The table also defines fields 2305, 2310, 2315, 2320, 2325, 2330, 2335, 2340, and 2345 for each of the entries. The fields specify (i) a contract identifier 2305 that identifies a contract that has been purchased or is available for purchase by a player; (ii) a player identifier 2310 that identifies a player, if any, that may be associated with the contract; (iii) an initial bankroll 2315; (iv) a description 2320 that describes the terms of the contract; (v) a cost 2325 of the contract; (vi) a result 2330 that indicates the current status of the contract; (vii) an amount owed the player 2335; (viii) an amount owed the insurer 2340; and (ix) a total amount owed the insurer 2345.

Figure 24:
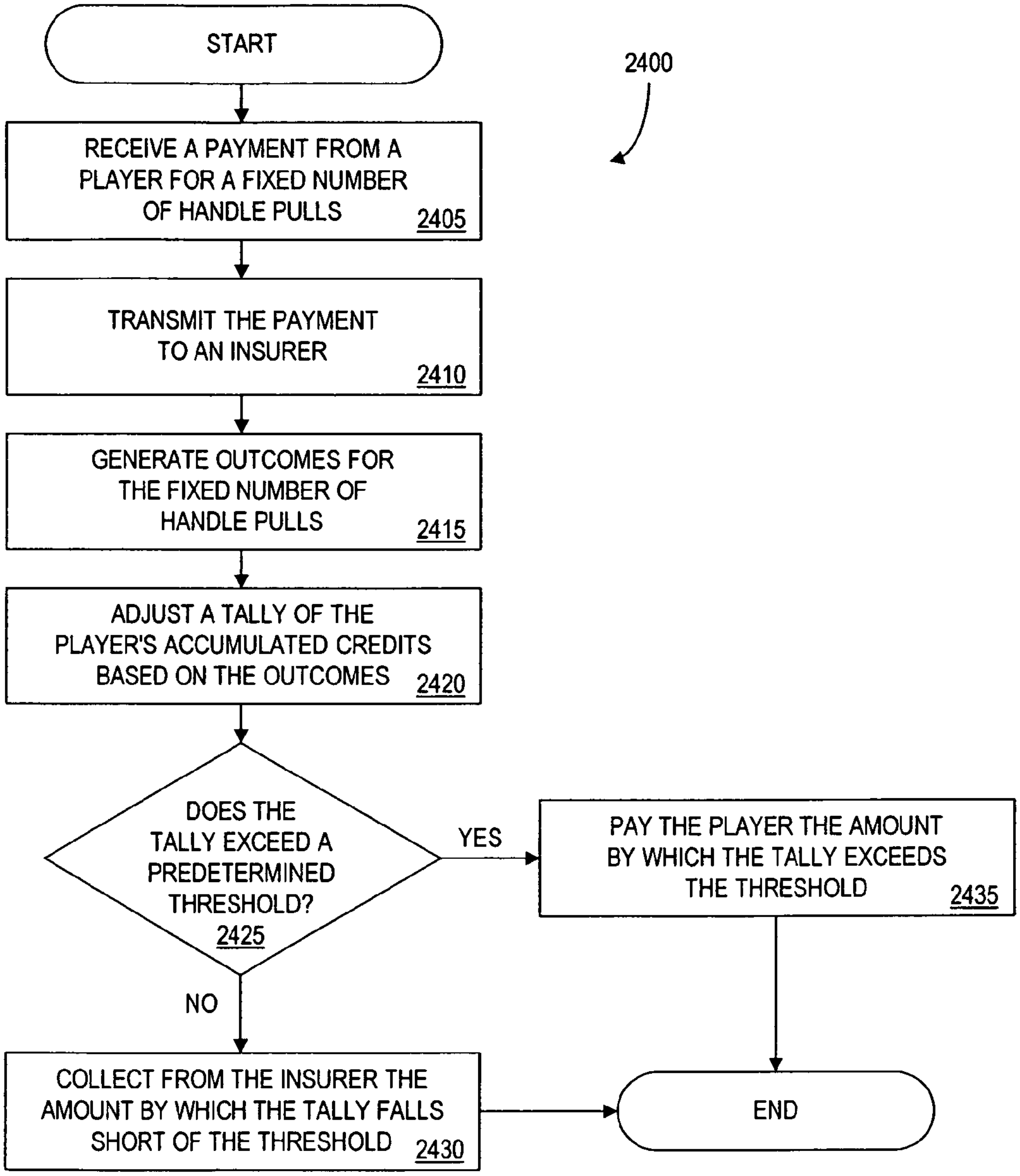
FIG. 24 is a flowchart illustrating a process in accordance with one embodiment of the present invention, the process corresponding to the system illustrated in FIG. 16.

A method that may be used in connection with the system 1600 according to an embodiment of the present invention will now be described in detail with respect to FIG. 24. The method shown in FIG. 24 may be performed, for example, by a casino server 1605 in response to a player's request to purchase a contract and after determining the price and terms of the contract the player wishes to purchase. This flow chart does not imply a fixed order to the steps, and embodiments of the present invention may be practiced in other orders.

The method 2400 begins upon receipt of payment from a player for a fixed number of pulls in step 2405. In other embodiments, this step may comprise receipt of payment for a fixed duration of time during which the player may play. Receipt of payment may comprise, for example, receipt of a monetary input into a gaming device 1615 or receipt of (and, e.g., approval of a charge on) a financial account identifier. The received payment, or an indication of it, is then transmitted to an insurer in step 2410. Outcomes are then generated for a fixed number of pulls in step 2415. An adjustment of a tally of the player's accumulated credits based on the outcomes is performed in step 2420.

In step 2425, it is determined whether the adjusted tally exceeds a predetermined threshold. If it does, the method 2400 proceeds to step 2435 where the player is paid the amount by which the tally exceeds the threshold. Payment to the player may be achieved by, for example, outputting a monetary amount comprising the payment to the player at the gaming device or by crediting the amount of the payment to a financial account identifier associated with the player. If it is determined in step 2425 that the adjusted tally does not exceed the predetermined threshold then the method 2400 proceeds to step 2430 in which the amount by which the tally falls short of the threshold is collected from the insurer.

Additional Description of Various Embodiments

As further illustration of what has been described herein, additional descriptions of some embodiments of the present invention will now be set forth. Specifically, various examples of embodiments comprising a video poker gaming device will now be described. It should be noted that, as used herein, the terms "session," "gaming session," "play session," "flat rate session" and "flat rate play session" may be used to describe flat rate session play The terms "contract" or "gaming contract" refer to the agreement for the purchase of the gaming session wherein players provide a flat price and in exchange execute a plurality of game plays administered by a gaming device.

A number of gaming contracts may be stored, each with operator-specified parameters. It may be understood that such contracts are in essence pricing arrangements that allow players to execute one or more gaming sessions by providing a flat rate price.

As described, prices of various flat rate sessions or contracts may be determined based on a variety of associated parameters, such as the duration of the contract, the wager amount per game play, the starting balance of the contract active payouts associated with the contract, and so on.

For example, as described, in one or more embodiments, an operator may calculate (e.g., by way of repeated mathematical simulation) the average amount paid out to a player of a gaming contract when the contract comprises various parameters. For example, it may be determined that the average contract costs for a draw video poker contract is characterized by the following parameters:

contract duration/interval;

wager amount per hand;

active pay combinations;

probability of achieving certain winning combinations; and threshold above which player may collect winnings.

Thus, after simulating play of a gaming contract with the above parameters, the average winning outcome derived by the player can be determined. An operator may multiply the contract cost by a desired margin to arrive at a retail price. In other embodiments, an operator may calculate a retail price by adding a fixed amount to a contract cost.

As a way of promoting the sale of gaming session contracts, additional types of game play mechanics may be created to add interest to game play. Specifically, time extensions may be granted to extend the duration of the basic gaming session under varying circumstances. The circumstances are described in more detail as follows.

Time Extensions

The flat rate pricing of gaming sessions allows new types of awards and promotions to be created. When a contract's duration is measured in time (e.g., a 30-minute gaming session), players may accumulate additional time for game play by satisfying one or more other predefined criteria (e.g., achieving certain game outcomes or by responding to promotional opportunities).

A time extension is a period of time beyond the predetermined duration of the gaming session at the time of purchase. The time extension allows the player to play the game without providing a further payment (e.g., without inserting additional funds). The player, however, is eligible to receive awards for winning game outcomes according to the pay table (either monetary, time, or both).

It should also be noted that, in some embodiments, players may be allowed to "wager" during a time extension, but may do so with "the house's money" and not their own (e.g., during an extension, a player is still wagering, but he may not be posting the funds for the wagers, as all the player may be required to pay is an initial contract price if an extension is provided as a benefit).

For example, a player may purchase a 30-minute gaming session on a video poker game. The player may, in addition to winning a monetary (i.e., credit) award in accordance with a pay table, may also receive a time extension (e.g., a time award) to the original contract duration.

In one embodiment, the duration of the gaming session may be associated with a minimum number of game outcomes. In essence, until the minimum number of game outcomes occurs the gaming session does not conclude (e.g., a player purchases a "30-minute" game session wherein he is entitled to a minimum of 180 game outcomes). However, conversely, it is possible for a player who speeds through game play, in some embodiments, to obtain more than the minimum number of game outcomes.

A single pay table may include winning game outcomes (e.g., winning symbol combinations) and corresponding award amounts for those outcomes—either monetary (e.g., credit) awards or time awards. FIG. 25 displays a number of winning game outcomes in the pay table 2500 for a typical video poker game.

Winning game outcomes may provide a monetary award, a time award, or both a monetary and a time award as shown in FIG. 25. For example, only monetary awards are associated with a jacks or better pair, two pair, and royal flush winning game outcomes. These winning game outcomes entitle the player to a credit award (e.g., one coin or two coins respectively). Some winning game outcomes are only awarded time awards. For example, a "pair with less than jacks or better" is awarded a one-minute time award. Certain winning game outcomes in the pay table earn a credit award and a time award. These winning game outcomes as illustrated in FIG. 25 are three-of-a-kind, straight, flush, full house, four-a-kind, and straight flush.

It should be noted that although FIG. 25 is for a video poker type gaming device, slot-type gaming machines (as well as video keno and other types of electronic or electromechanical wagering games) may also use similar pay tables in association with the winning game outcomes typically acquired in these types of gaming machines.

Certain types of games, such as slot-type games, have bonus games in addition to the basic underlying game outcomes. These bonus games traditionally provide credit awards. They may also provide time awards, or more specifically, in the bonus game, bonus time awards.

In another embodiment, a pay table may include not only monetary awards and time awards, but also game play awards. Similarly, to a time extension, a game play extension is a game play beyond a predetermined number of game plays defined by a contract for which the player need not provide a payment or wager. Consequently, a player may acquire game play awards during the gaming session that allows the gaming session to be extended by the number of game plays won. Similar to time awards, the player is eligible to receive further awards for winning game outcomes occurring during the extended duration play created by the game play awards.

In some embodiments, game play awards, time awards, and monetary awards may create any of the following award combinations: a monetary award, a monetary award and a time award, a monetary award and a game play award, a time award and a game play award, a time award, and a game play award.

It should be noted that, in one embodiment, whether a player is provided with a time award or a game play award might depend on whether the player is currently playing under a contract that defines the duration of the contract as a period of time or a number of game plays.

For example, if a player purchases the contract that defines one-half hour of play for $40.00 and obtains a "straight", the player may be provided with a bonus of ten minutes of time. If, on the other hand, the player purchases the contract that defines 350 game plays or hands for $40.00 and obtains the "straight", the player may instead be provided with two bonus game plays or hands.

In one embodiment, a player may acquire and accumulate both game play awards and time extension awards during the gaming session. These game play awards and time extension awards may be saved and redeemed after the gaming contract's predetermined duration has expired. For example, in some embodiments, a contract duration measured in game plays may provide time extension awards for extended duration game play after the conclusion of the gaming contract's predetermined duration. Similarly in some embodiments, a contract duration measured in time may provide game play awards for extended duration game play after the conclusion of the gaming contract's predetermined duration.

In another embodiment, the gaming session may be halted to allow the player to redeem the time or game play awards when acquired, at the player's request, or as determined by the gaming device. Using the time and game play extensions during the halted gaming session may involve creating, in some embodiments, a bonus game to use/redeem these awards. The bonus game may allow the player to use either a time award or game play award to achieve a winning game outcome in the bonus game. When the award has been exhausted, the regular gaming session is resumed; using the remaining game plays or time available from the gaming session's predetermined duration.

The flat rate gaming session may also be constructed with a goal that the player attempts to achieve throughout the entire gaming session until that goal is achieved. If desired, an episodic type gaming session can be created with a number of goals integrated into the gaming session that must be either sequentially achieved or cumulatively acquired to achieve an overall winning game outcome for the gaming session. Bonus games may also be integrated into the overall gaming session that use game play and/or time awards to win bonus games. Each bonus game may provide credits or game play attributes (e.g., wild symbols) that increase the probability or the value of a winning game outcome. Time awards and game play awards may also be used to extend the predetermined duration of the gaming session. The player may be awarded for partial achievements of specified goals. For example, the player may be awarded for achieving certain mileposts in the gaming session for progress made toward the overall game goal.

Bonus games can also provide awards that may be triggered by events occurring in the gaming session (e.g., mile posts as game play progresses through the gaming session (e.g., a story line), by the accumulation of time or bonus awards, by game outcomes, etc.). Bonus games may have their own predetermined goals, the achievement of which may be limited to a predetermined time or game play limit. Alternately, the bonus game may allow the player to use all of the player's accumulated time or game play awards. In one embodiment, the bonus game may only use time awards, in another embodiment only game play awards, and in some embodiments both time and game play awards. In the embodiment that uses both time and game play awards, the bonus game may be divided into two parts—one that uses only time awards and one that uses only game play awards. These bonus games may also provide the player, in some embodiments, credit awards for winning game outcomes. The bonus game may, in some embodiments, also provide further time or game play awards to the player that can be used in other bonus games or toward the completion of the overall game goal.

It should be further noted that the bonus games may be played at the end of the gaming session, beyond a period of time or number of game plays defined by the contract, during which period the player may play the game without providing payment or wagers therefore. The gaming session duration may be measured in terms of time or game plays. The bonus game play is a game play (measured in either game plays or time) a player may play, beyond a period of time or number of game plays defined by a contract, for which the player need not provide a payment or wager.

The time at which a time extension may be used or redeemed may be based on one or more rules specified by a casino, player, game designer, and/or gaming machine manufacturer. In one embodiment, a player may be required to satisfy one or more conditions in order to redeem or use the time or game play award to extend the duration of gaming session or, in an alternate embodiment, to apply the award to a bonus game.

For example, if a player obtains a time extension or game play extension (e.g., free spin award) as a result of a game outcome, the player may utilize or redeem that award (i) immediately upon obtaining it (e.g., the clock for the contract may be paused while the player utilizes or redeems bonus); (ii) immediately upon an ending or completion of the contract during the execution of which the bonus was obtained; (iii) at another specified time (e.g., an hour after the player completes play under the terms of the contract); and/or (iv) another time.

In some embodiments, a player may choose or be required to use or redeem such awards in a particular gaming machine (e.g., the same gaming machine which awarded the extensions or a different gaming machine) or a particular type of gaming machine (e.g., any video poker machine or any machine produced by a certain manufacturer) etc.

Figure 26:
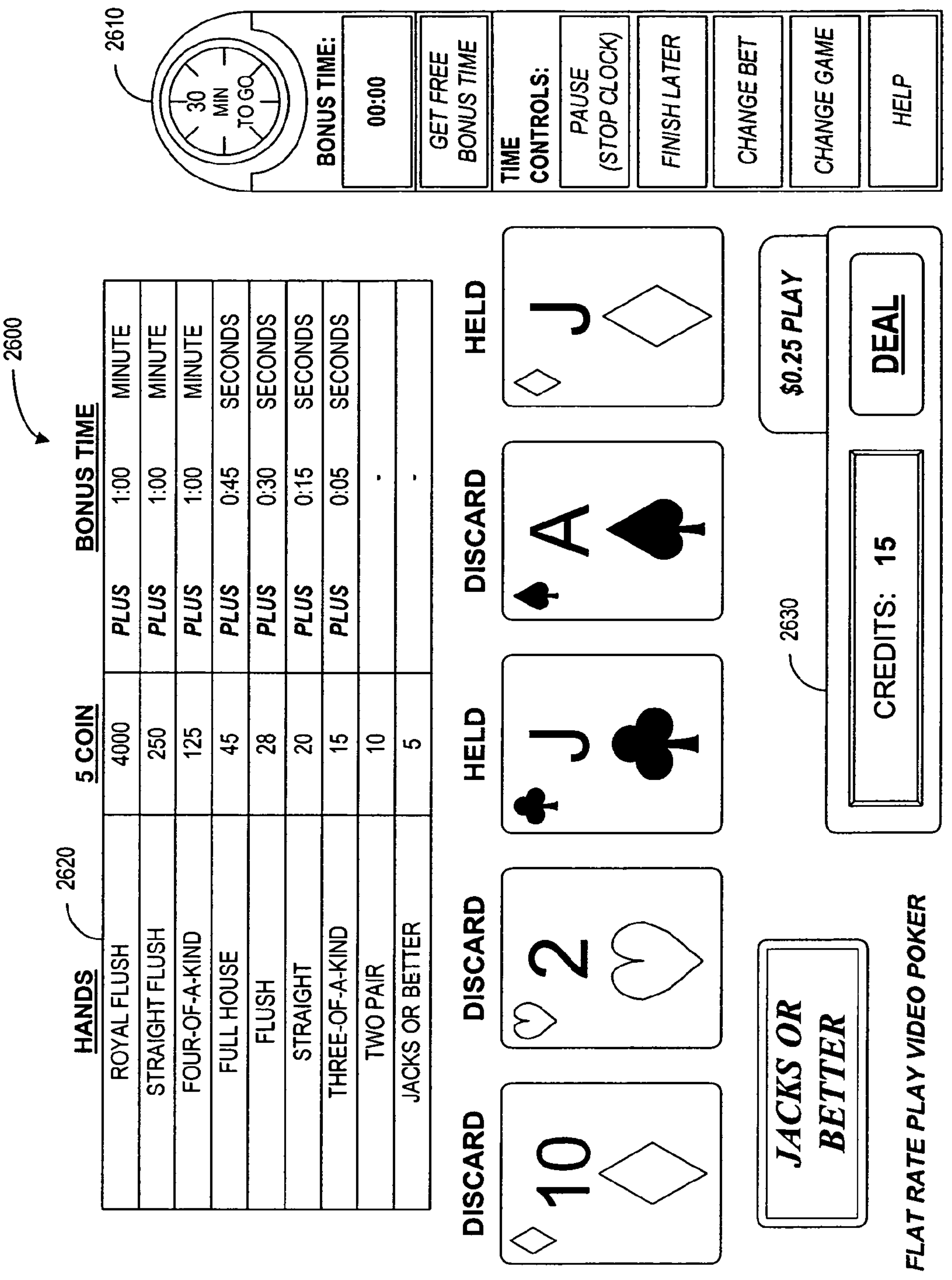
FIG. 26 is an exemplary video display of a video poker game offering bonus time for specified winning game outcomes.

For example, FIG. 26 exemplifies a video display 2600 for a video poker gaming machine having a pay table 2620 with both monetary awards and time awards. A clock 2610 is depicted in the upper right-hand corner of the screen, informing the player of the amount of time left under the purchased contract. In one or more embodiments, players may be allowed to use accumulated time extensions at the conclusion of a gaming session (e.g., after 30 minutes expire, a player can then "play out" any time extensions).

The screen 2600 also depicts, under the clock 2610, an indication of the player's accumulated time extensions. Alternatively, if the player had purchased a contract that defines a number of game plays as separate game outcomes, the player may instead be informed of the number of game plays left under the contract. A credit meter 2630 is provided to display the player's available credits. Monetary awards are added directly to this meter.

Players who are not inclined to immediately use time or game play extensions may store these awards for later use. Extensions may be stored in a player-tracking database in association with a player identifier (e.g., a player tracking number). A player may enter a player-tracking card into a player-tracking device 260 associated with the slot machine 102, or provide a personal identifier and some other manner (e.g., by entering one or more PIN codes, supplying a biometric, etc.) to receive the specified time extension.

Extensions (either time or game play) may alternately or additionally be stored on a ticket voucher. The ticket voucher may be entered into the ticket reader of a gaming device to receive the specified extension. The ticket may also have an encoded monetary value corresponding to the credit balance remaining on the meter at the time the player cashes out. In one embodiment, one or more awards represented by the ticket (i.e., either the monetary award, the time award, or the game play award) may be selectively used by the player in the next gaming session.

In still further embodiments, stored extensions (either time or game play) may alternately or additionally be stored in the memory of a smart card supplied to a player (e.g., the extensions are stored on the card when they are awarded, such that a player may remove the card from a reader device and insert it into a reader device at a later time to redeem or use the extensions).

Stored extensions may be played in accordance with the contract that originally procured the gaming session. If desired, time extensions may also be made available to players who are not gaming on a flat rate gaming session (i.e., time extensions may be awarded much like complimentary points when players place wagers using slot machines).

Time extensions may also be provided to participating players as part of promotional programs. For example, a time extension may be rewarded to players who agree to perform some action requested by a casino (e.g., watch a commercial for a casino restaurant, take a survey, call an 800 number and become a member of a particular program, etc.).

Time extensions may also be offered to players that purchase contracts having specified gaming session durations. The player may be awarded the time extension before or after the contract for the gaming session. Time extensions granted before the contract is concluded may have no value until the contract price is paid. If the time extension is granted after the contract is entered, the time extension may simply be added to the duration of the gaming session.

Promotional programs may also use a ticket voucher to store promotional codes that can be redeemed by the player with a ticket reader (e.g., for accepting cashless ticket vouchers) in the gaming device. The promotional code then specifies to the gaming device (or through the network server) the time extension to provide the player. Alternatively, a promotional code may be entered into the player tracking device to access the time extension. A player-tracking card may also be able to access a promotional code stored in the players account by the gaming establishment.

CONCLUSION

Although the foregoing preferred embodiments employ slot machines and video poker machines, it is within the scope of the present invention to employ other types of gaming devices, such as video roulette machines, video blackjack machines and the like.

Thus, while the present invention has been described in terms of certain preferred embodiments, other embodiments that are apparent to those of skill in the art are also intended to be within the scope of the present invention. For example, the present invention may be practiced by an online casino utilizing only software and not involving traditional slot machines. Accordingly, the scope of the present invention is intended to be limited only by the claims appended hereto.

We claim:

1. A wagering method for a gaming device comprising:

presenting, on a display screen of a gaming device communicating with a gaming server over the Internet, a contract for a gaming session having a predetermined duration spanning a plurality of game plays of a wagering game, the contract having a contract price;

receiving an identifier for determining a time extension to the predetermined duration of the gaming session;

recognizing a payment corresponding to the contract price;

providing, over the Internet and on the display screen, the gaming session for the predetermined duration plus the time extension for the contract price, without requiring further payment for the time extension;

determining that the time extension is to be redeemed;

pausing the gaming session to provide play of the wagering game for a duration of the time extension; and resuming the gaming session of the predetermined duration once the duration of the time extension is complete.

2. The wagering method of claim 1, wherein the identifier is a promotional code.

3. The wagering method of claim 2, wherein the promotional code is entered into a player-tracking device.

4. The wagering method of claim 1, wherein the identifier is stored on a ticket and received through a ticket reader.

5. The wagering method of claim 1, wherein the identifier is a player identifier.

6. The wagering method of claim 1, wherein the identifier is a player tracking number.

7. A wagering method for a gaming device comprising:

presenting, on a display screen of a gaming device communicating with a gaming server over the Internet, a contract for a gaming session having a predetermined duration spanning a plurality of game plays of a wagering game, the contract having a contract price;

recognizing a payment corresponding to the contract price;

implementing, over the Internet, the gaming session on the gaming device;

providing at least one award for a winning game outcome from the group of a game play award or a time award, wherein the at least one time award is an award of time which may be redeemed to extend a duration of a gaming session other than the gaming session during which the award is won, the time award thereby being a time extension of a subsequent gaming session, and wherein the duration comprising the time award is added to extend the duration of the subsequent gaming session without increasing a contract price of the subsequent gaming session, without requiring further payment for the time extension; and storing in a memory of the gaming server an indication of the time award won in association with a player identifier of a player who won the time award, such that the time award can be accessed and applied to the subsequent gaming session.

8. The wagering method of claim 7, wherein the time award is redeemed after a predetermined duration of the subsequent gaming session.

9. The wagering method of claim 7, wherein the time award is added to a predetermined duration of the subsequent gaming session to extend the duration of the subsequent gaming session.

10. The wagering method of claim 7, further including a monetary award for a winning game outcome, wherein the monetary award is added to a credit balance.

11. A method for purchasing a gaming session on a gaming device comprising:

presenting, on a display screen of a gaming device communicating with a gaming server over the Internet, a contract to a player for a first gaming session having a predetermined duration spanning a plurality of game plays of a wagering game, the contract further having a contract price;

recognizing a payment for the contract price;

specifying, as a condition to the first gaming session, a player action to be completed during the first gaming session in order to receive a time extension to a duration of a second gaming session;

recognizing completion of the player action; and implementing, over the Internet, the second gaming session on the gaming device for a predetermined duration purchased as a defining parameter of the second gaming session plus the time extension earned during the first gaming session, without requiring further payment for the time extension.

12. The method of claim 7, wherein the time award has a redemption condition associated therewith.

13. The method of claim 12, wherein the redemption condition comprises redeeming the time award on a different gaming device than the gaming device on which the time award was won.

* * * * *